US007557070B2

(12) United States Patent
Ravkin et al.

(10) Patent No.: US 7,557,070 B2
(45) Date of Patent: Jul. 7, 2009

(54) MULTIPLEXED CELL ANALYSIS SYSTEM

(75) Inventors: Ilya Ravkin, Palo Alto, CA (US); Simon Goldbard, San Jose, CA (US); William C. Hyun, San Francisco, CA (US); Michael A. Zarowitz, Cambria, CA (US); Oren E. Beske, Sunnyvale, CA (US)

(73) Assignee: Millipore Corporation, Billerica, MA (US)

( * ) Notice: Subject to any disclaimer, the term of this patent is extended or adjusted under 35 U.S.C. 154(b) by 52 days.

(21) Appl. No.: 10/120,900

(22) Filed: Apr. 10, 2002

(65) Prior Publication Data

US 2003/0059764 A1 Mar. 27, 2003

Related U.S. Application Data

(60) Provisional application No. 60/328,614, filed on Oct. 10, 2001, provisional application No. 60/318,156, filed on Sep. 7, 2001, provisional application No. 60/317,409, filed on Sep. 4, 2001, provisional application No. 60/310,540, filed on Aug. 6, 2001, provisional application No. 60/307,650, filed on Jul. 24, 2001, provisional application No. 60/307,649, filed on Jul. 24, 2001, provisional application No. 60/299,810, filed on Jun. 20, 2001, provisional application No. 60/299,267, filed on Jun. 18, 2001, provisional application No. 60/293,863, filed on May 24, 2001, provisional application No. 60/259,416, filed on Dec. 28, 2000, provisional application No. 60/241,714, filed on Oct. 18, 2000.

(30) Foreign Application Priority Data

Oct. 18, 2001 (WO) ................... PCT/US01/51413

(51) Int. Cl.
*C40B 60/00* (2006.01)

(52) U.S. Cl. ................... 506/33; 506/7; 506/12; 506/13; 506/23; 506/9; 435/283.1; 435/288.1; 435/70.1

(58) Field of Classification Search ................... 435/4, 435/7.1, 7.2, 287.1, 287.2, 288.7; 436/518, 436/523, 524, 164
See application file for complete search history.

(56) References Cited

U.S. PATENT DOCUMENTS

| | | | |
|---|---|---|---|
| 3,772,099 A | 11/1973 | Ryan et al. | |
| 3,897,284 A | 7/1975 | Livesay | |
| 3,964,294 A | 6/1976 | Shair et al. | |
| 4,053,433 A | 10/1977 | Lee | |
| 4,131,064 A | 12/1978 | Ryan et al. | |
| 4,197,104 A | 4/1980 | Krystyniak et al. | |
| 4,329,393 A | 5/1982 | LaPerre et al. | |
| 4,363,965 A | 12/1982 | Soberman et al. | |
| 4,469,623 A | 9/1984 | Danielson et al. | |
| 4,544,836 A | 10/1985 | Galvin et al. | |
| 4,640,035 A | 2/1987 | Kind et al. | |
| 4,652,395 A | 3/1987 | Marcina et al. | |
| 4,768,858 A | 9/1988 | Hussein | |
| 5,114,855 A | 5/1992 | Hu et al. | |
| 5,143,854 A | 9/1992 | Pirrung et al. | |
| 5,202,265 A | 4/1993 | LaMora | |
| 5,364,557 A | 11/1994 | Faris | |
| 5,409,839 A | 4/1995 | Balestrieri | |
| 5,451,505 A | 9/1995 | Dollinger | |
| 5,563,583 A | 10/1996 | Brady et al. | |
| 5,581,257 A | 12/1996 | Greene et al. | |
| 5,591,592 A | 1/1997 | Ruoslahti et al. | |
| 5,656,441 A | 8/1997 | Faller et al. | |
| 5,674,698 A * | 10/1997 | Zarling et al. | 435/7.92 |
| 5,688,696 A | 11/1997 | Lebl | |
| 5,708,153 A | 1/1998 | Dower et al. | |
| 5,710,038 A | 1/1998 | Mes-Masson et al. | |
| 5,741,462 A | 4/1998 | Nova et al. | |
| 5,744,305 A | 4/1998 | Fodor et al. | |
| 5,751,629 A | 5/1998 | Nova et al. | |
| 5,760,394 A | 6/1998 | Welle | |
| 5,770,455 A | 6/1998 | Cargill et al. | |
| 5,773,224 A | 6/1998 | Grandics et al. | |
| 5,786,626 A | 7/1998 | Brady et al. | |
| 5,817,751 A | 10/1998 | Szardenings et al. | |
| 5,840,485 A | 11/1998 | Lebl et al. | |
| 5,846,719 A | 12/1998 | Brenner et al. | |
| 5,874,214 A | 2/1999 | Nova et al. | |

(Continued)

FOREIGN PATENT DOCUMENTS

GB 2 306 484 7/1997

(Continued)

OTHER PUBLICATIONS

*Strategies and Techniques in Simultaneous Solid Phase Synthesis Based on the Segmentation of Membrane Type Supports*, Bioorganic & Medicinal Chemistry Letters, vol. 3, No. 3, pp. 425-430, 1993.
*Generation and Screening of an Oligonucleotide-Encoded Synthetic Peptide Library*, Proc. Natl. Acad. Sci. USA, vol. 90, pp. 10700-10704.
*Nanowires Formed in Anodic Oxide Nanotemplates*, J. Mater. Res., vol. 9, No. 4, pp. 1014-1018, Apr. 1994.
*Membrane-Based Synthesis of Nanomaterials*, Chem. Mater., vol. 8, No. 8, pp. 1739-1746, 1996.

(Continued)

*Primary Examiner*—JD Schultz
*Assistant Examiner*—Jeffrey S. Lundgren
(74) *Attorney, Agent, or Firm*—Hamilton, Brook, Smith & Reynolds, P.C.

(57) ABSTRACT

Systems including apparatus, methods, compositions, and kits for multiplexed analysis of biological systems using non-positional and/or positional arrays of coded carriers.

30 Claims, 32 Drawing Sheets

U.S. PATENT DOCUMENTS

| | | |
|---|---|---|
| 5,874,724 A | 2/1999 | Cato |
| 5,919,706 A | 7/1999 | Tajima |
| 5,925,562 A | 7/1999 | Nova et al. |
| 5,961,923 A | 10/1999 | Nova et al. |
| 5,981,166 A | 11/1999 | Mandecki |
| 5,981,180 A | 11/1999 | Chandler et al. |
| 5,989,835 A | 11/1999 | Dunlay et al. |
| 5,990,479 A | 11/1999 | Weiss et al. |
| 6,017,496 A | 1/2000 | Nova et al. |
| 6,018,299 A | 1/2000 | Eberhardt |
| 6,023,540 A | 2/2000 | Walt et al. |
| 6,025,129 A | 2/2000 | Nova et al. |
| 6,025,200 A | 2/2000 | Kaish et al. |
| 6,046,003 A | 4/2000 | Mandecki |
| 6,051,377 A | 4/2000 | Mandecki |
| 6,075,134 A | 6/2000 | Bertozzi et al. |
| 6,083,693 A | 7/2000 | Nandabalan et al. |
| 6,083,763 A | 7/2000 | Balch |
| 6,087,186 A | 7/2000 | Cargill et al. |
| 6,093,370 A | 7/2000 | Yasuda et al. |
| 6,100,026 A | 8/2000 | Nova et al. |
| 6,100,973 A | 8/2000 | Lawandy |
| 6,103,479 A | 8/2000 | Taylor |
| 6,104,038 A | 8/2000 | Gonzalez et al. |
| 6,114,038 A | 9/2000 | Castro et al. |
| 6,129,896 A | 10/2000 | Noonan et al. |
| 6,133,030 A | 10/2000 | Bhatia et al. |
| 6,136,251 A | 10/2000 | Etzbach et al. |
| 6,136,274 A | 10/2000 | Nova et al. |
| 6,184,035 B1 | 2/2001 | Csete et al. |
| 6,207,770 B1 | 3/2001 | Coates et al. |
| 6,210,910 B1* | 4/2001 | Walt et al. ............... 435/7.32 |
| 6,214,560 B1 | 4/2001 | Yguerabide et al. |
| 6,225,112 B1 | 5/2001 | Sakai et al. |
| 6,238,869 B1 | 5/2001 | Kris et al. |
| 6,251,691 B1 | 6/2001 | Seul |
| 6,274,323 B1 | 8/2001 | Bruchez et al. |
| 6,296,189 B1 | 10/2001 | Lawandy et al. |
| 6,306,975 B1 | 10/2001 | Zhao et al. |
| 6,319,668 B1* | 11/2001 | Nova et al. ............... 506/28 |
| 6,326,144 B1 | 12/2001 | Bawendi et al. |
| 6,395,555 B1 | 5/2002 | Wilson et al. |
| 6,406,840 B1* | 6/2002 | Li et al. ............... 435/1.3 |
| 6,441,901 B2 | 8/2002 | McFarland et al. |
| 6,458,937 B1 | 10/2002 | Bertozzi et al. |
| 6,534,307 B1 | 3/2003 | Muraca |
| 6,643,001 B1 | 11/2003 | Faris |
| 6,752,490 B2 | 6/2004 | Pickrell |
| 6,828,157 B1 | 12/2004 | Pankowsky |
| 6,887,431 B1 | 5/2005 | Vann et al. |
| 6,908,737 B2* | 6/2005 | Ravkin et al. ............... 435/6 |
| 6,977,152 B2 | 12/2005 | Foulkes et al. |
| 7,225,082 B1 | 5/2007 | Natan et al. |
| 7,253,435 B2 | 8/2007 | Siniaguine et al. |
| 2001/0049101 A1 | 12/2001 | Brogger et al. |
| 2002/0123078 A1 | 9/2002 | Seul et al. |
| 2002/0137059 A1 | 9/2002 | Wu et al. |
| 2002/0165179 A1 | 11/2002 | Baker |
| 2002/0197656 A1 | 12/2002 | Li et al. |
| 2003/0007152 A1 | 1/2003 | McFarland et al. |
| 2003/0008323 A1 | 1/2003 | Ravkin et al. |
| 2003/0017445 A1 | 1/2003 | Berg et al. |
| 2003/0059764 A1 | 3/2003 | Ravkin et al. |
| 2003/0104494 A1 | 6/2003 | Ravkin et al. |
| 2003/0129654 A1* | 7/2003 | Ravkin et al. ............... 435/7.1 |
| 2003/0134330 A1 | 7/2003 | Ravkin et al. |
| 2003/0157730 A1 | 8/2003 | Walker et al. |
| 2003/0166015 A1 | 9/2003 | Zarowitz et al. |
| 2003/0170744 A1 | 9/2003 | Beske |
| 2003/0207249 A1 | 11/2003 | Beske et al. |
| 2003/0219800 A1 | 11/2003 | Beske et al. |
| 2004/0018485 A1 | 1/2004 | Ravkin et al. |
| 2004/0038306 A1 | 2/2004 | Agnew et al. |
| 2004/0126773 A1 | 7/2004 | Beske et al. |
| 2005/0009113 A1 | 1/2005 | Goldbard et al. |
| 2005/0084423 A1 | 4/2005 | Zarowitz et al. |
| 2005/0084914 A1 | 4/2005 | Foulkes et al. |
| 2005/0208468 A1 | 9/2005 | Beske et al. |
| 2007/0273879 A1 | 11/2007 | Siniaguine et al. |

FOREIGN PATENT DOCUMENTS

| | | |
|---|---|---|
| WO | WO 83/01308 A1 | 4/1983 |
| WO | 96/36436 | 11/1996 |
| WO | WO 97/03931 A1 | 2/1997 |
| WO | WO 97/12680 | 4/1997 |
| WO | WO 97/20074 | 6/1997 |
| WO | WO9735201 | 9/1997 |
| WO | WO 98/37417 A1 | 8/1998 |
| WO | WO 98/38490 A1 | 9/1998 |
| WO | 98/46550 | 10/1998 |
| WO | 98/53093 | 11/1998 |
| WO | WO 99/13313 A1 | 3/1999 |
| WO | WO 99/19711 A1 | 4/1999 |
| WO | WO9919515 | 4/1999 |
| WO | WO9922018 | 5/1999 |
| WO | WO9936564 | 7/1999 |
| WO | WO9937814 | 7/1999 |
| WO | WO9941006 | 8/1999 |
| WO | WO9967641 | 12/1999 |
| WO | WO0000145 | 1/2000 |
| WO | WO 00/16893 A2 | 3/2000 |
| WO | WO 00/61281 | 4/2000 |
| WO | WO 00/63419 | 4/2000 |
| WO | WO0022435 | 4/2000 |
| WO | WO0032542 | 6/2000 |
| WO | WO0033079 | 6/2000 |
| WO | WO0039587 | 6/2000 |
| WO | WO 00/63695 * | 10/2000 |
| WO | WO0073777 | 12/2000 |
| WO | WO 01/62699 | 2/2001 |
| WO | WO 01/20015 A1 | 3/2001 |
| WO | WO 01/25002 | 4/2001 |
| WO | WO 01/26038 A1 | 4/2001 |
| WO | WO 01/77678 | 4/2001 |
| WO | WO0125510 | 4/2001 |
| WO | WO 01/51207 A1 | 7/2001 |
| WO | WO0161040 | 8/2001 |
| WO | WO0177391 | 10/2001 |
| WO | WO0178288 | 10/2001 |
| WO | WO0189585 | 11/2001 |
| WO | WO0196604 | 12/2001 |
| WO | WO0198765 | 12/2001 |
| WO | WO 02/37944 A2 | 5/2002 |
| WO | WO 03/018760 A2 | 3/2003 |
| WO | WO 2004/034012 A2 | 4/2004 |
| WO | WO 2005/028621 A2 | 3/2005 |

OTHER PUBLICATIONS

*Symposium BB Nonlithographic Methods for Organizing Materials into Functional Structures*, pp. 1-9, Nov. 30-Dec. 2, 1998.
*Orthogonal Self-Assembly on Colloidal Gold-Platinum Nanorods*, Adv. Mater., vol. 11, No. 12, pp. 1021-1025, 1999.
*Symposium C Anisotropic Nanoparticles—Synthesis, Characterization, and Applications*, pp. 54-69, Nov. 27-29, 2000.
Egner et al. "Tagging in combinatorial chemistry: the use of coloured and fluorescent beads," Chem. Commun., 1997, 735-736.
Lam, K. S.; Salmon, S. E.; Hersh, E. M.; Hruby, V. J.; Kazmierski, W. M.; Knapp, R. J. "A new type of synthetic peptide library for identifying ligand-binding activity," Nature 1991, 354, 82-84.
Blawas, A.S.; Reicher, W. M. "Protein Patterning," Biomaterials 1998 19, 595-609.
Amit, M., et al., "Human Feeder Layers for Human Embryonic Stem Cells," *Biology of Reproduction*, 68(6): 2150-2156 (2003).

Baselt, D., et al., "Biosensor Based on Force Microscope Technology," *J. Vac. Sci. Technol. B.*, 14(2): 789-793 (1996).

Berglund, D., et al., "A Rapid Analytical Technique for Flow Cytometric Analysis of Cell Viability Using Calcofluor White M2R," *Cytometry*, 8(4): 421-426 (1987).

Beske, O., et al., "High-throughput Cell Analysis Using Multiplexed Array Technologies," *Drug Discovery Today*, 7(18 Suppl.): S131-S135 (Sep. 2002).

Björk, L., et al., "Computerized Assessment of Production of Multiple Human Cytokines at the Single-cell Level Using Image Analysis," *Journal of Leukocyte Biology*, 59(2): 287-295 (1996).

Clark, A., et al., "Decreased Insulin Secretion in Type 2 Diabetes: A Problem of Cellular Mass or Function?," *Diabetes*, 50(Suppl. 1): S169-S171 (Feb. 2001).

Czarnik, A., "Illuminating the SNP Genomic Code," *Modern Drug Discovery*, 1(2): 49-55 (1998).

Final Conference Program of LabAutomation '98 held in San Diego, CA, Jan. 17-21, 1998, pp. 99, 100, 124, and 129 [retrieved on Oct. 29, 2007]. Retrieved from the Internet <url: http://labautomation.org/confarchives.php>.

Fratamico, P., et al., "Detection of *Escherichia coli* O157:H7 Using a Surface Plasmon Resonance Biosensor," *Biotechnology Techniques*, 12(7): 571-576 (1998).

Gupta, V., et al., "Optical Amplification of Ligand-receptor Binding Using Liquid Crystals," *Science*, 279: 2077-2080 (1998).

Lee, J., et al., "Engineering Novel Cell Surface Receptors for Virus-mediated Gene Transfer," *The Journal of Biological Chemistry*, 274(31): 21878-21884 (1999).

Mahal, L., et al., "Engineering Chemical Reactivity on Cell Surfaces Through Oligosaccharide Biosynthesis," *Science*, 276: 1125-1128 (1997).

Martens, C., et al., "A Generic Particle-based Nanradioactive Homogeneous Multiplex Method for High-throughput Screening Using Microvolume Fluorimetry," *Analytical Biochemistry*, 273(1): 20-31 (1999).

McNeish, J., "Embryonic Stem Cells in Drug Discovery," *Nature Reviews, Drug Discovery*, 3: 70-80 (2004).

Mendelsohn, J., et al., "Rational Design of Cytophilic and Cytophobic Polyelectrolyte Multilayer Thin Films," *Biomacromolecules*, 4(1): 96-106 (2003).

Mohr, S., et al., "Microarrays as Cancer Keys: An Array of Possibilities," *Journal of Clinical Oncology*, 20(14): 3165-3175 (2002).

Rowe, C., et al., "Array Biosensor for Simultaneous Identification of Bacterial, Viral, and Protein Analytes," *Analytical Chemistry*, 71(17): 3846-3852 (1999).

"Specifications Microtiter Plates," *Micronit Microfluidics B.V.*, pp. 1-2; [retrieved on Oct. 29, 2007]. Retrieved from the Internet: <url:http://www.micronit.com/en/products/standard_glass_chips/microtiter_plate.php>.

Torrance, C., et al., "Use of Isogenic Human Cancer Cells for High-throughput Screening and Drug Discovery," *Nature Biotechnology*, 19: 940-945 (2001).

*Webster's II New Riverside University Dictionary*, Houghton Mifflin Company, pp. 126 and 760 (1994).

Yarema, K., et al., "Metabolic Delivery of Ketone Groups to Sialic Acid Residues," *The Journal of Biological Chemistry*, 273(47): 31168-31179 (1998).

Ziauddin, J., et al., "Microarrays of Cells Expressing Defined cDNAs," *Nature*, 411: 107-110 (2001).

Furst, A., et al., "Rapid Immunofluorescent Screening Procedure Using Primary Cell Cultures or Tissue Sections," *Journal of Immunological Methods*, 70: 101-109 (1984).

Gown, A., et al., "Improved Detection of Apoptotic Cells in Archival Paraffin Sections: Immunohistochemistry Using Antibodies to Cleaved Caspase 3," *The Journal of Histochemistry & Cytochemistry*, 50(4): 449-454 (2002).

Hodder, P., et al., "A Flow Injection Renewable Surface Technique for Cell-Based Drug Discovery Functional Assays," *Anal. Chem.*, 71:1160-1166 (1999).

* cited by examiner

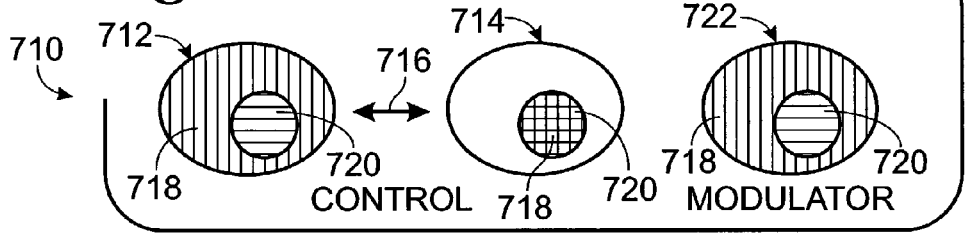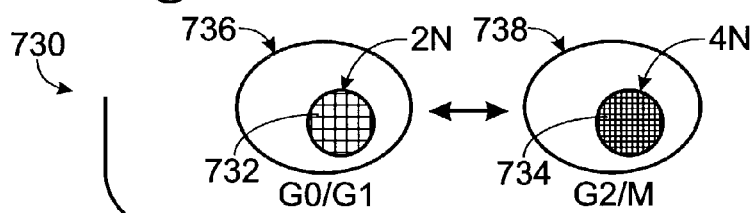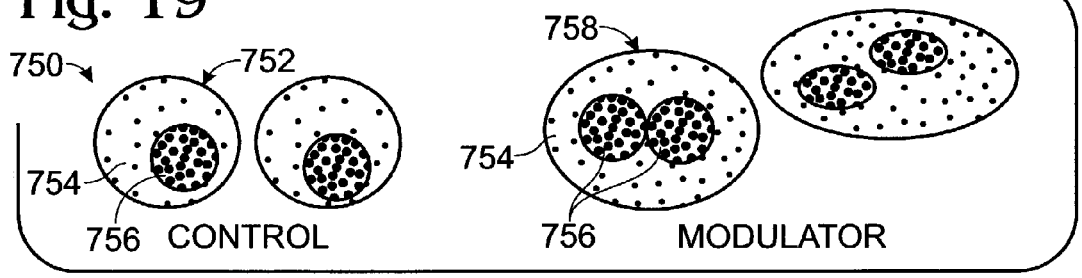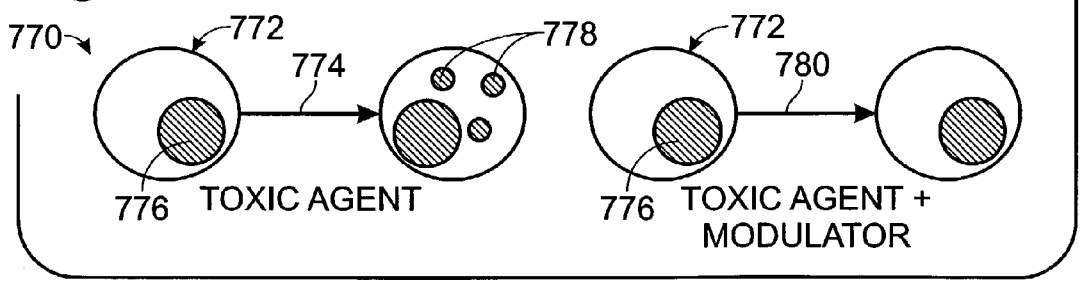

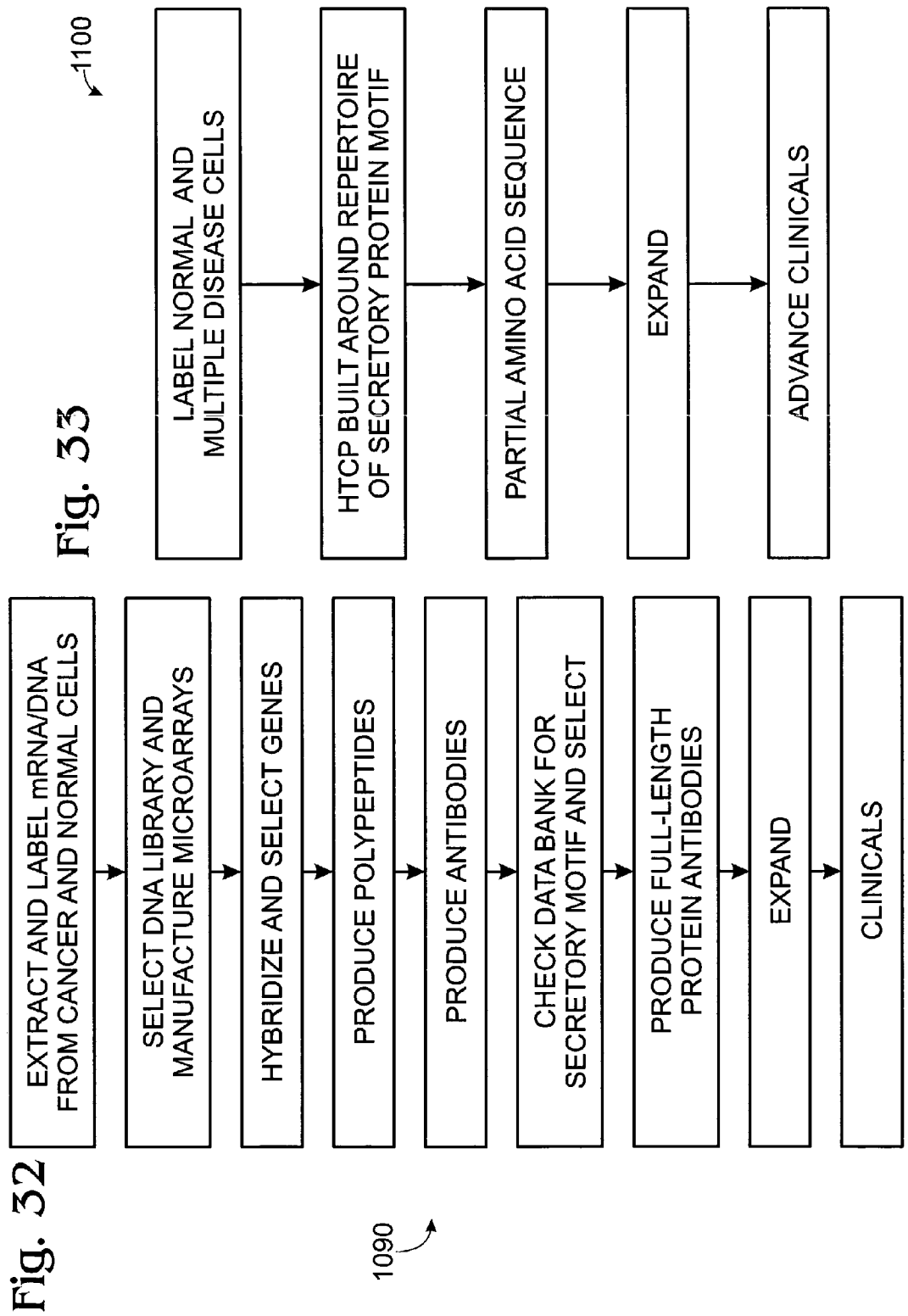

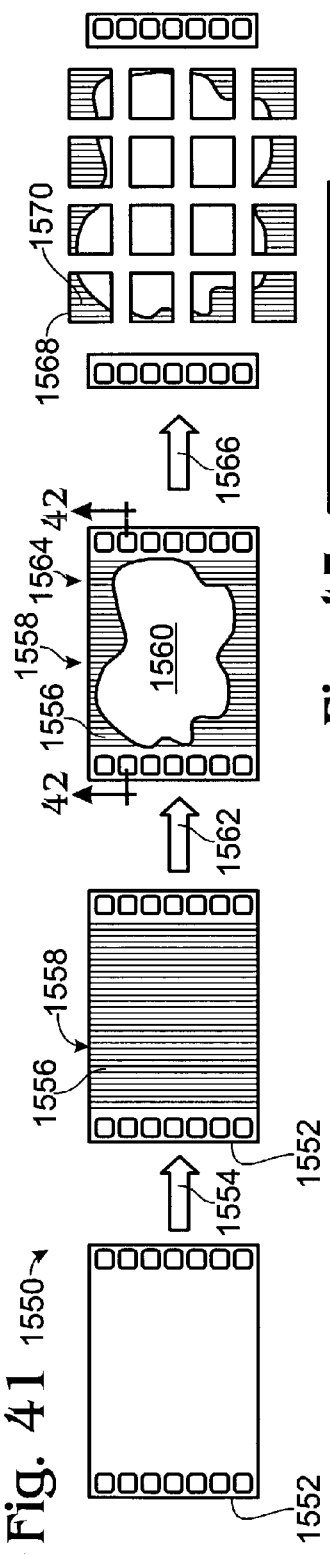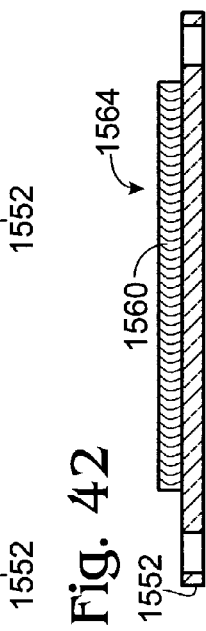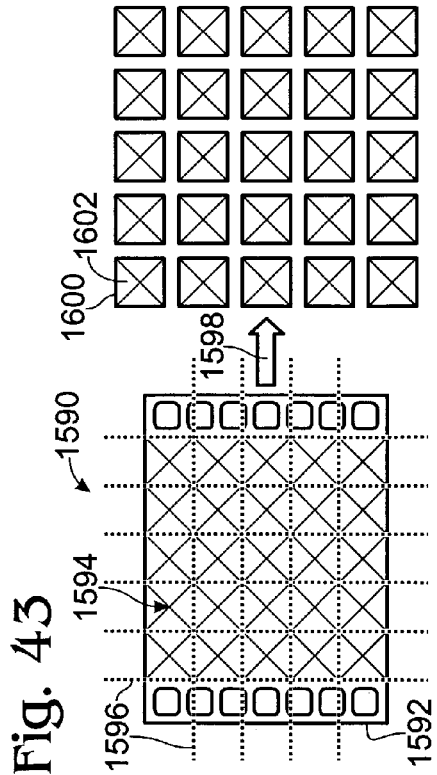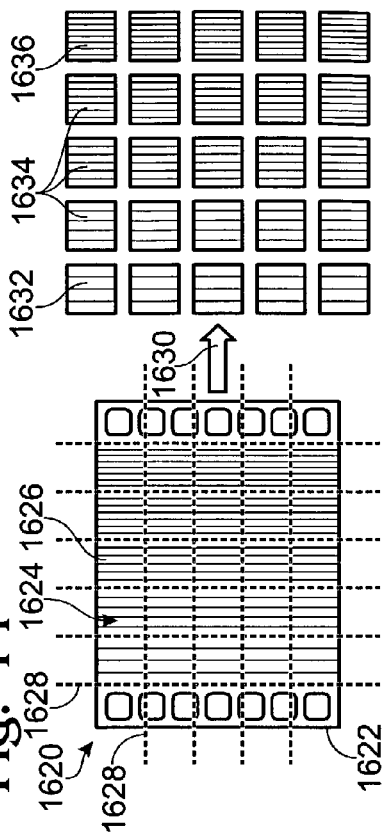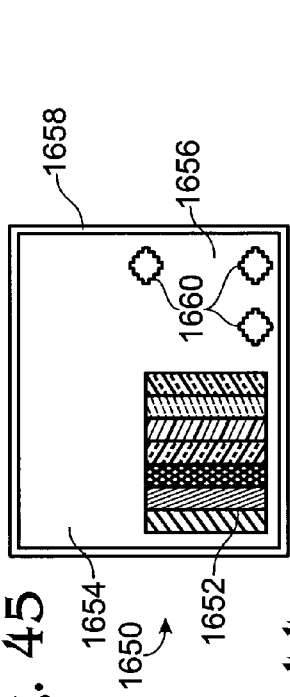
Fig. 41
Fig. 42
Fig. 43
Fig. 44
Fig. 45

MULTIPLEXED CELL ANALYSIS SYSTEM

CROSS-REFERENCES

This application claims priority under 35 U.S.C. § 365(a) of PCT Patent Application Serial No. PCT/US01/51413, filed Oct. 18, 2001 titled "Multiplexed Cell Analysis System," which is hereby incorporated by reference in its entirety. PCT Application No. PCT/US01/51413, in turn, claims priority under 35 U.S.C. § 119 (e) to the following U.S. provisional patent applications: Ser. No. 60/241,714, filed Oct. 18, 2000; Ser. No. 60/259,416, filed Dec. 28, 2000; Ser. No. 60/293,863, filed May 24, 2001; Ser. No. 60/299,267, filed Jun. 18, 2001; Ser. No. 60/299,810, filed Jun. 20, 2001; Ser. No. 60/307,649, filed Jul. 24, 2001; Ser. No. 60/307,650, filed Jul. 24, 2001; Ser. No. 60/310,540, filed Aug. 6, 2001; Ser. No. 60/317,409, filed Sep. 4, 2001; Ser. No. 60/318,156, filed Sep. 7, 2001; and Ser. No. 60/328,614, filed Oct. 10, 2001.

This application also incorporates by reference in their entirety for all purposes the Following U.S. patents: U.S. Pat. No. 3,772,099, issued Nov. 13, 1973; U.S. Pat. No. 3,897,284, issued Jul. 29, 1975; U.S. Pat. No. 3,964,294, issued Jun. 22, 1976; U.S. Pat. No. 3,966,599, issued Jun. 29, 1976; U.S. Pat. No. 3,980,561, issued Sep. 14, 1976; U.S. Pat. No. 4,053,433, issued Oct. 11, 1977; U.S. Pat. No. 4,087,327, issued May 2, 1978; U.S. Pat. No. 4,131,064, issued Dec. 26, 1978; U.S. Pat. No. 4,197,104, issued Apr. 8, 1980; U.S. Pat. No. 4,329,393, issued May 11, 1982; U.S. Pat. No. 4,343,904, issued Aug. 10, 1982; U.S. Pat. No. 4,363,965, issued Dec. 14, 1982; U.S. Pat. No. 4,390,452, issued Jun. 28, 1983; U.S. Pat. No. 4,469,623, issued Sep. 4, 1984; U.S. Pat. No. 4,634,675, issued Jan. 6, 1987; U.S. Pat. No. 4,640,035, issued Feb. 3, 1987; U.S. Pat. No. 4,649,114, issued Mar. 10, 1987; U.S. Pat. No. 4,652,395, issued Mar. 24, 1987; U.S. Pat. No. 4,727,040, issued Feb. 23, 1988; U.S. Pat. No. 4,833,083, issued May 23, 1989; U.S. Pat. No. 4,888,294, issued Dec. 19, 1989; U.S. Pat. No. 4,906,577, issued Mar. 6, 1990; U.S. Pat. No. 4,921,792, issued May 1, 1990; U.S. Pat. No. 4,963,490, issued Oct. 16, 1990; U.S. Pat. No. 4,982,739, issued Jan. 8, 1991; U.S. Pat. No. 5,019,512, issued May 28, 1991; U.S. Pat. No. 5,079,161, issued Jan. 7, 1992; U.S. Pat. No. 5,081,036, issued Jan. 14, 1992; U.S. Pat. No. 5,096,814, issued Mar. 17, 1992; U.S. Pat. No. 5,100,783, issued Mar. 31, 1992; U.S. Pat. No. 5,100,799, issued Mar. 31, 1992; U.S. Pat. No. 5,114,853, issued May 19, 1992; U.S. Pat. No. 5,126,269, issued Jun. 30, 1992; U.S. Pat. No. 5,233,369, issued Aug. 3, 1993; U.S. Pat. No. 5,409,839, issued Apr. 25, 1995; U.S. Pat. No. 5,451,505, issued Sep. 19, 1995; U.S. Pat. No. 5,486,855, issued Jan. 23, 1996; U.S. Pat. No. 5,571,410, issued Nov. 5, 1996; U.S. Pat. No. 5,708,153, issued Jan. 13, 1998; U.S. Pat. No. 5,741,462, issued Apr. 21, 1998; U.S. Pat. No. 5,760,394, issued Jun. 2, 1998; U.S. Pat. No. 5,770,455, filed Jun. 23, 1998; U.S. Pat. No. 5,780,258, issued Jul. 14, 1998; issued Jun. 23, 1998; U.S. Pat. No. 5,817,751, issued Oct. 6, 1998; U.S. Pat. No. 5,840,485, issued Nov. 24, 1998; U.S. Pat. No. 5,961,923, issued Oct. 5, 1999; U.S. Pat. No. 5,981,180, issued Nov. 9, 1999; U.S. Pat. No. 5,989,835, issued Nov. 23, 1999; U.S. Pat. No. 5,990,479, issued Nov. 23, 1999; U.S. Pat. No. 6,025,200, issued Feb. 15, 2000; U.S. Pat. No. 6,100,026, issued Aug. 8, 2000; and U.S. Pat. No. 6,103,479, issued Aug. 15, 2000.

This application also incorporates by reference in their entirety for all purposes the following PCT patent applications: Serial No. PCT/IL97/00105, filed Mar. 20, 1997; Serial No. PCT/US98/21562, filed Oct. 14, 1998; Serial No. PCT/US98/22785, filed Oct. 27, 1998; Serial No. PCT/US99/00918, filed Jan. 15, 1999; Serial No. PCT/US99/01315, filed Jan. 22, 1999; Serial No. PCT/GB99/00457, filed Feb. 15, 1999; Serial No. PCT/US99/04000, filed Feb. 24, 1999; Serial No. PCT/US99/04001, filed, Feb. 24, 1999; Serial No. PCT/US99/14387, filed Jun. 24, 1999; Serial No. PCT/GB99/02108, filed Jul. 2, 1999; Serial No. PCT/SE99/01836, filed Oct. 12, 1999; Serial No. PCT/US99/31022, filed Dec. 28, 1999; Serial No. PCT/US00/25457, filed Sep. 18, 2000; Serial No. PCT/US00/27121, filed Oct. 2, 2000; Serial No. PCT/US00/41049, filed Oct. 2, 2000; and Serial No. PCT/US00/10181, filed Oct. 18, 2000.

This application also incorporates by reference in their entirety for all purposes the following U.S. patent applications: Ser. No. 09/549,970, filed Apr. 14, 2000; and Ser. No. 09/694,077, filed Oct. 19, 2000.

FIELD OF THE INVENTION

The invention relates to the analysis of biological systems. More specifically, the invention relates to the multiplexed analysis of biological systems using nonpositional and/or positional arrays of coded carriers.

BACKGROUND

Cells are the fundamental structural unit of biological systems. Thus, understanding cells is essential for understanding both subcellular phenomena such as cell biology, biochemistry, and molecular biology and multicellular phenomena such as physiology. Cells may be studied using cells directly obtained from an organism or cells cultured in vitro. By analyzing cells, biologists have learned many of the complex functional relationships among biological molecules, including DNA, RNA, protein, and carbohydrate, among others, and among assemblies of such molecules. Furthermore, biologists have learned the value of using cells to understand basic cell biology principles and to screen drug candidates for treating human disease and improving human health.

Cell experiments frequently are used for pilot studies before experiments on animals or humans. For example, drug screens frequently use cells in culture to identify a small number of candidate compounds for testing in animals. Therefore, use of cells in these screens saves lives of, and reduces costs associated with, laboratory animals and allows a much larger number of experiments to be performed than would be possible in a relevant metazoan animal, such as a mammal. Furthermore, as isolation techniques and in vitro culture conditions improve for primary cells, such as embryonic and adult stem cells, an even greater number of cell analyses will be performed with cells ex vivo.

The power of cell-based test or screening systems has prompted researchers to develop a vast array of immortalized stable cell lines. Researchers have derived these stable cell lines from many different organisms, tissues, and developmental stages. A sampling of this vast array is available from American Type Culture Collection and other cell repositories. Because each cell line has distinct characteristics based on its origin, genotype, method of immortalization, culture conditions, and environmental history, no single cell line is suitable for all experiments or compound screens. In fact, because each cell line has unique properties, the biotechnology industry and basic researchers alike benefit greatly from analyzing as many cell lines as is feasible for any given experiment, compound screen, or line of research. However, the requirement for high-throughput in drug screens and other analyses with cells limits the number of different cell populations tested.

Efforts are underway to improve the speed and efficiency of cell analysis. Specifically, digitally controlled systems provide the ability to automate many aspects of cell culture, treatment, and data collection. For example, machines with robotic capabilities have been developed that plate, feed, treat, harvest, and measure properties of cells. Furthermore, automated imaging systems are capable of analyzing the properties of cell populations, single cells, and even subcellular organelles. Suitable systems are described in the following U.S. patents, which are incorporated herein by reference: U.S. Pat. No. 5,355,215, issued Oct. 11, 1994; and U.S. Pat. No. 5,989,835, issued Nov. 23, 1999.

Despite these advances, current systems still employ a brute force approach. Specifically, these systems grow, treat, and/or analyze distinct cell populations in separate containers, such as the individual wells of multi-well microtiter dishes. It is only in this way that these systems can form associations between (1) assay results obtained from the analysis, and (2) cell-identifying information, such as origin, genotype, growth condition, specific test, and/or drug treatment. Yet, this brute force approach becomes increasingly prohibitive as the number of cell types and treatments increases. For example, the analysis of 100,000 samples a day in separate sample wells, common in high-throughput screening, requires a stack of standard-sized 96-well microplates over 40 feet high each day and over 3 miles high each year, as well as the associated reagents. Thus, there is a need for more efficient systems for cell analysis.

SUMMARY OF THE INVENTION

The invention provides systems including apparatus, methods, compositions, and kits for multiplexed analysis of biological systems using nonpositional and/or positional arrays of coded carriers.

BRIEF DESCRIPTION OF THE DRAWINGS

FIG. 17 is a schematic view of a method for determining subcellular distribution of a cell component as a cell characteristic for multiplexed cell and modulator analysis, in accordance with aspects of the invention.

FIG. 18 is a schematic view of a method for measuring DNA content as a cell characteristic for multiplexed cell and modulator analysis, in accordance with aspects of the invention.

FIG. 19 is a schematic view of a method for measuring the number of nuclei per cell as a cell characteristic for multiplexed cell and modulator analysis, in accordance with aspects of the invention.

FIG. 20 is a schematic view of a method for measuring the presence and/or number of micronuclei as a cell characteristic for multiplexed cell and modulator analysis, in accordance with aspects of the invention.

FIG. 32 is a flowchart showing a current high-throughput proteomic approach to identify serum markers of interest.

FIG. 33 is a flowchart showing a multiple-disease high-throughput proteomics approach using coded carriers to identify serum markers of interest, in accordance with aspects of the invention.

FIG. 41 is a schematic view of a method for making coded carriers from film using a film/sample sandwich, in accordance with aspects of the invention.

FIG. 42 is a cross-sectional side view of the film/sample sandwich of FIG. 41, taken generally along line 42-42 in FIG. 41.

FIG. 43 is a schematic view of a method for producing plural carriers having a single code, in accordance with aspects of the invention.

FIG. 44 is a schematic view of a method for producing plural carriers having different codes, in accordance with aspects of the invention.

FIG. 45 is a top plan view of a carrier having a color code, in accordance with aspects of the invention.

DETAILED DESCRIPTION

The invention provides systems including apparatus, methods, compositions, and kits for multiplexed analysis of cells and/or cell-analysis materials using coded carriers, particularly in nonpositional arrays. These systems may provide a variety of benefits, for example, allowing multiple cell populations and/or cell-analysis materials to be tested and analyzed together in a single container. Coupled with ongoing improvements in microtiter plates, microfluidics, and robotics, these systems may increase throughput by expanding the number of cell types and cell parameters analyzed, and the number of cell-analysis materials, such as drug candidates, screened. Thus, the invention may be used to identify valuable therapeutic agents and to increase human understanding of cells, with concomitant benefits for treating human disease and improving human health. More generally, the invention may be used to identify cell types, ligands, or cell type-ligand combinations that suppress or enhance metabolic or physiological reactions of interest.

The invention may have a number of advantages over prior systems, potentially including (1) increased throughput due to multiplexing, (2) flexibility in the composition of arrays, (3) simplified handling, because there may be fewer sample containers since each container may contain many types of materials, (4) compatibility with existing assays and equipment, including fluid dispensers, sample handlers, and sample readers, (5) reduced consumption of expensive reagents, e.g., FISH in a tube, not on a slide, (6) increased information content due to higher density of different cell types, and (7) simultaneous testing of specificity and potency in a well.

Figure 1:
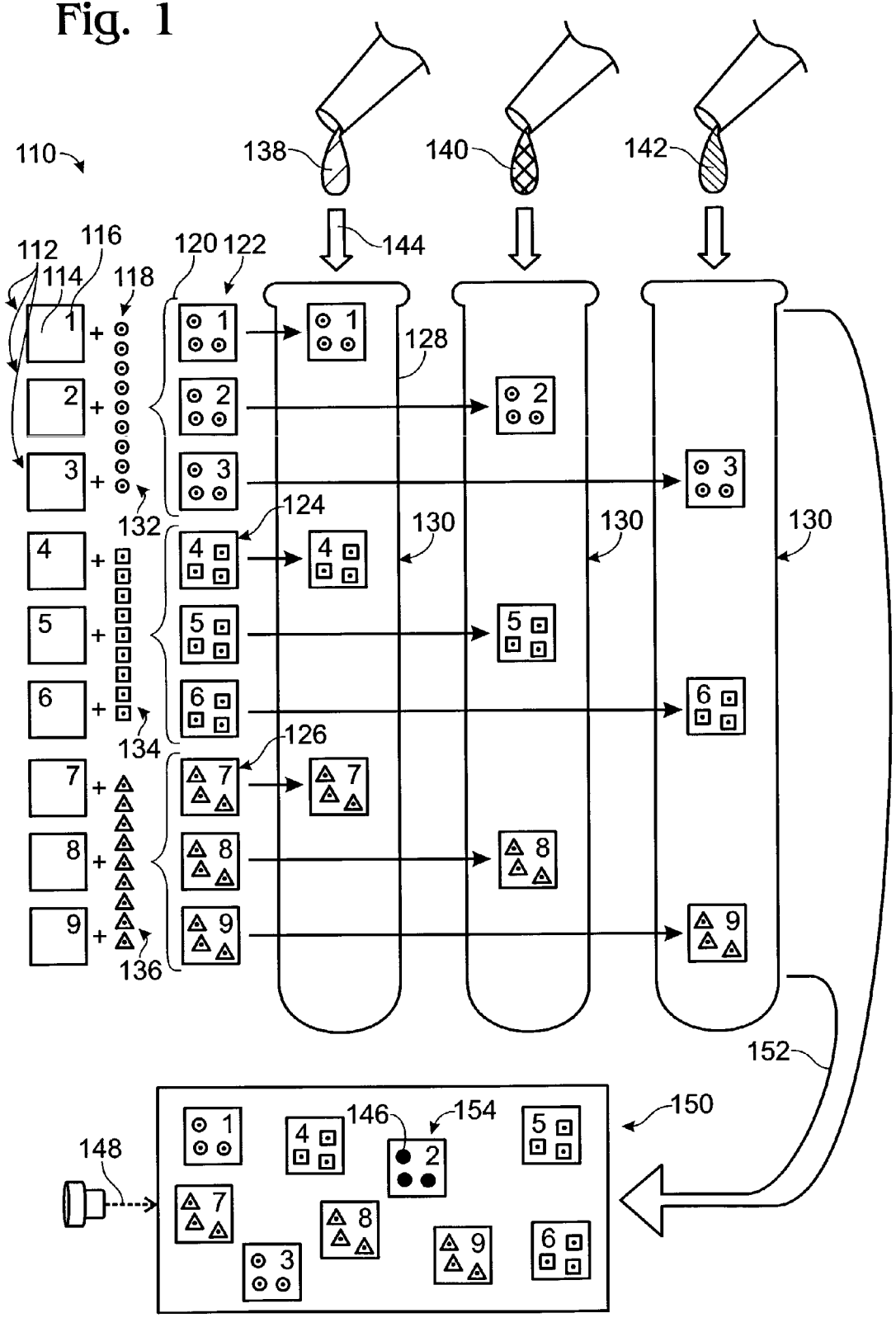
FIG. 1 is a schematic view of a system for multiplexed cell analysis using coded carriers, in accordance with aspects of the invention.

FIG. 1 shows a system 110 for multiplexed cell analysis using coded carriers 112, in accordance with aspects of the invention. Coded carrier 112 is a carrier 114 that includes a detectable code 116. The carrier provides a support structure with which cells 118 and/or cell-analysis materials may be associated, shown at 120, to form a carrier assembly 122. The association maintains a linkage between the code and the cells (and/or cell-analysis materials) during some or all of the analysis. Thus, the code may relate information about the cells, the cell-analysis materials, and/or other aspects of the analysis. Exemplary carriers, codes, cells, methods for associating cells and cell-analysis materials with carriers, and encoded information are described below, particularly in Sections I, II, III, V, and VII, respectively.

Carrier assemblies with distinct codes, such as assemblies 122, 124, and 126, may be combined at an assay site, generally in a container 128, to form a coded array 130. The coded array may be nonpositional, meaning that the carrier assemblies within the array may have an arbitrary or random distribution relative to one another. A nonpositional array may allow more than one distinct cell population, e.g., cells 132, 134, 136, to be treated, analyzed, and/or screened together. Thus, a library of cell populations and/or cell-analysis materials, with two or more member populations, may be formed as a nonpositional array. Exemplary coded nonpositional and/or positional arrays and libraries are described below, particularly in Sections VIII and IX.

Cells may be analyzed by exposing the cells to cell-analysis materials, such as modulators 138, 140, 142. Exposing, shown at 144, may test or allow interaction between the cells and the cell-analysis materials. Cell-analysis materials may include one or more (1) modulators, (2) ligands/receptors, (3) transfection materials, (4) cell selectors, (5) local capturing agents, (6) biological entities (such as cells, viruses, tissues, etc., and components thereof) and/or (7) labels. Modulators (1) and/or ligands/receptors (2) may alter the cells themselves, may physically interact with the cells, and/or may modulate or define interaction of the cells with other cell-analysis materials. Transfection materials (3) may introduce a foreign test material into the cells to affect and/or report one or more properties of the cells. Cell selectors (4) may purify, limit analysis to, and/or identify certain cells in a larger cell population. Local capturing agents (5) may allow analysis of components attached to, and/or released from, cells. Biological entities (6) also may function as cell-analysis material, for example, to carry and/or express members of a library of cell-analysis materials and/or to allow analysis of cell-cell interactions. Labels (7) may facilitate detection of cells, cell structures, cell components, and/or cell-analysis materials. Exemplary cell-analysis materials and methods of using cell-analysis materials are described below, particularly in Section IV.

The analysis may be determined by the choice of cell-analysis materials and the timing and duration of exposure of the cell-analysis materials to cells and/or carriers. Cell-analysis materials may be exposed to cells and/or carriers before, during, and/or after associating cells with the carriers. For example, exposure of cell-analysis materials to carriers before cell association may link the cell-analysis materials to the carriers in a cell-independent manner, termed pre-association. Thus, the code on each carrier may relate information about cell-analysis materials linked to the carriers, and a coded, nonpositional array of cell-analysis materials may be formed prior to cell association. The array may be considered a coded library of cell-analysis materials. Exemplary coded libraries of cell-analysis materials and methods of exposing and pre-associating are described below, particularly in Sections VI and IX.

Exposing cells to cell-analysis materials may produce or alter a detectable cell characteristic 146, such as the presence, absence, level, distribution, appearance, behavior, and/or other property of cell components, cell structures, or cells. Alternatively, or in addition, the characteristic may be the presence, absence, level, or functional consequences of interaction between cells and cell-analysis materials. Exemplary cell characteristics are described below, particularly in Section X.

Reading codes and measuring cell characteristics for the carrier assemblies, shown at 148, are performed as part of the analysis. These reading and measuring steps may be performed on each individual nonpositional coded array 130, or with appropriate code complexity, as shown here, on a nonpositional mixture 150 produced by combining nonpositional coded arrays, shown at 152. Reading a code and measuring a cell characteristic for a carrier assembly allows information related by the code to be linked to the cell characteristic. For example, as shown in FIG. 1, each code identifies the cell population (and cell type) 132, 134, or 136 associated with a particular carrier. Furthermore, each code identifies a modulator, 138, 140, or 142, to which the cells were exposed in each coded array. Thus, in this example, the altered cell characteristic 146 and code ("2") shared by carrier assembly 154 link cell type 132 and modulator 140 to the altered characteristic. Therefore, this exemplary analysis indicates that modulator 140 specifically modulates cell population 132, relative to cell populations 134 and 136. Exemplary methods for reading codes and measuring cell characteristics are described below, particularly in Section XI.

The following sections describe further aspects of the invention: (I) carriers; (II) codes; (III) cells; (IV) cell-analysis materials, including (A) modulators, (B) ligands/receptors, (C) transfection materials, (D) cell selectors, (E) local capturing agents, (F) biological entities, and (G) labels; (V) associating cells and cell-analysis materials with carriers; (VI) exposing cells and carriers to cell-analysis materials; (VII) encoded information; (VIII) arrays, (IX) libraries; (X) cell characteristics; (XI) measurement methods; and (XII) examples.

I. Carriers

Carriers generally comprise any structure capable of supporting a cell or a cell-analysis material in association with a code for a nonpositional and/or positional assay. The carriers may have any suitable size, shape, and composition, consistent with an ability to perform their intended function.

Carrier size may be selected based on competing considerations related to the behavior of cells, the manipulability of the carriers, and the nature of the assay. Larger carriers generally have a greater capacity for cells (and/or cell-analysis materials), and thus may be more effective for analyzing cells that rely on a community effect from nearby cells for carrier association or normal phenotypic behavior. Moreover, carriers typically must be at least as large as the molecules, cells, or other components that they support. However, smaller carriers may be more efficient in some aspects related to carrier handling and distribution in liquid. Specifically, smaller carriers may be resuspended more readily from a resting position in a container and may settle more slowly when suspended. Furthermore, smaller carriers may be transferred more easily as a suspension in liquid, for example, using a pipette. However, in some cases, such as analyses that include repeated washing steps, rapid carrier settling and less efficient resuspension may be desirable properties of larger carriers. Moreover, in other cases, such as optical analyses, the carriers preferably are larger than the wavelength of light but smaller than the field of view. Therefore, carrier size may be adjusted to an effective balance between these competing considerations based on the specific application. Preferred carriers for multiplexed cellular experiments are small, referred to as particles or microcarriers, typically in the range of about 10 microns to about 4 millimeters in length or diameter. One particularly preferred particle dimension is about 360 microns by 500 microns. Numerous applications of the invention may be carried out in microplates that have a density of 96, 386, or 1536 wells per microplate. When carrying out a multiplexed cellular experiment in a microplate well, the microcarriers must be small enough so that at least two or more microcarriers may be viewed in the well simultaneously. Therefore, the maximum size dimension for microcarriers may sometimes be dictated by the well dimension in a specific microplate configuration or density. On the lower end of the range, microcarriers should be large enough to support at least one cell. Therefore, microcarriers for multiplexed cellular experiments usually have an area of at least about 100 microns.

Carrier shape and composition may be determined by a similar interplay of competing considerations. Preferred shapes include at least substantially planar, for example, in the form of a wafer or sheet, and at least substantially cylindrical. Preferred materials include glass (such as sol-gels and ceramics, among others), composites, plastic, film, metal, matrices of biological materials, and/or combinations of these and/or other materials, including solids and/or gels, as described below.

Carriers may be made from glass, as described below in Example 13. Glass carriers are suitable for binding many types of cells and cell-analysis materials directly, without modification, because glass is hydrophilic and thus readily wetted. In addition, many types of glass show low absorbance and autofluorescence at visible and ultraviolet wavelengths typically used in optical assays. Exemplary materials include soda lime and borosilicate glass, among others.

Carriers also may be made from plastic. Plastic carriers are intrinsically less suitable than glass for binding cells or extracellular matrix material, because plastic is hydrophobic. However, plastic carriers may be rendered suitable for binding by treatment with an adherence promoter or cell selector, as described below. For example, plastics such as polystyrene can be derivatized by irradiation, chemical modification, or other methods to provide a more hydrophilic cell attachment structure. When cells are analyzed by fluorescence, fluorescence emission of some plastics may interfere with cell analysis. However, low-fluorescence plastic may be suitable for such an analysis. Exemplary materials include PERMANOX (Nalge Nunc International) or methacrylates, among others, for both cell association and fluorescence measurements. The components of a plastic that would affect fluorescence measurements are known generally by those skilled in the art.

Carriers also may be made from film, such as standard photographic film, as described below in Example 12.

Carriers, or portions thereof, such as an outer layer or an internal region, also may be made from a gel. For example, a gel coating may provide a suitable adhesion layer for cells, and an inner gel portion may carry cells or cell-analysis materials, or provide for better storage or handling characteristics. Exemplary materials include gelatin, agarose, polyacrylamide, and/or any other suitable gel-forming material.

Other exemplary carriers are described in the patents and patent applications identified above under Cross-References and incorporated herein by reference, including Ser. No. 09/549,970, filed Apr. 14, 2000; and Ser. No. 09/694,077, filed Oct. 19, 2000.

II. Codes

The coded carriers each include at least one code linked to the carrier. The code generally comprises any mechanism capable of distinguishing different carriers. The detectable code may be based on the size, shape, composition, and/or appearance of the particle, or portions thereof. The detectable code may be an optically detectable code or an optically detectable positional color code, among others. The code may appear (i.e., be repeated) at more than one position on the carrier, and two or more different codes, usable for two or more different purposes, may appear on the same carrier.

The code may be nonpositional. A nonpositional code relates to overall features and/or subfeatures of a carrier that are not defined by position within the carrier. These features and subfeatures may include particle size, shape, composition, and/or other detectable property. Exemplary nonpositional codes may include using at least two different materials, where the materials differ in absorption, fluorescence, intrinsic polarization, diffraction, reflectivity, and/or any other measurably distinct property or characteristic. These nonpositional codes may be read by determining the presence and/or other properties of signals from the different materials, for example, by measuring intensity as a function of wavelength.

Alternatively, or in addition, the code may be positional. A positional code is based on the presence, identities, amounts, and/or properties of materials (or a single material) at different positions in the particle. These positions, or code elements, may be random and/or predefined, and may be dependent upon the physical positioning of the code elements on the carrier and/or the positions of individual code elements relative to each other. Exemplary positional codes may include positioning different amounts and/or types of materials at different positions in or on a particle, for example, at regions, spots, lines, concentric circles, symbols, shapes, and the like. Each position may provide a measurable optical property, with the positions together defining an optical code. For example, the optical code may include code elements with distinct wavelength-dependent properties, such as distinct absorption, reflectivity, excitation, or emission spectra, referred to as a color code. The code may be a spatial code where information is arrayed in ordered or unordered, spatially distinct compartments. Other positional codes may detectably alter the property of a single material at different positions, such as through changes in surface properties of the material. These changes may produce distinct optical properties of the material at these positions, for example, effectively creating an interference filter, among others. Positional codes may be read by determining the identities, amounts, and/or other properties of the code materials at each code position, for example, by measuring intensity as a function of position. The amounts, positions, and/or values may be relative or absolute. Moreover, different types of codes may be combined to form yet other types of codes.

Positional coding systems permit large numbers of identifying codes to be displayed efficiently in small areas, making it possible to use smaller carrier particles and smaller sample sizes. Size limitations may be particularly important for microarray experiments using costly reagents or for high-throughput applications.

The code may be positioned at any suitable location on the carrier, including the entire carrier or a portion or portions thereof. A code positioned only at a portion of the carrier may divide the carrier into at least one coding region and at least one noncoding region. Such a code may be contiguous or include noncontiguous coding portions. The noncontiguous coding portions may include code elements that are separated by one or more assay or measuring portions, which are designed to a carry sample. A carrier may also include orientation or alignment marks that may be used independent of the code to orient or align the carrier before reading and/or interpreting the code. Suitable orientation marks include spots, crosses, and/or other shapes or patterns of shapes disposed at defined positions on the particle relative to the coding and/or noncoding regions.

The code also may be positioned at any suitable location relative to the cells and/or cell analysis materials used in the assay. Thus, the code and the cells (and/or other materials) may be positioned at nonoverlapping locations on the carrier (including opposite sides), at overlapping locations on the carrier, or at coextensive locations on the carrier.

Exemplary carriers with positional codes are described below in Examples 12, 13, and 15 and in the patents and patent applications identified above under Cross-References and incorporated herein by reference, including Ser. No. 09/549,970, filed Apr. 14, 2000; and Ser. No. 09/694,077, filed Oct. 19, 2000.

III. Cells

Cells may be analyzed, or used for an analysis, using coded carriers. Cells generally include any biological entity that is at least partially bounded by a membrane bilayer and is capable of replication and division into two or more entities, or is a descendant of such an entity. The invention also may be practiced using biological materials that are derived from cells (see below) and/or biological entities that infect cells, such as viruses, phages, viroids, and prions.

Examples of cells may include eukaryotic cells, i.e., cells with a nucleus, including cells from animals, plants, fungi, yeast, and protozoans; anucleate or mutant derivatives or descendants thereof, such as reticulocytes and mature red blood cells, among others; enucleated derivatives thereof; and fusions between any the preceding. In addition, cells may include gametes, such as eggs, sperm, and the like. Cells also may include prokaryotic organisms, such as bacteria and archaebacteria.

Examples of biological materials derived from cells may include extracts, lysates, fractions, and organelles, among others. Organelles may include nuclei, nucleoli, mitochondria, endosomes, the Golgi apparatus, peroxisomes, lysosomes, endoplasmic reticulum, chloroplasts, cytoskeletal networks, nuclear matrix, nuclear lamina, axons, dendritic processes, membranes. Extracts and lysates may include nuclear extracts, organelle extracts and fractions thereof, whole cell extracts, tissue homogenates, and cytosol. Biological materials also may include heterogeneous macromolecular assemblies, such as ribosomes, spliceosomes, nuclear pores, DNA polymerase complexes, and RNA polymerase complexes.

A. Cells from Organisms

Suitable cells may be derived from any suitable organism, including any organism that is studied for research (such as basic, clinical, and biotechnology research, among others), drug design, drug discovery, and/or other economic, political, or humanitarian reasons. Exemplary organisms include mammals, such as apes, cats, cows, dogs, horses, humans, monkeys, mice, pigs, and sheep, among others. Exemplary organisms also include nonmammalian vertebrates, such as birds, reptiles, amphibians (e.g., frogs such as Xenopus laevis), and fish (e.g., trout, salmon, goldfish, and zebrafish), among others. Exemplary organisms also include nonmammalian invertebrates, such as species of Drosophila (e.g., *D. melanogaster* and *D. simulans*), nematodes (e.g., *C. elegans*), sea urchins (e.g., *Strongylocentrotus purpuratus*), and slime molds (e.g., *Dictyostelium discoideum*). Exemplary organisms also include single-celled eukaryotic organisms, such as yeast (e.g., *Saccharomyces cerevisiae, Schizosaccharomyces pombe, Pichia pastoris*, and *Candida albicans*) and protozoans (e.g., pathogenic and nonpathogenic protozoans). Exemplary organisms also include plants, such as *Arabidopsis thaliana*, rice, corn, potato, bean, loblolly pine, as well as nonvascular plants.

Suitable cells may be primary cells obtained directly from a wild-type, mutant, transgenic, chimeric zygote, morula, blastula, embryo, fetus, newborn, juvenile, adult, or other developmental stage of an organism. The primary cells may originate from distinct cell types, tissues, organs, or regions of the organism, or may be mixtures thereof. Examples include blood stem cells, B- and T-lymphocytes, red blood cells, neutrophils, eosinophils, mast cells, granulocytes, megakaryocytes, macrophages, adipose cells, glial cells, astrocytes, neuroblasts, neurons, skeletal myoblasts or myotubes, smooth muscle myoblasts, cardiac myoblasts, fibroblasts, osteoblasts, osteocytes, endocrine cells, exocrine cells, endothelial cells, keratinocytes, chondrocytes, cells derived from endoderm, mesoderm, or ectoderm, and/or extraembryonic derivatives, such as trophoblasts.

B. Cells from Tissue

Suitable cells may be obtained from a tissue or tissues from any source. Tissue generally comprises any group of cells in temporary or stable spatial proximity in an organism, or a cultured explant thereof. This spatial proximity may occur naturally and/or artificially and may represent a native or normal state and/or an induced or diseased state, among others. Artificial proximity may include transplanted, implanted, and/or grafted tissue (including organ or tissue transplants, xenografts, allografts, and the like) and tissue moved within an individual organism, such as a skin graft, among others. Diseased tissue includes tissue that is abnormal due to a (1) genetic defect; (2) an environmental insult, such as a pollutant, a toxin, or radiation; (3) uncontrolled growth; (4) abnormal differentiation; (5) abnormal cell migration; (6) infection, such as with a virus, bacteria, protozoan, yeast, fungus, and/or parasite; or (7) any combination thereof. An exemplary diseased tissue suitable for use in the invention is tumor material obtained surgically or from a fluid aspirate, for example, from a needle biopsy.

Tissue may be from a wild-type, mutant, transgenic, or chimeric zygote, morula, blastula, embryo, fetus, newborn, juvenile, adolescent, or adult organism. Examples of suitable postnatal tissues include (1) muscle, including cardiac, smooth, and skeletal muscle; (2) neural tissue from the central or peripheral nervous system, such as spinal cord or brain; (3) other cardiac tissue; (4) kidney; (5) liver; (6) spleen; (7) any part of the digestive system, including esophagus, stomach, small and large intestines, and colon; (8) pancreas; (9) gall bladder; (10) circulatory system tissue, including heart, veins and arteries, and cells of the hematopoietic system; (11) immune tissue, such as thymus and lymph nodes; (12) adrenal glands; (13) bone; (14) cartilage; and (15) any epithelial tissue, such as mammary epithelium, among others. Tissue also includes natural and artificial combinations of any of the above.

Tissue may be at least partially or completely disaggregated into individual cells before use with coded carriers or may be applied to the carriers whole or in sections. Exemplary methods for associating tissue with carriers and for forming coded tissue arrays are described below, particularly in Example 5.

C. Cells for Clinical Diagnosis

Some applications of the invention are suited for clinical diagnosis, using cells derived from a prenatal or postnatal human or other animal. Examples of prenatal cells include those obtained from amniotic fluid, a blastomere, chorionic villi, fetal blood, and other fetal tissue. Examples of postnatal cells include those obtained from a bone marrow aspirate, lymph, whole blood, blood serum, blood plasma, pleural effusion, skin biopsy, tumor biopsy, or a surgical procedure. Additional examples of postnatal cells include those obtained from other bodily fluids and/or secretions, such as urine, feces, saliva, mucus, phlegm, tears, perspiration, semen, spinal fluid, milk, sputum, and the like, or from tissue, as described above.

D. Cells From Established Cell Lines

Rather than from primary cells and tissue, or cultured derivatives thereof, suitable cells may be obtained from established cell lines. These established lines may be produced by any suitable method, including viral, oncogenic, physical, chemical, mutagenic, spontaneous, and/or transgenic transformation. In addition, cells may include characterized or uncharacterized derivatives of established cell lines that have been modified by any suitable method, such as genetic modification (e.g., by physical and/or chemical treatment, irradiation, transfection, infection, or injection) and/or epigenetic modification (e.g., by methylation or other molecular modification, transposon function, chromosome imprinting, yeast mating type switching, and/or telomeric silencing).

IV. Cell-Analysis Materials

Cells may be exposed to one or more cell-analysis materials to alter, label, analyze and/or isolate the cells and/or the cell-analysis materials. Cell-analysis materials generally comprise any material or condition that may interact with cells, including (A) modulators, (B) ligands/receptors, (C) transfection materials, (D) cell selectors, (E) local capturing agents, (F) biological entities, and (G) labels, among others, as described below.

A. Modulators

Cell analysis materials may include modulators, which also are referred to here as biological modifiers. A modulator generally comprises any agent(s) or condition(s) that has the potential to affect a characteristic of a cell or an interaction between two or more cells or subcellular components. A phenotypic modulator may affect a measurable cell characteristic, as described below in Section X. An interaction modulator may affect an interaction between cells, cellular components, noncellular entities, and/or other species, such as pairing between a receptor and a ligand. Modulators may be chemical, biological, and/or physical, as described below.

Modulators may be chemical modulators, including any synthetic or naturally occurring element, molecule, polymer, covalently linked molecules or polymers, noncovalently linked molecules or polymers, or heterogeneous multi-constituent assembly, or mixtures thereof Examples include compounds with known or suspected biological activity; compound libraries for drug screens; single-, double- or triple-stranded, linear, branched, or circular, naturally occurring or synthetic DNA or RNA molecules; synthetic antisense oligonucleotides, including modified derivatives engineered for their efficacy, such as peptide nucleic acids; peptides or peptide libraries; and proteins or protein mixtures. Chemical modulators also may include general media composition, such as ambient gas composition, ionic strength, or nutrient mixture.

Modulators also may be biological modulators, such as viruses, prokaryotic organisms including pathogens, cell fragments, or extracts from cells, tissues, organisms, or embryos. Other biological modulators may include an expression library. Expression libraries generally comprise any library formed from cells, where members of the library express a foreign material or overexpress an endogenous material. Examples of expression libraries include phage libraries, such as phage display libraries that exhibit antibodies, receptors, or ligands; bacterial libraries in which foreign nucleic acid sequences are expressed; and eukaryotic cell libraries formed from cDNA or genomic expression libraries or other expression vectors.

Modulators also may be physical modulators. Physical modulators include any environmental condition or treatment, such as variation of temperature, pressure, proximity to an object, gravitational field strength or orientation, electromagnetic field strength or orientation, electromagnetic radiation wavelength or intensity (such as X-rays, gamma-rays, ultraviolet, visible and infrared light, and microwaves), or identity, energy, or frequency of subatomic particle bombardment.

Some modulators, particularly chemical and biological modulators, may act near or at the surface of cells, for example, by binding to a cell-surface receptor, or may be transported inside cells by any mechanism, for example, through a receptor uptake mechanism, a transporter, a channel, nonspecific endocytosis, or by passively partitioning into the cell. Alternatively, such modulators may be combined with any suitable transport agent to facilitate introduction into cells. Examples of such transport agents include an injector, a calcium phosphate co-precipitate, a liposome, a virus, polyethylene glycol, heat, shock loading, and/or electroporation.

B. Lipands/Receptors

Cell-analysis materials also may include ligands and/or receptors. A ligand and a receptor generally comprise any high affinity specific binding pair of physically interacting partners. Exemplary receptor and ligand pairs are listed in Table 1.

TABLE 1

Representative Receptor/Ligand Pairs

| Receptor | Ligand |
|---|---|
| cell-surface receptor | secreted hormone or cell-associated ligand |
| nuclear receptor | nuclear hormone or DNA |
| antibody | antigen |
| avidin or streptavidin | biotin |
| lectin or carbohydrate receptor | carbohydrate |
| DNA | antisense DNA; protein |
| RNA | antisense or other RNA; protein |
| enzyme | enzyme substrate or regulator |
| histidine | NTA (nitrilotriacetic acid) |
| IgG | protein A or protein G |

Ligands may be physiological ligands that normally bind and function with naturally occurring receptors. Alternatively, ligands and/or receptors may be derived synthetically, and may have no normal physiological role. Ligands may (1) promote a phenotypic response as a result of binding to a receptor, acting as agonists; (2) promote no phenotypic response as a result of binding, thus acting as antagonists or simple binding partners; or (3) promote a mixed agonist/antagonist response.

C. Transfection Materials

Cell-analysis materials also may include one or more transfection materials, which also are referred to here as transfectables. Transfection materials generally comprise any naturally or synthetically produced material capable of being introduced into cells. Transfection materials may produce, modify, and/or report on a cell characteristic, or report a cell characteristic.

Transfection materials may be introduced into cells using any transport agents or treatments capable of promoting or facilitating the uptake of transfection materials into the cells. Exemplary transport agents/treatments include an injector; a particulate carrier, such as a calcium phosphate co-precipitate; a vesicle or micelle, such as a liposome; a virus or phage; polyethylene glycol; heat; shock loading; and/or electroporation.

Transfection on coded carriers may include classical transfection or reverse transfection. In classical transfection, cells are associated with coded carriers, and then exposed to transfection materials. In reverse transfection, transfection materials are pre-associated with coded carriers, and then cells are exposed to the transfection materials, and generally associated with, the coded carriers. Reverse transfection is described below in Example 9.

Transfection may be stable or transient. Stable transfection results in stable maintenance of the transfected materials in cells during division, either through genome integration or episomal replication, among others. Transient transfection generally introduces transfected material temporarily. Transiently introduced material typically is diluted and/or degraded with continued cell incubation.

Transfection materials typically are genetic materials (nucleic acids) or mixtures of genetic materials, such as deoxyribonucleotide (DNA), ribonucleotide (RNA) polymers, or synthetic derivatives thereof. Transfection materials also may be nucleic acid derivatives, such as peptide nucleic acids (PNAs), that is, nucleotides joined by peptide bonds. Transfection materials also may be proteins or other biomolecules.

The transfection material may be, or may encode and direct expression of, an effector and/or a reporter, as described below. An effector or reporter gene may include DNA and/or RNA and be included in a viral vector or a shuttle vector capable of being propagated in bacteria or other nonvertebrate cells. The vector may include additional genes and control sequences to provide a selectable marker(s)/drug resistance, replication origin(s), effector expression, and the like. An exemplary effector and/or reporter gene vector is a DNA plasmid with features that function in eukaryotic and prokaryotic cells.

Each transfection material may include a mixture of transfectables exposed to cells, and in the case of reverse-transfection, associated with each carrier. For example, cells may be exposed to a genetic material that encodes a phenotypic effector and one or more reporter genes. Because cells generally may be co-transfected with several transfection materials, any combination of transfection materials may be suitable.

i. Effectors

An effector generally comprises any material capable of inducing a detectable response, such as a phenotypic change and/or a binding interaction, in a cell population. The effector may be protein, RNA, DNA, or a chemical entity (or entities).

Effector proteins may be full-length or fragments of full-length proteins, either wild type or mutant. Exemplary effector proteins include receptors, ligands, enzymes, substrates, transporters, transcription factors, structural proteins, regulators, and the like.

Effector RNAs may be expressed from a transfected nucleic acid or may be directly transfected into cells. Exemplary effector RNAs include antisense RNAs, such as plasmid-encoded antisense transcripts that are complementary to sense transcripts. Alternatively, antisense RNAs may be directly transfected into cells and may include synthetic RNA derivatives. In addition, effector RNAs may include sense RNAs, such as viral RNAs and/or RNAs that encode proteins; structural RNAs, such as rRNAs, tRNAs, snRNAs, hnRNAs, and RNAs in other ribonucleoprotein complexes; and ribozymes. Furthermore, effector RNAs may include materials that initiate and/or mediate PTGS (post transcriptional gene silencing), termed PTGS agents. PTGS agents are typically double-stranded RNA derivatives (including RNAi and small interfering RNA (siRNA), among others) that are synthetically or enzymatically derived, and/or encoded by transfected nucleic acid. Encoded double-stranded RNAs may be expressed as inverted repeats on a transcript that self-anneal, or as separate transcripts that anneal intermolecularly. Double-stranded RNAs may be fully duplexed or partially single-stranded and may have any length effective in initiating or mediating PTGS.

Effector DNAs may be transfected into cells. Exemplary effector DNAs include synthetic antisense oligonucleotides and oligonucleotide derivatives. Other exemplary effector DNAs may include structural or enzymatic DNAs. Furthermore, effector DNAs may include protein-binding sites for transcription factors, for example, to titrate such factors from endogenous sites.

ii. Reporters

A reporter gene generally comprises any polynucleotide capable of reporting directly or indirectly on an aspect of an assay. The reporter gene typically includes (1) a regulatory region, and (2) a transcribed region encoding an expressed RNA and/or protein reporter.

The regulatory region may include any control sequences that help to determine frequency or speed of reporter gene transcriptional initiation, elongation, and/or termination, and/or related aspects of translation. In turn, the control sequence may include a complex or simple enhancer, TATA box, initiator site, transcription factor binding element, RNA structural determinant, and/or RNA polymerase or cofactor interaction site, among others. Exemplary control sequences include promoters and promoter fragments from characterized genes and/or viruses (beta-actin, CMV, RSV, SV40, and so on). Other exemplary control sequences include synthetic binding sites for regulated or constitutively active transcription factors, such as nuclear hormone receptors (ecdysone-, dexamethasone-, or estrogen-responsive, among others), interferon regulated factors, metal response factors, SP1, AP-1, NF-kappaB, and the like. Control sequences also may respond to a receptor class, such as G-protein coupled receptors (i.e., GPCRs, or "seven-pass transmembrane proteins"), interleukin receptors, and/or nuclear hormone receptors, among others.

The reporter material may be an RNA and/or a protein that reports or measures a characteristic of transfected cells.

Reporter RNAs may be coding sequences, noncoding sequences, and/or arbitrary sequences. The level or activity of reporter proteins also may report a cell characteristic. A cell characteristic also may be revealed by changes in the physical location of a protein or other reporter within or about a cell. Exemplary reporter proteins are readily detectable by intrinsic fluorescence, enzyme activity, and/or one or more other measurable properties. Examples of reporter proteins include green fluorescent protein (GFP), beta-galactosidase, chloramphenicol acetyltransferase, and luciferase.

D. Cell Selectors

Cell-analysis materials also may include cell selectors. A cell selector generally comprises any cell-analysis material that differentially promotes association of one cell type over another with a coded carrier. Differential cell association may be promoted by a cell selector based on any suitable chemical, physical, or biological property of a cell, such as level of a cell surface (or internal) molecule or complex, local or overall charge distribution, local or overall hydrophobicity, surface geometry, and/or ferromagnetic or paramagnetic properties. Cell surface molecules that may be used as selection targets include receptors and/or associated proteins, transporters, channels, or other transmembrane proteins, glycoproteins, proteoglycans, and glycans, among others. Exemplary cell selectors may include an antibody that binds to a cell-restricted surface molecule or complex, a ligand specific for a cell surface receptor or extracellular matrix protein, or a lectin that shows cell-selective binding.

Cell selectors may offer a number of advantages in cell analysis. For example, cell selectors may be used to purify a specific cell type from a cell mixture, allowing the code on each carrier to identify the type(s) or other aspects of the cells present on the carrier. In addition, cell selectors may allow a cell type, present in a cell mixture, to be analyzed without a separate purification step. As a result, cell selectors may facilitate multiplexed analysis of plural cell types, such as cell lineages present in blood.

Exemplary methods of using cell selectors are described below, particularly in Examples 8 and 10.

E. Local Capturing Agents

Cell-analysis materials also may include local capturing agents. A local capturing agent generally comprises any cell-analysis material linked to a coded carrier that allows detection of a component released from a cell associated with that coded carrier. The detected component may include any component that is released to the cell exterior by secretion or other release mechanism, including vesicle fusion, direct transport, or diffusion through the membrane, or by membrane disruption, such as through cell death or chemical treatment. Examples of components released by vesicle fusion include hormones or regulatory molecules that act on cells in an autocrine, paracrine, or endocrine fashion. Such regulatory molecules may include but are not limited to any released protein or peptide, referred to here as a cytokine, that affects the behavior of cells. Examples of cytokines include interleukins (IL-1, -2, etc.), interferons (alpha, beta, and gamma), tumor necrosis factor, GM-CSF, fibroblast growth factors (FGF- 1, etc.), insulin, calcitonin, vasoactive intestinal peptide, oxytocin, other neuropeptides, and the like. Released components also may include nonprotein messengers (such as steroid hormones, retinoids, thyroid hormones, prostaglandins, lipid derivatives, cyclic nucleotides, inorganic ions, etc.), and neurotransmitters (such as catecholamines, dopamine, and serotonin). Other examples of released components include viruses, viral fragments, viral components, or prokaryotic or eukaryotic pathogens, parasites, or symbionts.

The local capturing agent may be a binding agent that selectively binds a released component, and/or the capturing agent may respond to a released component in a detectable fashion. A capturing agent may preferentially bind or capture released components from cells on the coded carrier due to the proximity of the cells to the capturing agent. An exemplary binding agent may be an antibody that recognizes an epitope on a released component. When complexed with the antibody, the released component then may be detected by any suitable means, such as a distinct epitope not bound by the antibody. In general, the capture of a released component may be detected by any change in the local capturing agent that is at least partially determined by the released component, such as changes in capturing agent conformation, covalent modification, or addition of an available epitope or other detectable region or activity that is contributed by the released component. The detection of molecules secreted by cells may be done in situ, with the secreted product being detected in or around the cell through antibody capture. This method may be more sensitive than measuring the secreted product in the growth media of cells, and may provide secretion information for individual cells associated with the carrier.

Exemplary methods of using local capturing agents linked to coded carriers are described below, particularly in Example 10.

F. Biological Entities

Cell-analysis materials also may include biological entities. Biological entities, referred to as "cells", may include whole cells, tissues, viruses, phages, and/or modified derivatives, fragments or extracts thereof. Biological entities may function as modulators, ligands, receptors, cell selectors, and/or labels, as described below, particularly in Section IV(F). Biological entities also may function as expression vehicles for libraries of modulators and/or ligands, also as described below, particularly in Section IV(A).

Biological entities may facilitate cell analysis by any suitable mechanism. The biological entities may be vehicles for expressing a suitable library, such as phage, bacterial, or eukaryotic cell expression and/or display libraries. Biological entities also may produce a carrier-restricted cell-analysis material, such as a secreted modulator that may affect a cell population being analyzed on the carrier.

Suitable biological entities are described elsewhere in the Detailed Description, particularly in Section III.

G. Labels

Cell-analysis materials also may include labels. Labels generally comprise reagents whose presence and/or properties provide a measure of a cell characteristic. Here, reagents may include substances used to detect, measure, examine, or produce other substances, and properties may include a response to an external stimulus, such as absorption or photoluminescence in response to illumination with suitable light. Cells may be exposed to and/or reacted with one or more labels to allow detection, quantification, localization, and/or analysis of properties of cellular components, subcellular structures, and/or cells. Labels may selectively bind to, and/or react with, components or structures in, on, and/or around cells. Suitable labels may be directly detectable in unmodified form, or may be covalently or noncovalently linked to detectable tags, either through separate modification or through exposure to the tags during cell analysis. Exemplary labels (or tags) are optically detectable and include dyes, stains, modified DNA or RNA molecules, antibodies, ligands, and/or polynucleotide aptomers, among others.

The following sections describe three selected but exemplary topics relating to labeling: (i) DNA and RNA labels, describing strategies for labeling DNA and/or RNA and their utility, (ii) antibody labels, describing the use of antibodies as labels for immunoreactive cellular components, and (iii) miscellaneous labels, describing several relatively nonspecific strategies for measurement of cell characteristics.

i. DNA and RNA Labels

The distribution and abundance of total DNA or RNA in cells may be measured using any suitable label, such as dyes. Typically, dyes bind to double-stranded DNA or RNA by intercalation into the double helix or interaction in the minor groove. Suitable dyes are available from Molecular Probes, Inc., of Eugene, Oregon and may include DAPI, Hoechst 33258, ethidium bromide, propidium iodide, and/or ethidium homodimer, among others.

The frequency, abundance, and subcellular distribution of specific chromosomes, subchromosomal regions, genes, or other nucleotide sequences typically may be measured by hybridization of a complementary polynucleotide to a single-stranded region of DNA. The complementary polynucleotide may include DNA, RNA, or related nucleic acids with modified bases, sugar residues, or phosphate backbones, such as peptide nucleic acids. Furthermore, the polynucleotide introduced during labeling may be conjugated to an optically detectable material, such as a fluorescent dye, or may be indirectly measured with secondary reagents. Typically, DNA and other polynucleotides, such as RNA, may be rendered optically detectable by fluorescence in situ hybridization (FISH). Reagents suitable for these purposes are available from many commercial sources, including BioGenex Laboratories, Inc. of San Ramon, Calif.; DAKO Corporation of Carpinteria, Calif.; Vysis, Inc. of Downers Grove, Ill.; ID Labs Biotechnology of London, United Kingdom; Cytocell Ltd. of Danbury, England; Cambio of Cambridge, United Kingdom; and Metasystems of Altlussheim, Germany.

For prenatal diagnosis, microdeletion syndromes may be characterized by reacting with a suitable complementary polynucleotide. Examples of microdeletion syndromes that may be detectable with the invention include CHARGE Sequence, Cri du chat, DiGeorge syndrome, Miller-Dieker syndrome, Smith-Magenis syndrome, Velocardiofacial syndrome, Williams syndrome, and/or Wolf Syndrome.

Analysis of specific genes through hybridizing a complementary polynucleotide also may provide a cell characteristic. This measure may be used for genotyping or otherwise characterizing cells. For example, it may be used as a genotyping strategy to identify the copy number of a DNA region, for example, to determine the frequency with which a specific gene is diploid, monoploid, or aneuploid in cells. In addition, it may be used to determine gene rearrangement, deletion, or amplification. Amplification, rearrangement and/or deletion of specific genes in tumors, including tumor promoters or suppressors, such as AML1, APC, ATM, ATR, BAX, BCL2, BRCA1, BRCA2, CDC2L1, CDH1, CDH13, CDKN1A or B, CDKN2A-D, CMAR, C-MYC, DAN, DBCCR1, DCC, DLC1, DPC4, ERBB2, ERCC1, EXT1, EXT3, FHIT, FOS, FOSB, HER-2/NEU, H-RAS, ID3, ING1, JUN, KIT, K-RAS, LEU1, LEU2, MCC, MEN1, MSH1, MSH3, MSH 6, MTS1, NF2, N-MYC, N-RAS, PMS1, P73, PPR2R1B, PRLTS, PTEN, RB1, RB2, SMAD2, SMAD4, STK11/LKB11, TEL, TNFR2, TOP1, TP53, TSC2, VHL, WT1, WT2, XPA, XPC, and/or XRCC 1, may provide an indicator of cancer progression, severity, and in some cases, an appropriate treatment.

RNA may be measured indirectly by hybridization methods to allow measurement of a cell characteristic. Specific RNA sequences may be measured after reacting with complementary polynucleotide material, using methods similar to those used for DNA detection.

Exemplary methods for using DNA and/or RNA labels are described in Examples 3 and 4, and elsewhere in this Detailed Description.

ii. Antibody Labels

Antibodies may be used as labels, or a component thereof. Antibodies developed against a wide variety of biomolecules may be suitable, including antibodies reactive with DNA; RNA; specific proteins, including covalently specific derivatives produced by phosphorylation, ubiquitinylation, farnesylation, glycosylation, methylation, acetylation, sulfation, proline or lysine hydroxylation, carboxy terminal amidation, and gamma-carboxylation; lipids and specific phospholipids; hormones; signaling molecules; and specific sugars and polysaccharides. Antibodies used for labeling may include a monoclonal antibody produced by any suitable method, such as by a hybridoma in culture, as an Ascites tumor in a nude mouse, or from cloned DNA by expression in bacteria, such as $E. coli$, or in yeast. Alternatively, the antibody may be a polyclonal antibody produced by immunization of any organism with an immune system capable of producing antibodies. Suitable organisms include camel, cow, donkey, goat, guinea pig, horse, monkey, mouse, pig, rabbit, rat, and sheep, among others.

The binding of antibodies to a target compound in a cell population may be detected using any suitable mechanism. For example, antibodies that bind to the target, i.e., primary antibodies, may be directly conjugated to a detectable material, such as a fluorescent dye or enzyme conjugate. Alternatively, antibodies that bind to the target may be measured indirectly, using a secondary reagent. For example, a secondary antibody or other reagent capable of binding the primary antibody may include a conjugated optically detectable material. Other variations of antibody detection may be particularly suited for amplifying weak signals or for use with biotin- or digoxigenin-conjugated primary or secondary antibodies.

More generally, any composition with binding selectivity may be useful as labeling component. Examples include proteins, peptides, and nucleotide aptomers produced by phage display, a two hybrid system, a split hybrid system, a selected and amplified binding site selection (SAAB), or any other in vitro or in vivo binding selection assay or system. These reagents may be inherently optically detectable, conjugated to an optically detectable material, or indirectly measured with additional reagents. Here, binding selectivity or binding specificity generally means binding to a specific binding partner to the exclusion of binding to most other moieties. Specific binding can be characterized by a binding coefficient. Generally, specific binding coefficients range from $10^{-4}$ M to $10^{-12}$ M and lower, and preferred specific binding coefficients range from $10^{-8}$ or $10^{-9}$ M to $10^{-12}$ M and lower.

iii. Miscellaneous Labels

Labels also may include reagents or other species that allow measurement of a cell characteristic via mechanisms other than selective binding, such as selective partitioning, selective transport, selective detectability, and/or metabolic labeling, among others.

Labels that exhibit selective partitioning preferentially partition into a specific subcellular environment, but without high affinity binding to specific biomolecules in the cell population. For example, membrane dyes partition preferentially into the hydrophobic environment of the membrane interior.

Labels that exhibit selective transport are preferentially transported inside the cell or to a subcellular compartment. These labels are useful in identifying the morphology, integrity, activity, or frequency of a subcellular compartment, or the activity of a transport pathway.

Labels that exhibit selective detectability are detectable only under certain environmental conditions. For example, a lysosomal indicator is optically detectable under the low pH conditions of the lysosome, but not elsewhere in the cell.

Labels that exhibit sensitivity to a metabolic process may be used to measure the presence and/or activity of the process in cells. For example, a label such as a radiolabel may be incorporated into a material in a cell by a metabolic process, such as a synthetic pathway. Alternatively, a label may be rendered optically detectable by a metabolic process in cells, thus becoming directly detectable.

V. Associating Cells and Cell-Analysis Materials with Carriers

Cells and/or cell-analysis materials may be associated with a carrier, thus linking a code on the carrier to the cells and/or cell-analysis materials. The association between cells or cell-analysis materials and a carrier generally comprises any stable or semi-stable interaction between the carrier and the cells or cell-analysis materials that results in effective adhesion or attachment during an analysis. A group of one or more cells, referred to as a cell population, and/or one or more cell-analysis materials may be associated with a carrier to produce a carrier assembly. This association may be direct or indirect, and may include linkage, attachment, or adhesion. We hereafter use the terms "association and "binding" interchangeably to mean the association of cells or cell-analysis materials with a carrier. Binding may be mediated by any suitable mechanism, including electrostatic interactions, covalent bonding, ionic bonding, hydrogen bonding, van der Waals interactions, and/or hydrophobic-hydrophilic interactions, among others. In general, binding may be facilitated by the appropriate selection, treatment, and/or modification of the carrier, cells, cell-analysis materials, or a suitable combination thereof.

Binding may be facilitated by appropriate selection of the carrier material, geometry, and association region, for example, as described above in Section I and below in Examples 12, 13, and 15. Cells and cell-analysis materials may associate with external or internal regions of carriers. Thus, carriers may include a relatively flat or gently contoured external binding surface, so that cells may bind. Moreover, carriers may include a modifiable binding surface, so that the surface may be treated or composed (for example, using a sol-gel) as desired to promote binding of cells or cell-analysis materials. Alternatively, the carrier may be a porous material, such as a gel or porous polymer, which allows cells or cell-analysis materials to migrate inside or to be directly included in the interior of the carrier.

Binding may be facilitated by appropriate treatment of the carriers, either before or after combination with cells or cell-analysis materials. Suitable treatments may include chemical reaction, charge modification, temperature changes, light, radiation, and/or desiccation, among others. Thus, in some applications, the carrier surface may be pretreated or otherwise modified so that electrostatic or, in given cases, van der Waals or covalent binding of cells or cell-analysis materials is promoted. For example, the binding surface may be coated with an adhesion promoter, such as poly-L-lysine, poly-D-lysine, gelatin, collagen, laminin, fibronectin, proteoglycans, polyethylenimine, albumen, BIOMATRIX EHS (Nunc Nalge International), BIOBOND (Electron Microscopy Services, Inc.), CELL-TAK, and/or MATRIGEL (both from Becton-Dickinson), or an extract from a cell, tissue, or embryo, among others. Alternatively, cells may adhere indirectly through an associated layer of cells, for example, fibroblasts used to culture embryonic stem cells. Alternatively, or in addition, the binding surface may be modified in a way that promotes molecule or cell-specific binding, such as with avidin and/or biotin, or by modification with immobilized lectins.

In some cases, association of cells or cell-analysis materials with carriers may be facilitated by interactions between specific binding pairs (SBPs), where one member of the pair is associated with the cells or cell-analysis materials and the other member of the pair is associated with the carrier. The interactions between members of a specific binding pair typically are noncovalent, and the interactions may be readily reversible or essentially irreversible. An exemplary list of suitable specific binding pairs is shown in Table 2.

TABLE 2

| Representative Specific Binding Pairs | |
|---|---|
| First SBP Member | Second SBP Member |
| antigen | antibody |
| biotin | avidin or streptavidin |
| carbohydrate | lectin or carbohydrate receptor |
| DNA | antisense DNA; protein |
| enzyme substrate | enzyme; protein |
| histidine | NTA (nitrilotriacetic acid) |
| IgG | protein A or protein G |
| RNA | antisense or other RNA; protein |

Association also may be facilitated by appropriate selection and/or treatment of the medium in which the cells or cell-analysis materials and carriers are combined. For example, the medium may include binding mediators that participate in or otherwise promote interactions between cells or cell-analysis materials and carriers, for example, by forming cross-bridges between the cells and carriers and/or by counteracting the effects of binding inhibitors associated with the cells, cell-analysis materials, and/or carriers. The binding mediators may act specifically, for example, by binding to specific groups or molecules on the cells, cell-analysis materials, and/or carriers. Thus, biotin might act as a specific binding mediator by binding to and cross-linking avidin or streptavidin on the cells or cell-analysis materials and carriers. The binding mediators also may act less specifically, or nonspecifically, for example, by binding to classes or categories of groups or molecules on the cells or cell-analysis materials and carriers. Thus, $Ca^{2+}$ ions might act as a relatively nonspecific binding mediator by binding to and cross-linking negative charges on the cells or cell-analysis materials and carriers.

Association of cells or cell-analysis materials may occur indirectly with the carrier (or treated carrier). Thus, association may occur via interaction with other cells or cell-analysis materials also associated with the carriers. For example, indirect association of cells with a carrier may be mediated by a cell-analysis material, for example, by binding of the cells to a ligand, a cell-selector, or other cell-analysis material that has been pre-associated with the carrier. Association may facilitate subsequent analysis of the cells. Alternatively, the presence, absence, or level of association or binding of cells (or cell-analysis materials) to a carrier through a cell-analysis material (or cells) may provide a cell characteristic.

Association of cells and carriers, or subsequent analysis of cells, may be promoted or facilitated in some embodiments by fixing the cells. This procedure typically kills cells and may lock macromolecules into stable configurations, in some cases by creating covalent bridges between macromolecules or by denaturing them. Any suitable fixative may be used, including (1) aldehydes, such as paraformaldehyde or glutaraldehyde, (2) alcohols or other organic solvents, such as methanol, ethanol, isopropanol, or acetone, (3) oxidative agents, (4) mercurials, and/or (5) picrates. Cells may be fixed before, during, and/or after being associated with carriers, or they may remain unfixed.

Cells or cell-analysis materials may be distributed on or placed in association with carriers by any suitable method. In some embodiments, cells or cell-analysis materials may be mixed with carriers, allowing the cells or cell-analysis materials to associate with all available portions of the carriers. In other embodiments, association may be at least substantially restricted to one or several surfaces of the carriers. The cells or cell-analysis materials may be combined with the carriers so that the cells or cell-analysis materials selectively encounter and thus associate with a portion of the carrier. For example, carriers may be distributed randomly, but substantially in a monolayer, on a horizontal surface, such as the bottom of a tissue culture container. Cells in suspension may be added to the container and allowed to settle onto an upwardly facing surface of the carriers.

Association of cells and/or cell analysis materials with carriers also may occur with the carriers provided in a positional array, for example, by arranging or forming the carriers on a substrate. Individual cell populations or cell-analysis materials may be disposed on carriers within the array, or a single cell population or cell-analysis material may be combined with and allowed to associate with the array, for example, on an accessible face of the array. After association between cells or cell-analysis materials and carriers in the array, carrier distribution may be randomized to produce nonpositional arrays by removing the carriers from the positional array. Association of cells with carriers distributed in an array may allow a more economical use of limited numbers of cells, for example, from a patient sample. The use of carrier arrays to associate tissue with carriers is described in Example 5, but may be suitable for any cells exemplified in this Detailed Description.

VI. Exposing Cells and Carriers to Cell-Analysis Materials

Cells and/or carriers may be exposed to a cell-analysis material(s) for a variety of purposes. Exposing generally comprises any action that gives cell analysis materials an opportunity to affect a cell characteristic and/or that places cells and/or carriers in physical proximity with cell-analysis materials. Exposing may include mixing, combining, probing, screening, incubating, reacting, associating, and/or applying. Exposing may be conducted at any suitable time(s) and for any suitable duration(s). Thus, exposing may occur before, during, and/or after cell association. A cell-analysis material may associate with a carrier and/or with cells associated with the carrier as a result of exposing. Cell-analysis materials that are associated with a carrier generally remain at least substantially linked to the code on the carrier.

Association may be cell-dependent, i.e., it may depend on the presence of cells associated with the carrier. For example, association with cells may be used to measure phenotypic or binding interaction between cells and cell-analysis materials or between ligands and receptors, or it may be used to identify and/or isolate a cell binding partner, as described below in Examples 7 and 8 and elsewhere in this Detailed Description. Alternatively, or in addition, association with cells may be used to label cells to measure a cell characteristic, as described above in Section IV(G).

Association also may be cell-independent, or at least substantially cell-independent. Cell-independent association of cell-analysis materials with carriers may be carried out before, during, and/or after cell association, as described above in Section V, depending on the specific application. When carried out before cell association, linking a cell-analysis material to a carrier may be described as pre-association. Pre-association may use the carrier code to relate information about or identify the cell-analysis material(s), and/or an aspect of the cell-analysis material(s), such as its origin or amount, as described below in Section VII.

Cell-independent association may preferably be transient, particularly with cell-analysis materials such as transfection materials and internalized modulators. Transient association may require a balancing act between stable and unstable association. Cell-independent association between a cell-analysis material and a coded carrier should be sufficiently stable to retain a portion of the cell-analysis material on the carrier during cell association and/or the analysis. However, the association may be transient enough so that the transfection material or internalized modulator is released for uptake by cells associated with the carrier during the course of the analysis. Transient association may be mediated by incorporation of the cell-analysis material into a gel or carrier matrix, such as that formed by a gel-forming material such as gelatin.

Cell-independent association generally is carried out by mixing or otherwise exposing one or more cell-analysis materials with a population of coded carriers having one or more known or determinable codes. Once stable or transient association has been effected, carriers coupled to different cell-analysis materials may be combined in a single container, such as a tube or a microplate well, to produce a nonpositional array or library of cell-analysis materials.

Pre-association may include linking a coded carrier with a combination of two or more functionally distinct (or similar) cell-analysis materials. For example, a coded carrier may be linked with a transfection material and a cell selector, a cell selector and a local capturing agent, or any other suitable combination or two or more cell-analysis materials. Pre-association with plural cell-analysis materials on a carrier may be carried out sequentially and/or concomitantly. The code on each carrier may be used to relate information about or identify the combination of cell-analysis materials present on the carrier, as described more fully below in Section VII. Exemplary methods for using combinations of pre-associated cell-analysis materials are described below in Example 10.

VII. Encoded Information

The code on a carrier relates encoded information that may concern the carrier, cells and/or cell-analysis materials associated with the carrier, cell-analysis materials exposed to cells, pretreatment conditions, posttreatment conditions, and/or assay conditions, among others, or a combination thereof. In some embodiments, the code may relate additional or more specific information in combination with positional or non-positional identification of the array in which the code is found, as described below in Section VIII.

The code may relate information about the carrier and/or its properties. This information may relate to the manufacture, composition, size, optical properties, coating, pretreatment, or any other aspect of the carrier.

The code also may relate information about cells associated with the carrier. This information may identify the cells or an aspect of the cells. In particular, codes may identify cell type; cell source, such as patient information, biopsy date or site, species origin, tissue origin, and/or developmental stage; cell genotype; a phenotypic property; epigenetic condition; method of transformation; prior culture history; material transfected into cells; injected material; reporter gene or protein; and/or passage number, among others.

The code also may relate information about one or more cell-analysis materials associated with the carrier, and/or one or more cell-analysis materials exposed to cells associated with the carrier. Such information may include the identity and/or concentration of the cell-analysis material(s), the time and/or duration of exposure to the cell-analysis materials, or other any other information about the cell-analysis materials or their use in the analysis.

The code also may relate information about the assay being performed with the carrier. This information may include times, temperatures, concentrations, order of assay steps, measurement mode(s), and so on.

VIII. Arrays

The presence of a code on each carrier allows different carrier assemblies to be combined, tracked, and multiplex-analyzed as part of nonpositional arrays during the course of an analysis. A "nonpositional" array means that the relative positions of carriers within the array are not used to identify samples or interpret results. A nonpositional array can be supported for preparation and/or analysis in or on any suitable container or other support, including, but not limited to, beakers, bottles, capillary tubes, centrifuge tubes, chips, flow-through channels, microplate wells, microscope slides, and test tubes, among others. A nonpositional array experiment may be conducted wet or dry, for example, in a mixture, solution, or suspension, among others, or dried on a suitable support. A multiplexed analysis is an analysis where, at any stage of the analysis, including before exposing, reading a code, or measuring a characteristic, different samples are combined. An array composition is "multiplexed" if it contains two or more different cell populations, cell-analysis materials, or assay conditions, among others.

In general, a nonpositional array is created by combining separately formed, different carrier assemblies. Typically, each different carrier assembly or related set of carrier assemblies is formed at a positionally distinct site, for example, in a separate container. At the site, codes may be accurately linked to a cell population, cell-analysis material, and/or assay condition because distinct assemblies are formed or treated in positionally separate compartments. However, once association occurs, the distinct assemblies with different codes may be combined in a single compartment to create the nonpositional array. In the nonpositional array, different carrier assemblies with distinct codes are randomly or arbitrarily distributed relative to each other.

Distributing carrier-assembly mixtures from a parent nonpositional array may create substantially similar sibling arrays. These sibling arrays may occupy identifiable positions, for example, within a microplate, to form a partially positional array. Thus, sibling arrays may be exposed to distinct cells, cell-analysis materials, and/or assay conditions and tracked based on their positions within the microplate. Alternatively, or in addition, sibling arrays may be nonpositional relative to each other. For example, sibling arrays may be placed in separate containers, such as labeled micro centrifuge tubes or distinct microplates. In this case, each sibling array may be identifiable based on a nonpositional code that identifies the array. The array-identifying code may be maintained by a container, for example, by identifying symbols or a code on the container. Alternatively, a distinguishing aspect of each sibling array may identify the array. For example, each array may include a different tracking carrier (or carriers) that identifies the array. A tracking carrier generally comprises any array component(s) that distinguishes sibling arrays. Therefore, the code on a carrier may relate sample information that is more accurate or complete based on positional or nonpositional identification of the specific array that provided the carrier.

In some cases, with appropriate code complexity, plural nonpositional arrays, such as coded arrays 130 of FIG. 1, may be combined into a larger nonpositional array without losing information. Differences between analyses performed on carrier assemblies may be determined by the stage(s) during an analysis when they are combined or positionally separated.

A nonpositional array also may adopt a random, fixed position, for example, in an array device capable of reading the code and measuring a reporting property. Such a device is described in U.S. patent application Ser. No. 09/694,077, filed Oct. 19, 2000, which is incorporated herein by reference.

IX. Libraries

Multiplexed assays may involve use of a library. A library generally comprises a collection of two or more different members, such as molecules, ligands, modulators, transfection materials, receptors, antibodies, and/or cells (phages, viruses, whole cells, tissues, and/or cell extracts), among others, related by a common characteristic. Thus, the library may comprise a collection of two or more different cells, two or more different antibodies, two or more different ligands, two or more different receptors, or two or more different phages or whole cell populations distinguished by expressing different proteins, among others.

Coded libraries may be formed by associating two or more library members with distinct coded carriers. Thus, two or more distinct cell populations may be associated with different codes to form a coded cell library. In other examples, coded libraries of transfection materials, modulators, phages, ligands, antibodies, receptors, and cell selectors, among others, may be formed on coded carriers. Combination coded libraries may be formed by associating two or more library members of different classes with each code. In some embodiments, plural library members from a single class, referred to as a pool, may be associated with each coded carrier. This approach produces coded library pools for screening or other analysis. The invention provides multiplexed array systems and methods that may be easily adapted to a wide range of potential library sizes. Exemplary methods for forming and using coded libraries, coded combination libraries, and coded library pools are detailed elsewhere in the Detailed Description.

X. Cell Characteristics

Interaction(s) between cells and cell-analysis material(s) may provide and/or affect one or more cell characteristics. A cell characteristic generally comprises any measurable aspect of individual cells or a cell population associated with a carrier. A cell characteristic may include any phenotypic, genotypic, biochemical and/or physical property of a cell or a cell population and/or the presence, level, quality, and/or effect of interaction between cells and cell-analysis materials. A cell characteristic may be analyzed in with or without exposure to modulators or other cell-analysis materials.

Examples of suitable cell phenotypes may include cell survival; cell population number; mitotic index; cell population density; cell population arrangement; cell shape; cell size; cell appearance; cell cycle distribution; specific cell cycle arrest; frequency of apoptosis; response to physical/environmental modulators; cell identity/differentiation; cell transformation; cell attachment; number, appearance, and/or position of an organelle; import, export, or subcellular transport of a component or components; and so on. Examples of suitable genotypes may include ploidy, gene amplification, gene rearrangement, presence and/or amount of foreign DNA, and the like. Biochemical properties may include the amount, subcellular location or distribution, modification, partnership (physical association), and/or activity of any cellular component. Exemplary cellular components may include endogenous or exogenous nucleic acids, such as specific genes, transfected DNAs, RNAs, or RNA reporters. Other exemplary cellular components may include proteins, such as endogenously encoded cellular proteins, and exogenously encoded reporter proteins, such as GFP, beta-galactosidase, chloramphenicol acetyltransferase, and luciferase, among others, expressed from reporter genes. Yet other exemplary cellular components may include the presence or level or a secreted cell component detected by a local capturing agent. Yet other exemplary cellular components include peptides, lipids, carbohydrates, hormones, metabolites, ions, and the like, as detailed more fully below.

A cell characteristic also may be directly or indirectly detected. Directly detected cell characteristics may be measured, for example, by optical means, such as phase contrast microscopy or fluorescence microscopy, and may include cell number, cell distribution, cell morphology, extracellular matrix structure, GFP signal, or any other directly measured aspect of the cells. The use of directly measured cell characteristics may allow cells to be analyzed while still alive. In contrast, indirectly detected cell characteristics may be measured after labeling the cells with one or more labels that provide or create a detectable signal. Depending upon the type of labels used, labeling may be carried out on living cells or on cells that have been fixed and/or permeabilized.

A. Directly Measured Cell Characteristics

Directly measured cell characteristics may be useful in a number of applications. For example, the total number, density, relative arrangement, and appearance of cells may provide information regarding cell attachment, cell growth, cell identity/differentiation, toxicity, cell-cell interactions, cell mobility, and cell transformation, among others, and the effect of modulators or other cell-analysis materials on these cell characteristics.

A reporter may provide another type of directly measured cell characteristic. A reporter generally comprises any detectable material that provides information about the material's abundance, location, and/or environment. For example, a reporter may provide information about a property of the cells, such as pH; levels of $Ca^{+2}$, $Zn^{+2}$, cAMP, or cGMP; or enzyme activity, among others. Typically, reporters are encoded by foreign genetic material that has been introduced transiently or that is stably maintained during cell division. However, reporters may be native to the cells, or may be created by modification of a native molecule by mutation of its encoding gene. An example of a directly detectable reporter that may be suitable for use in the invention is green fluorescent protein (GFP). GFP variants that may be suitable also are commercially available, for example, from CLONTECH Laboratories, Inc. of Palo Alto, Calif. These GFP variants may have substantially distinct emission spectra relative to GFP, including predominant emission of blue, yellow, and red light.

In some embodiments, cell populations may include a reporter fusion gene that has gene regulatory sequences of interest linked to a nucleotide sequence encoding a reporter. Such a fusion gene may allow expression of the reporter gene to be measured in response to various modulators acting through the gene regulatory sequences. These embodiments may facilitate identification of modulators or other cell-analysis materials that turn on or off genes of interest. Directly detected reporters such as GFP and reporters that usually are indirectly detected, such as beta-galactosidase, may be included in these reporter fusion genes.

In other embodiments, cell populations may include genetically encoded reporter fusion proteins. The reporter fusion proteins each have a protein of interest linked to a reporter protein. Thus, the reporter protein acts as a detectable tag for the protein of interest. This strategy allows properties of the protein of interest to be measured through the reporter protein tag. For example, if the protein of interest has a distinctive or regulated subcellular distribution, changes in the distribution may be measured, for example, in response to modulators or exposure to other cell-analysis materials. Therefore, modulators and/or other cell-analysis materials may be tested for their ability to regulate or alter the subcellular distribution of the reporter fusion protein. Directly detected reporters such as GFP and reporters that usually are indirectly detected, such as beta-galactosidase, may be included in these reporter fusion proteins.

B. Indirectly Measured Cell Characteristics

Indirectly measured cell characteristics may be revealed after labeling the cells with an appropriate label or set of labels. Typically, a label includes or produces a detectable property, such as a property that is optically detectable. Thus, appropriate selection of labels with distinct optical properties, for example, fluorescent dyes with substantially non-overlapping excitation and/or emission spectra, may allow more than one cell characteristic to be measured for a coded cell population.

Indirectly measured cell characteristics may provide a measure of presence or absence, absolute or relative level, subcellular location or distribution, frequency, integrity, appearance, activity, partnership, and/or any other detectable feature of any component(s) or structure(s) that may be present in, on, and/or near cells and/or cell-analysis materials. Components may include small molecules, such as nucleotides and their metabolites, including ATP, ADP, AMP, cAMP, cGMP, and coenzyme A; sugars and their metabolites; amino acids and their metabolites; lipids and their metabolites, including phospholipids, glycolipids, sphingolipids, triglycerides, cholesterol, steroids, isoprenoids, and fatty acids; and ions, such as calcium, sodium, magnesium, potassium, and chloride, among others. Components also may include macromolecules such as deoxyribonucleic acid (DNA), including genomic DNA, mitochondrial DNA, plasmid DNA, double minute minichromosome DNA, viral DNA, transfected DNA, or other foreign or endogenous DNA sequences; ribonucleic acid (RNA), including ribosomal RNA, transfer RNA, messenger RNA, catalytic RNA, structural RNA, small nuclear RNAs, and antisense RNA; proteins, including peptides and specific covalently modified protein derivatives, such as phosphoproteins and glycoproteins; and polysaccharides, including glycogen and cellulose.

i. DNA-Related Cell Characteristics

Measurement of DNA may provide a cell characteristic. The DNA-related cell characteristic may include total DNA; total genomic DNA; total mitochondrial or other organellar DNA; frequency of double minute chromosomes; frequency, subnuclear/subcellular distribution, or integrity of a chromosome or set of chromosomes; frequency, subcellular distribution, or integrity of a chromosomal region, where the chromosomal region is selected from a centromere, heterochromatin, centromeric heterochromatin, euchromatin, a triple helix, methylated sequences, a telomere, a repetitive sequence, a gene, an exon of a gene, an intron of a gene, a promoter or enhancer of a gene, an insulator of a gene, a 5' untranslated region of a gene, a 3' untranslated region of a gene, a nuclease hypersensitive site, an active transposon, an inactive transposon, a locus control region, a matrix attachment region, or other chromosomal region with known or unknown function. In addition, a DNA-related cell characteristic may include the frequency, subcellular distribution, or integrity of a foreign DNA sequence introduced naturally or artificially.

DNA-related cell characteristics may reveal aspects of cellular function. For example, total nuclear DNA may provide a measure of the fraction of cells that have apoptosed and that have very brightly staining, compact former nuclei. In addition, analysis of total nuclear DNA may provide an indication of ploidy, frequency of mitotic cells, overall nuclear morphology, and thus the state, health, and mitotic index of the cells. A measure of total DNA also may provide an indication of the ability of a modulator or cell-analysis material to alter progression through the cell cycle, including defects in cell cycle checkpoints. For example, changes in nuclear morphology may be measured, including micronuclei, larger nuclei, irregularly shaped nuclei, multiple nuclei per cell, aneuploidy detectable when chromosomes are condensed at M-phase, and/or internuclear bridges.

Analysis of chromosomes, subchromosomal regions, or genes also may provide a cell characteristic. The cell characteristic may be used for diagnostic purposes, for example, when cells are obtained from a patient sample. In this case, the DNA reporting property may be used as a genotyping strategy to identify the copy number or integrity of a DNA region, for example, to determine whether the cells are diploid, monoploid, aneuploid, deleted, or amplified for the DNA region. These modifications of specific genes or DNA regions in tumors may provide a cancer diagnosis and/or prognosis, including treatment.

ii. RNA-Related Cell Characteristics

Measurement of RNA also may provide a cell characteristic. Analysis of different RNAs may be useful to measure overall gene activity, transcriptional activity of a specific gene or reporter, and/or abundance or subcellular distribution of structural or catalytic RNAs, including those involved in protein synthesis and RNA splicing. For example, the presence or absence of an RNA may provide an indication of the expression level of a cellular, viral, or transfected gene. Furthermore, measurement of aberrant RNA transcripts may provide a cell characteristic. In this case, the aberrant transcripts may provide a measure of gene mutation or rearrangement, or a defect or error in splicing the primary RNA transcript to a messenger RNA.

iii. Protein-Related Cell Characteristics

Measurement of the presence or absence, level, modification, subcellular location or distribution, and/or functional property of a protein also may be used as a cell characteristic. For example, analysis of a specific. protein or set of proteins may be useful to provide an indication of cell identity; species origin; developmental stage; transformation state; position in the cell cycle; growth state; status of a given signal transduction pathway; initiation of a cellular program such as heat shock, a checkpoint, or apoptosis; metastatic potential; drug sensitivity or effectiveness; or use or integrity of a given transport pathway, among others. Furthermore, analysis of proteins that are resident in a distinct subcellular region, such as an organelle, may provide information about the organelle, a disease state, and/or other aspects of cellular structure or function.

iv. Lipid-Related Cell Characteristics

Measurement of the presence, level, subcellular distribution, modification, partnership, and/or other properties of lipids may provide a cell characteristic. Lipids generally play diverse roles in cells at membranes, in metabolism, as signaling molecules, and so on. For example, phosphatidylinositol-3-phosphate (PtIns3P) has a fundamental role both in regulating intracellular trafficking and in various signal transduction pathways. Other phosphoinositides, such as PtIns3,4P, PtIns3,5P, and PtIns4P, also appear to play fundamental roles in regulating cell function. An analysis of these and many other lipids may be important in many types of multiplexed analyses.

XI. Measurement Methods

A characteristic of a coded cell population may be measured, and the code of the associated carrier may be read, before, during, and/or after an assay procedure on the cell population. The steps of reading and measuring generally may be performed in any order, and each step may be performed selectively on specific carriers. For example, in some cases the code may be read only on carriers that exhibit a specific cell characteristic, such as showing a positive signal. Alternatively, the cell characteristic may be measured only for carriers that have a specific code(s) among carriers in an array. Moreover, these steps may be performed using any suitable substrate, such as a slide, a microplate, or a capillary tube, among others, and any suitable detection device, such as a microscope, a film scanner, or a plate reader, among others.

Codes, cell characteristics, and other measured quantities may be determined using any suitable measurement method. The measured quantities generally comprise any measurable, countable, and/or comparable property or aspect of interest. The detection methods may include spectroscopic, hydrodynamic, and imaging methods, among others, especially those adaptable to high-throughput analysis of multiple samples. The detection methods also may include visual analysis. Measured quantities may be reported quantitatively and/or qualitatively, as appropriate. Measured quantities may include presence or absence, or relative and/or absolute amounts, among others.

Spectroscopic methods generally involve interaction of electromagnetic radiation (light or wavelike particles) with matter, and may involve monitoring some property of the electromagnetic radiation, that is changed due to the interaction. Exemplary spectroscopic methods include absorption, luminescence (including photoluminescence, chemiluminescence, and electrochemiluminescence), magnetic resonance (including nuclear and electron spin resonance), scattering (including light scattering, electron scattering, and neutron scattering), circular dichroism, diffraction, and optical rotation, among others. Exemplary photoluminescence methods include fluorescence intensity (FLINT), fluorescence polarization (FP), fluorescence resonance energy transfer (FRET), fluorescence lifetime (FLT), total internal reflection fluorescence (TIRF), fluorescence correlation spectroscopy (FCS), and fluorescence recovery after photobleaching (FRAP), their phosphorescence analogs, and bioluminescence resonance energy transfer (BRET), among others.

The same and/or different spectroscopic methods may be used to read the code and measure cell characteristics. For example, both the code and cell characteristics may be detected through absorption of electromagnetic radiation, such as visible light. Carriers with distinct coding and non-coding regions, such as those described in Examples 12 and 13, may be suitable for analysis with a single spectroscopic method. Alternatively, or in addition, the code and cell characteristics may be measured with different spectroscopic methods and/or detection methods, as described in Example 15.

Hydrodynamic methods generally involve interaction of a molecule or other material with its neighbors, its solvent, and/or a matrix, and may be used to characterize molecular size and/or shape, or to separate a sample into its components. Exemplary hydrodynamic methods may include chromatography, sedimentation, viscometry, and electrophoresis, among others.

Imaging methods generally involve visualizing a sample or its components. Exemplary imaging methods include optical microscopy and electron microscopy, among others. Exemplary imaging data include analog and digital images, among others.

Exemplary methods for reading codes and measuring cell characteristics are described in more detail in the patents and patent applications identified above under Cross-References and incorporated herein by reference, particularly U.S. Provisional Patent Application Ser. No. 60/307,649, filed Jul. 24, 2001.

XII. EXAMPLES

The following examples describe selected aspects and embodiments of the invention, including methods for making and using coded carriers and nonpositional arrays of cells and/or cell-analysis materials. These examples are included for illustration and are not intended to limit or define the entire scope of the invention. The examples include, among others, (1) methods for making coded cell arrays, (2) multiplexed screens for differentiation modulators, (3) multiplexed screens of prenatal samples, (4) multiplexed analysis of gene amplification, (5) methods for making nonpositional tissue arrays, (6) multiplexed analysis of cell characteristics, (7) receptor/ligand assay systems, (8) biological assays using coded carriers, (9) multiplexed cell analysis system using reverse transfection, (10) multiplexed cell analysis using coded arrays of cell-analysis materials, (11) library screening system using coded carriers, (12) film-based coded carriers, (13) coded carriers with surface area enhancements and/or magnetic portions, (14) cell measures from cell populations on coded carriers, and (15) coded carrier embodiments, reading codes, and measuring characteristics.

Example 1

Methods for Making Coded Cell Arrays

Figure 2:
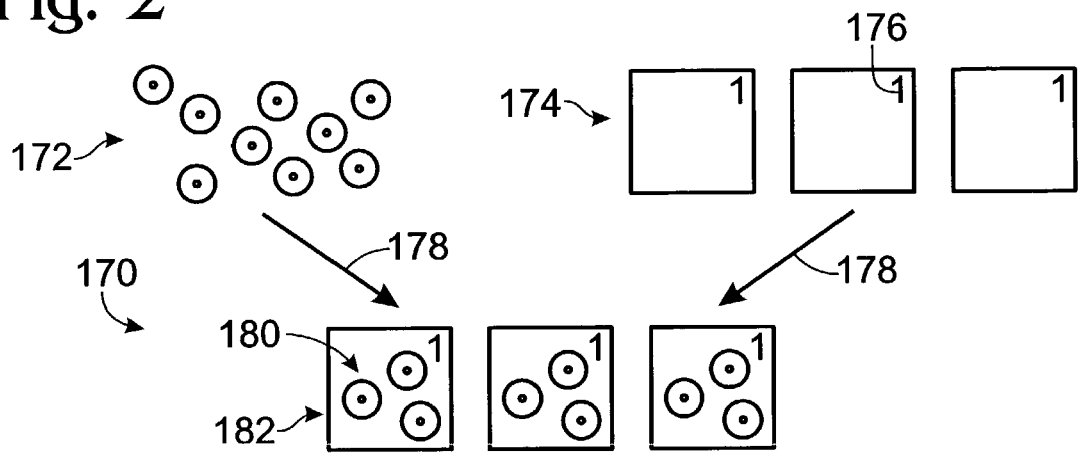
FIG. 2 is a schematic view of a method for associating a population of cells with a class of coded carriers, in accordance with aspects of the invention.
Figure 4:
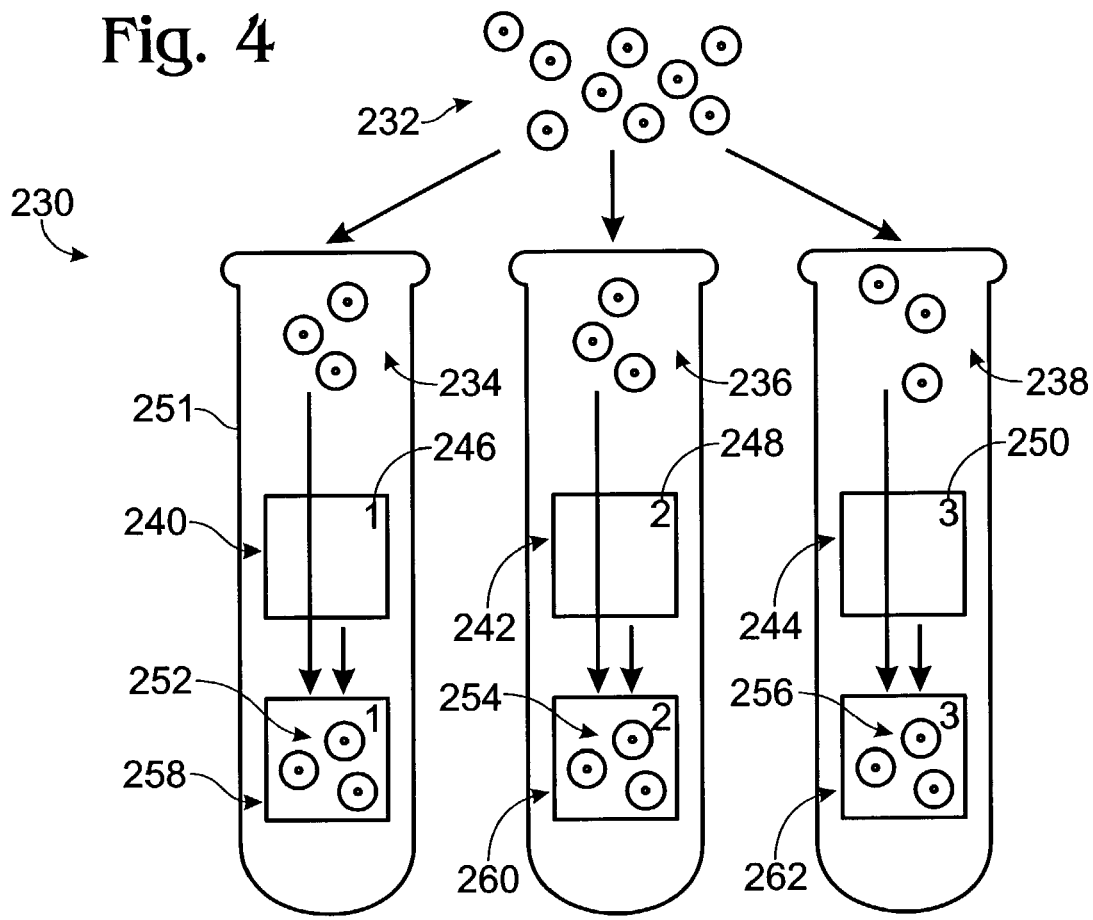
FIG. 4 is a schematic view of a method for associating a population of cells with different classes of coded carriers, in accordance with aspects of the invention.
Figure 3:
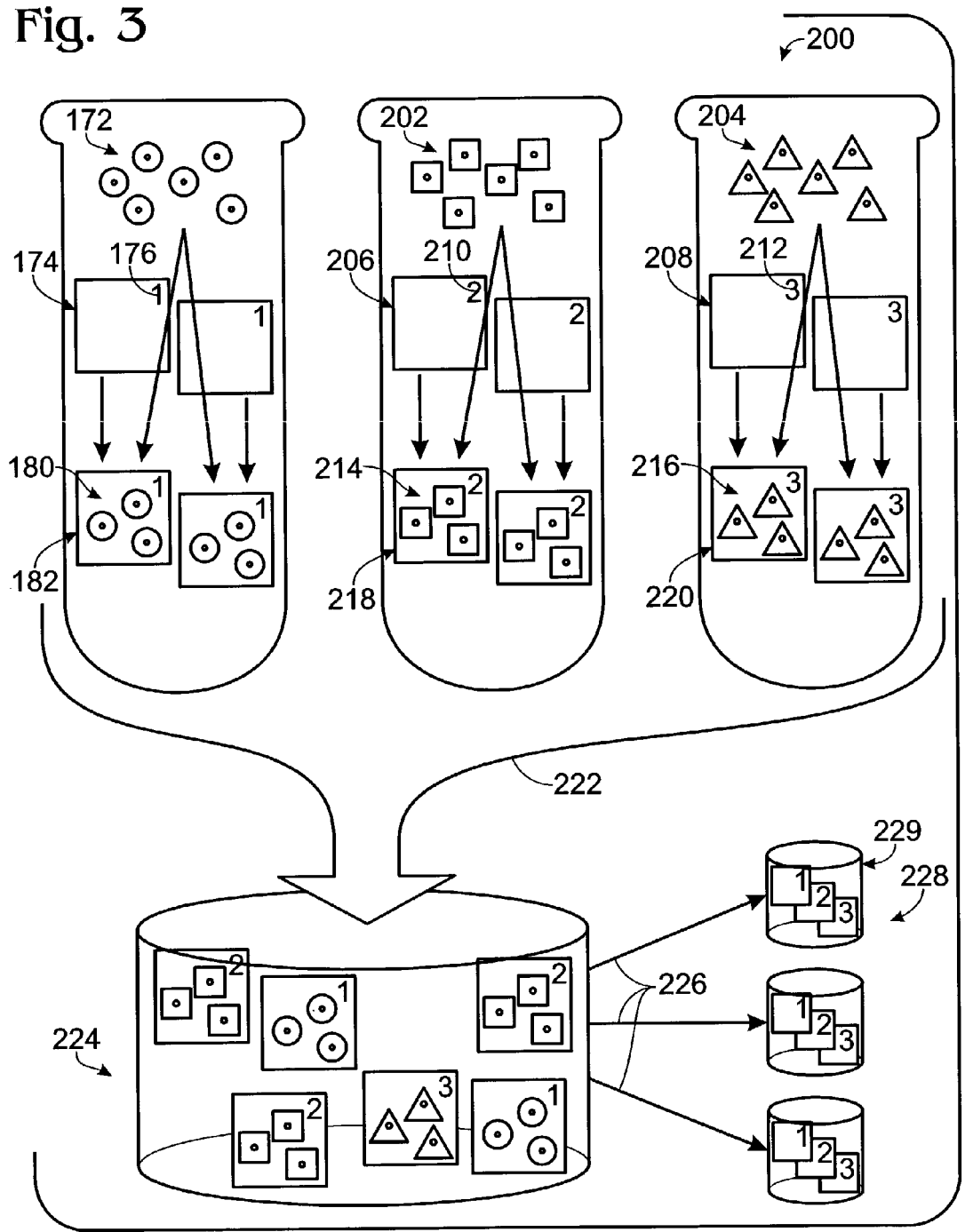
FIG. 3 is a schematic view of a method for associating different populations of cells with different classes of coded carriers to form nonpositional cell arrays, in accordance with aspects of the invention.

This example, illustrated in FIGS. 2-4, describes methods for associating one or plural cell populations with one or plural codes.

FIG. 2 illustrates a method 170 for preparing a coded cell population in which a single population of cells 172 is associated with a single type of coded carrier 174 having a single code 176. Cells 172 are provided as a suspension population. Cells 172 may directly originate from in vitro culture in a container, for example, from a tissue culture dish, plate, flask, or multi-well plate. Alternatively, cells 172 may originate directly from an organism without in vitro culture, for example, a fluid aspirate from a patient biopsy. Furthermore, cells 172 may be disaggregated from each other or detached from a substrate by any suitable method, including (1) enzymatic treatment, such as incubation with a protease such as trypsin, (2) mechanical separation, (3) adjustment of ionic conditions, such as calcium levels, or (4) a pH change. Alternatively, cells 172 may be provided in any form suitable for association with carrier 174, including cell aggregates, cell sheets, or tissue fragments. Exemplary cells and association methods are included in Sections III and V above.

In some embodiments, cells 172 are associated with carrier 174 while alive. Living cells may attach more efficiently to carrier 174. In addition, living cells may allow effective exposure to some cell-analysis materials, such as modulators and transfection materials, which are not effective with dead cells. Alternatively, prior to association with carrier 174, cells 172 may be fixed or otherwise killed. For example, cells 172 may have been collected at a time or place unsuitable for carrier association. Whether living or dead, cells 172 are combined with carrier 174, shown at 178, by any suitable method, including gravity-mediated sedimentation or centrifugation of cells 172 onto carrier 174, to create associated cell population 180 as part of a carrier assembly 182.

FIG. 3 illustrates a method 200 for forming plural substantially equivalent, nonpositional sibling cell arrays. In this example, three different cell types or populations 172, 202, 204 are associated with a different class of coded carrier 174, 206, 208, having a distinct code 176, 210, 212, respectively. The resulting associated cell populations 180, 214, 216 are included on carrier assemblies 182, 218, 220, respectively. Mixing these carrier assemblies, shown at 222, produces a nonpositional array 224 that represents a coded cell library. Nonpositional array 224 may be exposed to one or more cell-analysis materials directly and/or may be distributed, shown at 226, to form a positional or nonpositional set 228 of plural sibling nonpositional arrays 229. As shown, each sibling array may have a similar representation of different carrier assembly types but may be exposed to a distinct set of one or more cell-analysis materials.

FIG. 4 illustrates a method 230 for preparing a coded cell population in which a parent population of cells is associated with coded carriers having distinct codes. Cells 232 are divided into groups of cells 234, 236, 238, and each group is associated with a different class of coded carrier 240, 242, 244, having different codes 246, 248, 250, respectively. Each coded carrier type and group of cells are combined and associated in a separate container 251, thus ensuring accurate linkage between cells and codes. Cells 232 associate with coded carriers 240, 242, 244 to create an arrayed set of associated cell populations 252, 254, 256 included on cell-carrier assemblies 258, 260, 262. The associated cell populations may be substantially similar at this point in the analysis. However, the cell populations may be treated differently. For example, they may be combined with different sets of cell-carrier assemblies and/or exposed to distinct cell-analysis materials, as exemplified in FIG. 1. Furthermore, such coded cell populations may be combined prior to reading/measuring codes and characteristics, as also shown in FIG. 1. As an alternative to forming distinct carrier assemblies in separate containers, cells 232 may be associated with a mixed group of distinct carriers. The mixed group then may be sorted according to carrier code, thus grouping related carrier assemblies.

Example 2

Multiplexed Screens for Differentiation Modulators

This example describes a multiplexed cell assay for screening drug candidates for differentiation promoting activity. Differentiation of seven different adult or embryonic stem cell lines into osteoblasts is measured. The cell lines are plated, cultured, and passaged in tissue culture flasks on feeder layers of nondividing fibroblasts. Cells are washed with phosphate-buffered saline (PBS) and removed from culture substrates by digestion with trypsin.

Coded carriers with seven different optical codes are prepared from glass and coated by incubation with a 5% solution of gelatin in PBS for 10 minutes. The carriers are distributed across the bottoms of seven flat-bottomed containers, such as tissue culture plates, to produce a monolayer of carriers with a single code in each container. Carriers are designed to include three spatial compartments, or code elements. The first and the second coding elements each can be red (R), blue (B), or yellow (Y), based on the spectrum of visible light transmitted through the code element, whereas the third compartment has no color-coding information but facilitates orienting the codes. A suitable set of seven codes (classes) is selected from the nine possible codes: RR, RB, RY, BR, BB, BY, YR, YB, and YY. The coded carriers are about 250×250× 25 microns. This coded carrier geometry favors a common gravity-directed orientation, with one of the two larger faces of each carrier typically positioned horizontally after settling and gentle agitation.

A single-cell suspension of each of the above seven cell lines is placed in each of the seven containers with one of the seven classes of coded carrier, along with feeder cells. Cells are allowed to settle to the bottom of each container and to attach to the top surfaces of the class of coded carrier present in that container. The number of cells added to each container creates a 50% confluent monolayer of cells across the bottom surface of the container and on the coded carriers.

After allowing several hours to overnight for effective attachment, cell-carrier assemblies from each container are removed, along with the media, by pipeting and are combined in a container. After gentle mixing to create a nonpositional array with seven different coded cell populations, aliquots of the composition are distributed to the wells of a standard 96-well microplate to form sibling nonpositional arrays. A suitable number of coded carriers are introduced into each well to represent each cell type at least about ten times, but to minimize overlap when the carriers settle to the bottom of each well. A carrier has a surface of about (250 microns ×250 microns), which equals about 0.06 $mm^2$, whereas a standard well of a 96-well microplate has a bottom surface area of about 64 $mm^2$. Therefore, at 10% coverage of the area of the well, about 110 carriers are added, with an average of 16 carriers per cell line.

To test the effect of potential differentiation-promoting compounds, a different candidate compound is added to each well. The cells are incubated with each compound, under suitable differentiation conditions, for a length of time appropriate to test for differentiation. In this example, compounds are screened for their ability to promote differentiation to an osteoblast lineage after a three-day period. At the end of the period, the media is removed and sibling arrays are fixed with paraformaldehyde, and labeled with an antibody to an osteoblast-specific marker, monoclonal anti-osteocalcin from Zymed Laboratories, Inc. of South San Francisco, Calif. Subsequently, the bound primary antibody is detected through incubation with a Texas red-conjugated goat anti-mouse secondary antibody. Each cell-carrier assembly in a well is analyzed in situ by transmission microscopy with suitable filters to read the color code, and by fluorescence microscopy to measure the fluorescence signal from cells associated with each carrier.

Example 3

Multiplexed Screens of Prenatal Samples

This example describes a multiplexed assay system for screening prenatal samples for genetic, phenotypic, biochemical, and/or physical abnormalities. The assay system also may measure any other cell characteristics from prenatal samples, including predictors of sex, health, and/or parentage, among others. The following specific examples illustrate how fetal, pre-implantation, and chorionic villi samples may be tested.

3.1 Fetal Sample Analysis

This example describes a multiplexed cell assay to screen fetal samples for genetic defects. Fetal cells are obtained by amniocentesis from the amniotic fluid of women in their $15^{th}$-$16^{th}$ week of pregnancy and cultured. Cells from each fetal sample are then associated with a distinct coded carrier class, such as those of Example 2 above. In this case, each coded carrier class is first placed in a tightly spaced planar array. Cells from each fetal sample then are added to the planar array to associate cells with carriers. After association, cells attached to each carrier are fixed by treatment with 4% paraformaldehyde in PBS for ten minutes at room temperature.

Carrier assemblies produced with each patient sample are combined in a container such as a microcentrifuge tube or microplate well to create a parent nonpositional array of samples and then are distributed to individual reaction containers in a positional or nonpositional format to form sibling arrays for fluorescence in situ hybridization (FISH) analysis with different probes. Separate containers are hybridized with the LSI DiGeorge/VCFS Region probe, the LSI Wolf-Hirschhom Syndrome probe, the LSI LIS1 Miller-Dieker Microdeletion probe, and the ANEUVYSION Assay Kit probe, each available from Vysis, Inc., of Downers Grove, Ill. After hybridization and washing, the carrier assemblies from each sibling array are distributed on a microscope slide and scanned by transmission microscopy to read the code. In addition, the cells are analyzed by fluorescence microscopy to test fetal samples for each specific chromosome microdeletion, aneuploidy, trisomy, or other defect.

3.2 Pre-Implantation Embryo Analysis

This example describes a representative multiplexed cell assay to screen pre-implantation embryos for genetic diseases. Blastomeres are obtained from seven different pre-implantation embryos and cultured in vitro. Each of the resultant cell cultures are associated with one of seven classes of coded carriers, fixed, and combined to create a nonpositional coded cell array, as described in Example 2. The array is distributed to different containers to form sibling arrays and processed for FISH, for example, as described in Example 3.1. The carriers from each container then are distributed on a microscope slide, the codes are read, and fluorescent FISH signals measured.

3.3 Chorionic Villi Analysis

This example describes a multiplexed screen of chorionic villi samples for genetic diseases. Chorionic villi samples are collected transcervically with a plastic catheter at ten to twelve weeks of gestation from seven pregnant mothers and cultured in vitro. The resulting cells are then processed as in Examples 3.1 and 3.2.

Example 4

Multiplexed Analysis of Gene Amplification

This example describes a representative assay to screen patient samples for amplification of the HER-2 gene. Needle aspiration biopsies of breast nodules are performed on seven patients. The collected cells are associated with seven classes of coded carriers, for example, as described in Example 2, fixed, and processed for FISH with the PATHVYSION HER-2 DNA Probe Kit from Vysis, Inc. The carrier assemblies are analyzed, as in Examples 3.1 and 3.2, to measure the level and/or frequency of HER-2 amplification in each patient sample.

The same or a similar approach may be used to test patient samples to identify, characterize, stage, diagnose, prognosticate, or select a drug(s) or treatment regimen for any cancer or tumor, including carcinomas, sarcomas, neuromas, leukemias, and the like.

Example 5

Methods for Making Nonpositional Tissue Arrays

This example, illustrated is FIGS. 5-16, describes methods for making nonpositional tissue arrays for multiplexed analysis of tissue.

For centuries, pathologists have studied and characterized samples of human tissue. The now highly developed discipline of pathology provides a variety of techniques for fixing, sectioning, and staining normal and diseased tissue to compare and contrast the properties of each. More recently, pathologists have introduced techniques at least partially derived from molecular biology to identify parameters in tissue. For example, fluorescence in situ hybridization (FISH) methodology has provided pathologists with the ability to examine the copy number and subnuclear distribution of chromosomes, subchromosomal regions, and specific genes in diseased tissue, such as in tumor samples or patient biopsies. FISH methodology and immunohistochemistry (IHC) also have been used to study in situ gene expression at the RNA and protein levels to provide improved correlations between the status of specific RNAs or proteins, disease prognosis, and suggested treatments.

With standard technology, a pathologist analyzes intact tissue by in situ techniques after immobilizing a thin section of fixed, embedded tissue on a substrate, such as a microscope slide. The pathologist typically labels the microscope slide, for example, by writing with a pencil on a frosted portion of the slide. The resulting label identifies the origin of the tissue section during subsequent manipulation, such as by FISH or IHC. However, this standard method of tissue preparation is unsuitable for high-throughput or multiplexed analysis.

In addition to new methodologies for analyzing tissue, an explosion of the number of available reagents for tissue analysis has further magnified the inefficiency and inadequacy of the standard method for tissue preparation. For example, sequencing of the human genome has identified new analytical tools for FISH at a rate that has far exceeded the ability of pathologists to use these new tools. Nevertheless, few doubt the value of using these tools to study tissue from normal and diseased patients. For example, careful correlations between drug treatment, tumor phenotype, tumor genotype, patient genotype, and tumor gene expression may provide personally tailored, highly effective cancer treatments in the foreseeable future.

One approach for increasing tissue analysis throughput extracts material, such as nucleic acids or protein, from each tissue sample. For example, significant efforts are underway to use positional nucleic acid arrays to measure the expression level of a large number of genes in the National Cancer Institute set of 60 tumor cell lines. Similar analyses also are underway with RNA isolated directly from tumor biopsies. However, by homogenizing tissue samples, these studies discard valuable information provided by analysis of single cells and groups of cells in tissue.

Methods for analysis of tissue sections in positional arrays have been developed by others. These methods attempt to overcome some of the problems outlined above and are presented in the following PCT patent applications, which are incorporated herein by reference: Serial No. PCT/US99/25370, filed Oct. 28, 1999; Serial No. PCT/US99/04000, filed Feb. 24, 1999; and Serial No. PCT/US99/04001, filed, Feb. 24, 1999. However, these methods rely on relatively inflexible positional arrays that are difficult to modify. For example, these methods are not amenable to replacement of specific tissues (e.g., in a previously generated array) with other tissues of greater interest. Furthermore, the positional arrays are not adaptable to analysis in very small volumes and are subject to local regions of inhomogeneity in any reaction. Therefore, a more flexible array format for high-throughput analysis of tissue still is required.

This example describes methods of associating tissue with coded carriers and making nonpositional arrays of coded tissue. These methods and arrays may have various benefits, for example, allowing multiple tissue samples to be tested and analyzed together in a single container. Coupled with the continual improvements in microtiter plates, microfluidics and robotics, these methods and compositions may increase throughput by expanding the number of tissue samples and tissue types analyzed.

Figure 5:
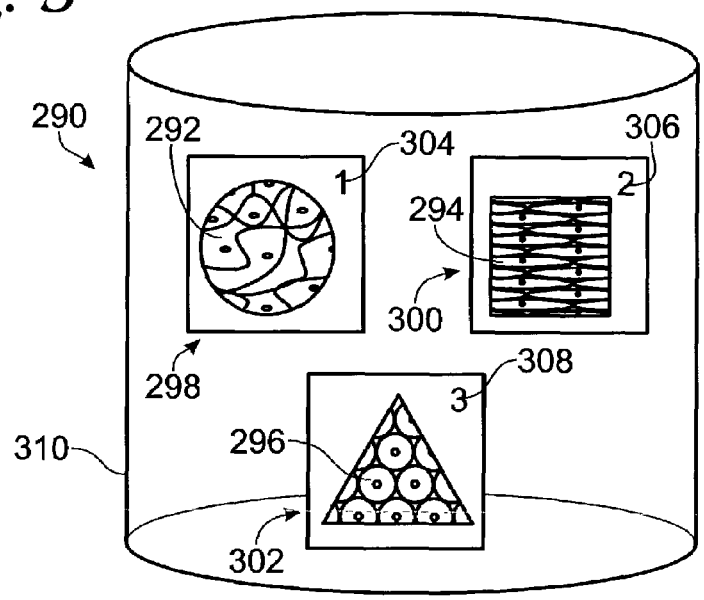
FIG. 5 is a schematic view of a coded tissue composition, in accordance with aspects of the invention.

FIG. 5 shows a composition 290 that exemplifies a nonpositional tissue array. A nonpositional tissue array may include any number of different tissue types included in tissue-carrier assemblies. Each tissue-carrier assembly is prepared by associating tissues 292, 294, 296, with coded carriers 298, 300, 302, having distinct codes 304, 306, 308, respectively. Tissue-carrier assemblies may be combined to allow multiplexed analysis of tissue samples in a nonpositional array in one or more containers 310. In a nonpositional array each carrier may have the same and/or a different code than each other carrier, and each carrier may be associated with the same and/or a different type of tissue than each other carrier. However, the code on a carrier relates information about the tissue associated with the carrier.

Tissue may be obtained from any of the sources exemplified in Section III above. Tissue may be associated with carriers while alive or dead, but unfixed. Alternatively, tissue may be fixed as exemplified in Section V. Fixed tissue may be associated with the carrier directly (i.e., "as is"), or it may be further processed before being associated, for example, by cutting it into sections with a microtome. Suitable microtomes may include rotary, vibrating, saw, hand, cryostat, and freezing microtomes, among others. Tissue sections may be produced from fixed tissue that has been embedded in a solidifying material such as paraffin or a synthetic resin. In a typical example, fixed tissue is first dehydrated by incubation in a series of organic solvents with increasing hydrophobicity and decreasing water content and then impregnated with a suitable embedding material. The tissue may be sectioned into a thickness of about 0.5 to 40 microns, about 1 to 20 microns, or about 2 to 10 microns, and may have a width based on the size of the tissue, the width of each carrier, and/or the number of carriers associated with a single tissue section (see below).

A tissue section also may be provided without standard embedding. For example, tissue may be frozen directly in the presence of a cryopreservative, either with or without prior treatment with a fixative, and sectioned. Alternatively, tissue may be placed in a liquid and sectioned, or sectioned directly without any treatment.

5.1 Associating Tissue Sections with Carriers

Figure 6:
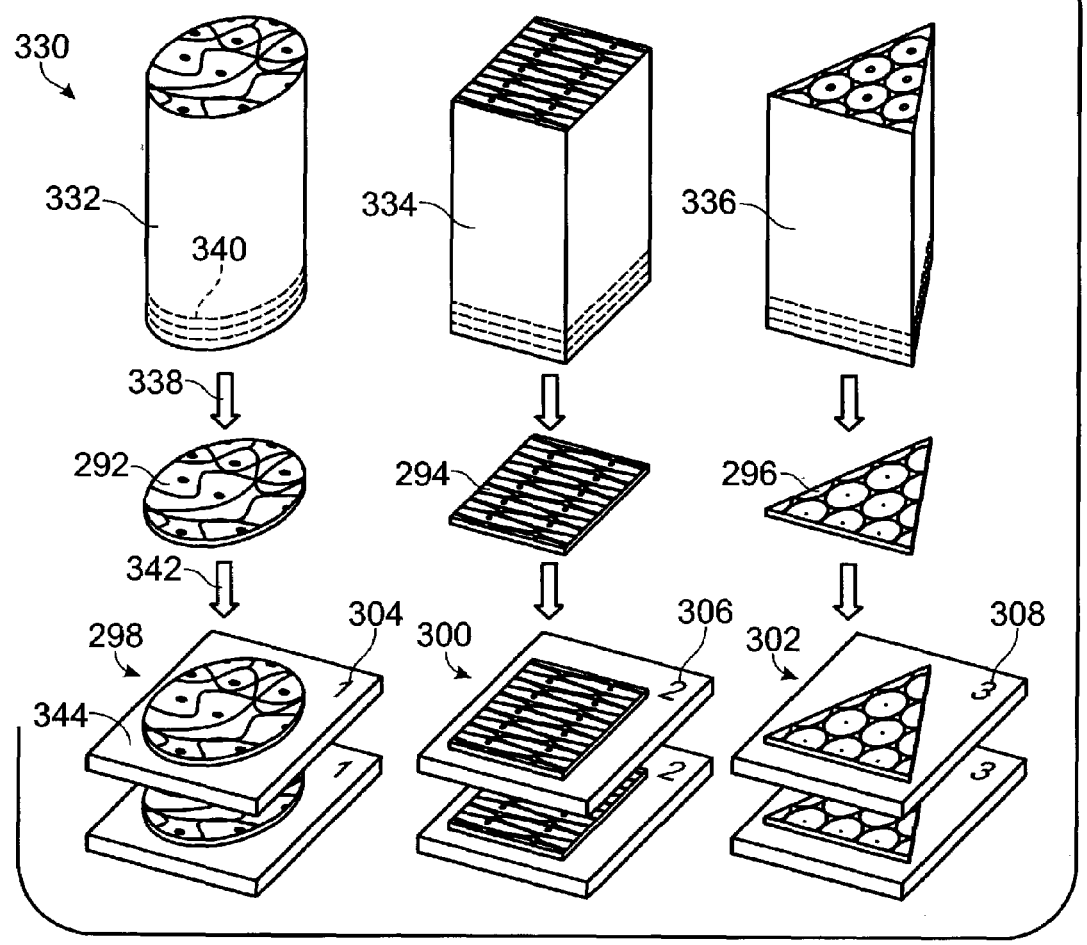
FIG. 6 is an isometric schematic view of a method for making tissue-carrier assemblies, such as those present in the coded tissue composition of FIG. 5, in accordance with aspects of the invention.

FIG. 6 illustrates a method 330 for making coded tissue carriers, such as those shown in array 290 of FIG. 5. Tissues or tissue fragments 332, 334, 336 are provided, typically as paraffin blocks (not shown) in which the tissue is embedded.

Sections of tissue 292, 294, 296 may be derived from each tissue by sectioning, shown at 338, along section planes 340, indicated by dashed lines. The sections are referred to as serial sections because they are derived in sequence from a tissue. However, nonserial sections from a tissue also may be used, with intermediate sections being discarded or used for other purposes. Sections 292, 294, 296 are associated, shown at 342, with coded carriers having distinct codes 304, 306, 308, respectively. Each carrier generally provides a surface 344 to which sections may adhere to produce tissue-carrier assemblies 298, 300, 302, also referred to as coded tissues. Surface 344 may have been pretreated to promote tissue adhesion, as exemplified in Section V. The positioning of tissue sections on the carriers may be facilitated using any suitable method, including floating sections on the surface of a water bath or using a tape-transfer system, such as the tape-transfer system available from Instrumedics, Inc. of Hackensack, N.J. Stable attachment of a positioned tissue section may be enhanced by an additional treatment, such as heating and/or drying. Coded tissues 298, 300, 302 may be combined to create a nonpositional coded tissue composition, also referred to as a coded tissue library (see FIG. 5).

5.2 Alternative Strategies for Tissue-Code Association

Figure 7:
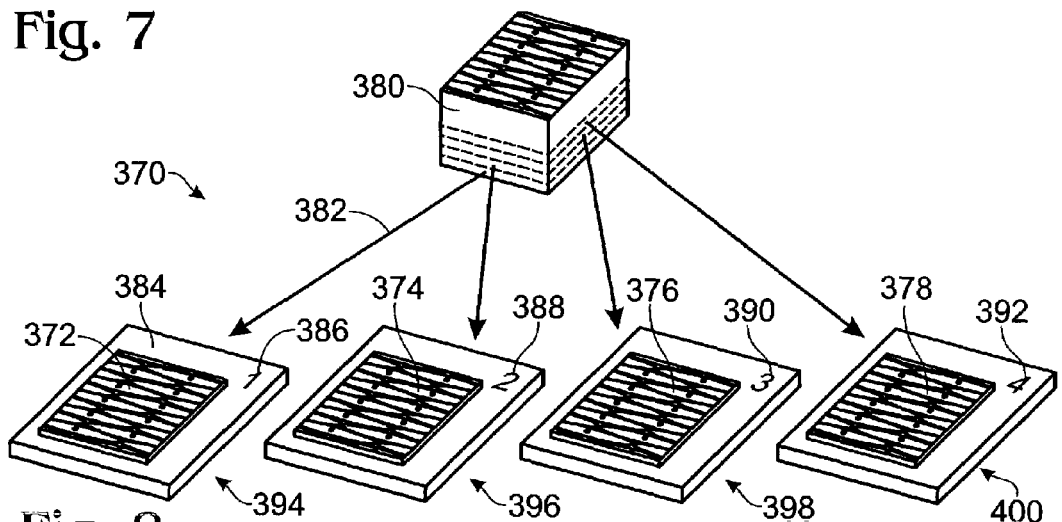
FIG. 7 is an isometric schematic view of an alternative method for making tissue-carrier assemblies, in accordance with aspects of the invention.

FIG. 7 shows an alternative strategy 370 for making coded tissue carriers. Here, tissue sections 372, 374, 376, 378 from tissue 380 are associated, shown at 382, with coded carriers 384 having distinct codes 386, 388, 390, 392, respectively. Thus, sections derived from the same tissue produce carrier assemblies 394, 396, 398, 400 having distinct codes. Distinct carrier assemblies then may be placed in different nonpositional arrays with other coded tissues and exposed to different cell-analysis materials, analogous to the arrays exemplified in FIG. 4 and described elsewhere in this Detailed Description.

Rather than exposure to different cell-analysis materials, some or all of the coded tissues prepared from a single tissue may be analyzed using one set of cell-analysis materials, for example, to provide three-dimensional analysis of a characteristic(s) of tissue 380. In this case, codes 386, 388, 390, 392 may provide information about the original relative positions of sections 372, 374, 376, 378 in the tissue. Alternatively, or in addition, coded tissue carriers may be exposed to different reaction conditions to analyze different characteristics of tissue 380. In this case, the codes may identify both the cell-analysis materials, such as labels, exposed to the tissue section and the tissue origin and relative original position of a section within the tissue. Any of the above tissue analyses may be performed with a single tissue or plural tissues from distinct sources.

5.3 Forming an Array of Coded Carriers having a Single Code

Figure 8:
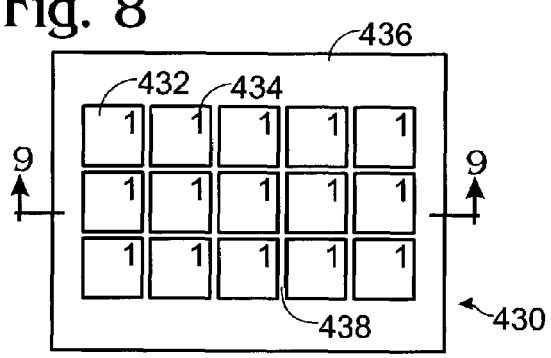
FIG. 8 is a top plan schematic view of an ordered array of coded carriers having identical codes, in accordance with aspects of the invention.
Figure 9:
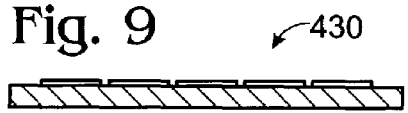
FIG. 9 is a cross-sectional side view of the array of FIG. 8, taken generally along line 9-9 in FIG. 8.

FIGS. 8 and 9 show an ordered array 430 of coded carriers having a common code. Such an array may be used to facilitate subsequent tissue association with carriers, as detailed below. Array 430 includes coded carriers 432 having an identical code 434. To form the carrier array, each carrier 432 may be arrayed on a substrate 436. Exemplary arrays include (1) regular, uniform, or ordered arrays, such as square, rectangular, and hexagonal arrays, among others, and (2) irregular, nonuniform, or disordered arrays, such as random arrays, among others.

A carrier array may be constructed using any suitable mechanism. For example, the array may be constructed using a multi-step process in which carriers 432 first are preformed and later are positioned and immobilized on substrate 436. The steps of positioning and immobilizing the carriers may occur simultaneously or sequentially, and individually or en masse. Immobilization may use an adhesive on the substrate and/or carriers. In some embodiments, carriers may be immobilized en masse using an activatable adhesive. Such an adhesive may be activated by heat and/or irradiation, among others, and may be provided by an inherent, activatable property of a surface of substrate 436.

The array may be broken up after tissue is associated with the carriers. For example, the carriers may be separated from the substrate and/or the substrate may be divided into portions between the carriers. Carriers may be separated from the substrate by dissolving the adhesive, the substrate, or both. For example, in some embodiments carriers are associated with paraffin-embedded tissue sections. In these embodiments, after applying a paraffin section to a carrier, the paraffin may be removed with a solvent to facilitate subsequent exposure to cell-analysis materials. Thus, analysis of paraffin-embedded tissue sections may include treatment with an organic solvent, such as xylene. In this case, the substrate and/or the adhesive may be soluble in xylene.

The substrate may be divided into portions by separating it along interstitial regions 438 between carriers using any method capable of cutting or otherwise portioning the substrate. These methods may include (1) mechanical means, such as a sharp cutting edge or punch, (2) manual means, such as tearing, (3) chemical means, such as etching, and/or (4) optical means, such as laser cutting. The portioning may be facilitated using any suitable mechanism, including guidelines, perforations, and/or scoring. In some embodiments, the substrate may be precut into a plurality of portions that remain attached to one another and/or to a common surface by a dissolvable attachment substance, such as gelatin. The substrate then may be divided by dissolving the attachment substance.

5.4 Alternative Methods of Forming an Array of Coded Carriers—1

Figure 10:
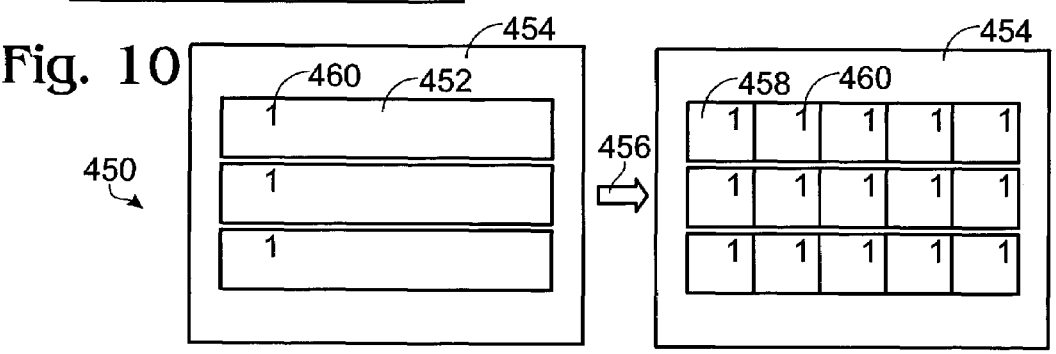
FIG. 10 is a top plan schematic view of a method for making a linear array of coded carriers having the same code, in accordance with aspects of the invention.

FIG. 10 illustrates a method 450 for making an ordered array of coded tissue carriers having defined codes. Here, coded carriers with equivalent codes are produced by cutting a coded fiber perpendicular to its long axis, for example, as described in U.S. patent application Ser. No. 09/694,077, filed Oct. 19, 2000, which is incorporated herein by reference. Specifically, one or more coded fibers 452 are positioned and immobilized in an at least generally parallel configuration on a substrate 454. By selectively cutting coded fibers 452 at least substantially perpendicular to the long axis of the fibers, shown at 456, without destroying the integrity of the underlying substrate, linear arrays of carriers 458 with identical codes 460 may be produced. FIG. 10 shows all linear arrays having a common code. However, in other embodiments, each linear array or row may have a distinct code. For example, row 1 may have code 1, row 2, may have code 2, and so on.

5.5 Alternative Methods of Forming an Array of Coded Carriers—2

Figure 11:
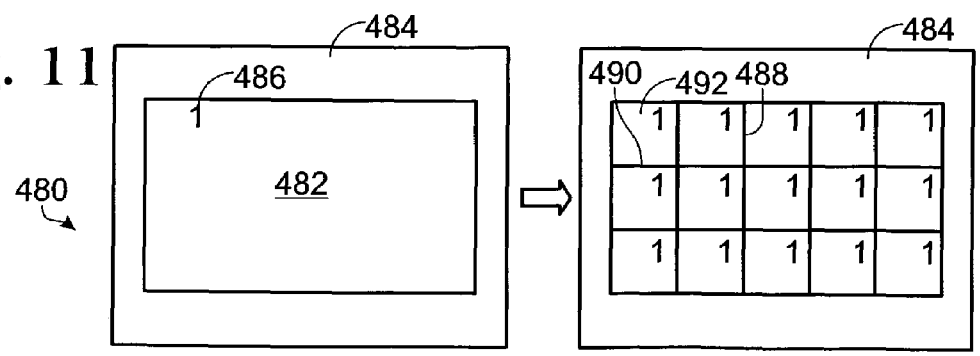
FIG. 11 is a top plan schematic view of an alternative method for making an array of coded carriers having the same code, in accordance with aspects of the invention.

FIG. 11 shows another method 480 for making an array of coded carriers having identical codes. Here, coded carriers with equivalent codes are produced by cutting a coded sheet perpendicular to its plane, as described in U.S. patent application Ser. No. 09/694,077, filed Oct. 19, 2000, which is incorporated herein by reference. Specifically, a coded sheet 482 is immobilized on a substrate 484, where the coded sheet includes a code 486. In this example, the same code is carried at many positions within the sheet. By selectively cutting coded sheet 482 along spaced planes 488, 490 at least substantially perpendicular to the sheet, without destroying the integrity of the underlying substrate, plural carriers 492 having identical codes are produced in a positional array format.

5.6 Alternative Coded Array

Figure 12:
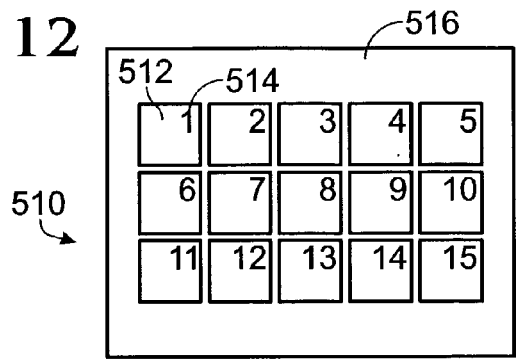
FIG. 12 is a top plan view of an ordered array of coded carriers having different codes, in accordance with aspects of the invention.

FIG. 12 shows an ordered array 510 of coded carriers 512 having different codes 514. Here, substrate 516 immobilizes the coded carriers in an ordered, ascending code configuration. Array 510 may be prepared by placing coded carriers in an ordered array, manually and/or robotically, or as described below.

5.7 Methods of Forming an Alternative Coded Carrier Array

Figure 13:
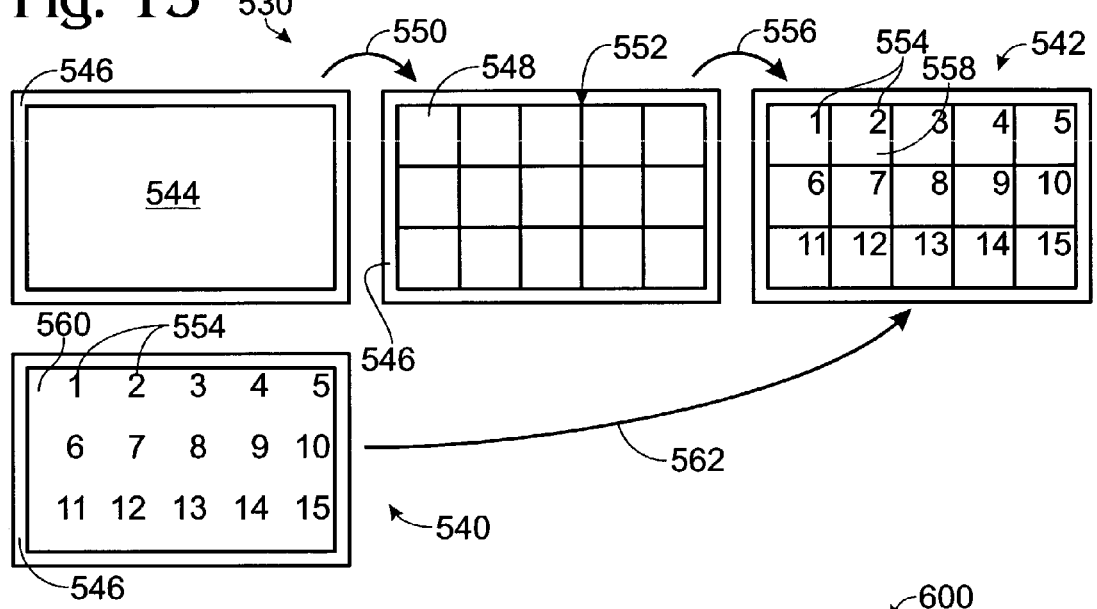
FIG. 13 is a top plan schematic view of two methods for making an ordered array of coded carriers having different codes, in accordance with aspects of the invention.

FIG. 13 illustrates methods 530, 540 for making an ordered array 542 of coded carriers having identical and/or different codes. In method 530, an uncoded sheet 544 of material suitable for use as a carrier is attached to a substrate 546. Typically, the sheet and the substrate are different materials having differential sensitivity to a treatment capable of portioning sheet 544 into carriers 548, shown at 550. Portioning may be carried out with a laser or any other suitable portioning means, such as those described in Example 5.3 above, to form divisions between carriers. Portioning may produce positioned set 552 of uncoded carriers on substrate 546. Codes 554 then may be placed on carriers 548, shown at 556, to provide array 542 of coded carriers 558. In some embodiments, codes and divisions may be printed by microlithography.

Method 540 begins with a coded sheet of material 560 positioned on substrate 546. The coded sheet may be formed by placing codes 554 at appropriate positions on a sheet. For example, the codes may be produced during the formation of the sheet, such as by molding the codes on a surface of the sheet. Alternatively, the codes may be produced after sheet formation, for example, by printing the codes or by using film. Portioning the sheet into carriers 558, shown at 562, forms array 542. Some embodiments of methods 530 and 540 do not use a substrate and/or may portion the sheet after tissue association, as exemplified below.

5.8 Alternative Methods for Associating Tissue with Carriers

Figure 14:
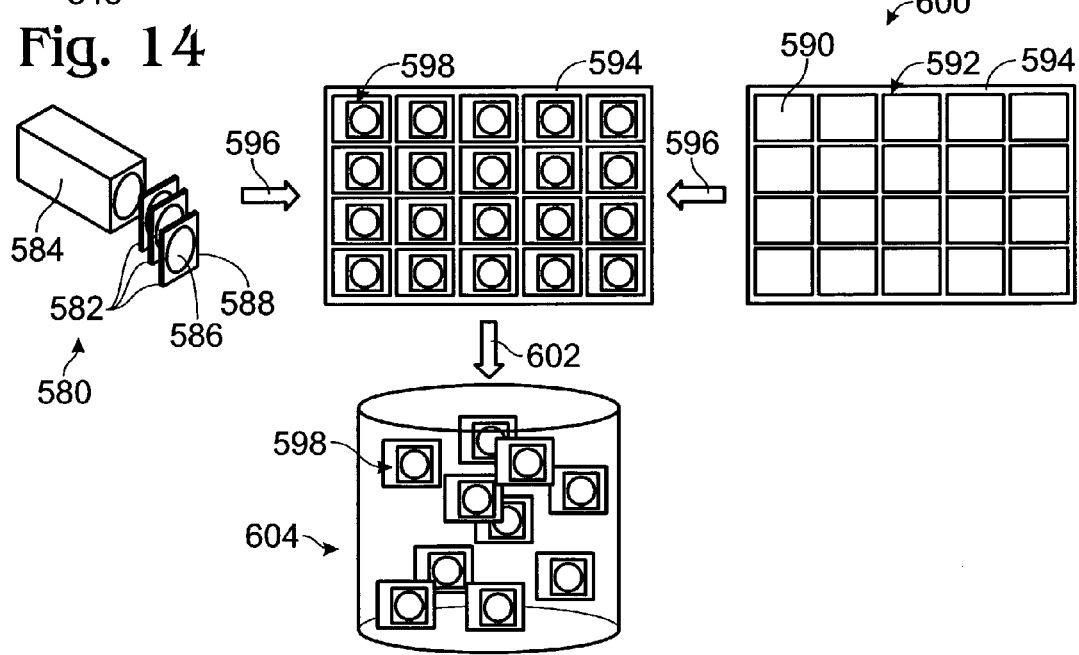
FIG. 14 is a schematic view of a method for associating tissue with an array of coded carriers, in accordance with aspects of the invention.

FIG. 14 illustrates a method 580 for associating tissue with carriers. Here, tissue sections 582 are produced by sectioning tissue 584. Each tissue section may include a tissue portion 586 and supporting medium 588. Supporting medium 588 generally comprises any material, such as paraffin, capable of supporting and/or holding tissue 584 during sectioning. Generally, the terms tissue and tissue section may include any supporting medium material 588. Tissue 584 may provide sections 582 with a cross sectional area generally less than or equal to the cross sectional area of carriers 590 of array 592 on substrate 594. Each carrier typically has a code (not shown) prior to tissue association, although a code may be added to the carrier after tissue association in some embodiments. A tissue section 582 is applied to an accessible surface of each carrier 590, shown at 596, to create tissue-carrier assemblies 598. Because sections 582 may be placed individually on carriers 590, the carriers may be provided in a regular array 600 to facilitate robotic section placement or may be provided in a less ordered array for manual or robotic placement. Coded tissue carriers 598 may be separated and disarrayed, shown at 602, to create nonpositional array 604.

Figure 15:
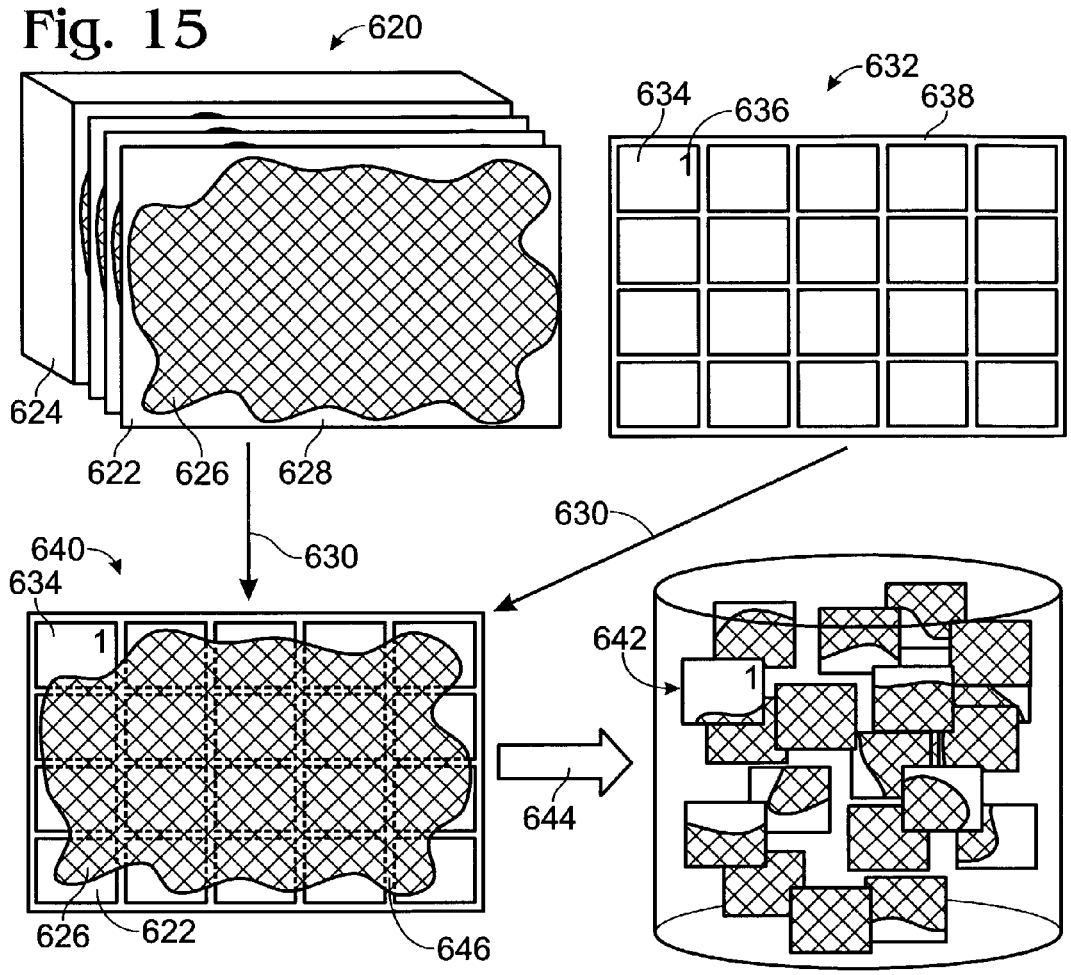
FIG. 15 is a schematic view of an alternative method for associating tissue with an array of coded carriers, in accordance with aspects of the invention.

FIG. 15 illustrates another method 620 for associating tissue with carriers. A tissue section 622 is produced from a tissue 624. Section 622 may include tissue portion 626 and support medium 628. Section 622 is associated, shown at step 630, with a coded array, 632 that includes plural coded carriers 634 having common and/or distinct codes 636 (only a single code on one carrier is shown here). Array 632 may be disposed on a substrate 638 and generally includes a common, substantially planar region formed by coplanar surfaces of carriers 634. Association applies section 622 to array 632, so that the section extends over, and is attached to, plural carriers 634 in array 632, to form tissue-array assembly 640. Individual tissue-carrier assemblies 642 are produced by disarraying carriers from their arrayed position, shown at 644. Disarraying may be carried out by (1) destroying the tissue junctions 646 between carriers, and (2) disrupting any substrate junctions holding the carriers in the array. Both processes may be carried out with any suitable method, such as cutting or the other portioning methods described above. Alternatively, tissue junctions 646 may be torn by agitation of coded carriers once the integrity of, or attachment to, a substrate is disrupted.

Figure 16:
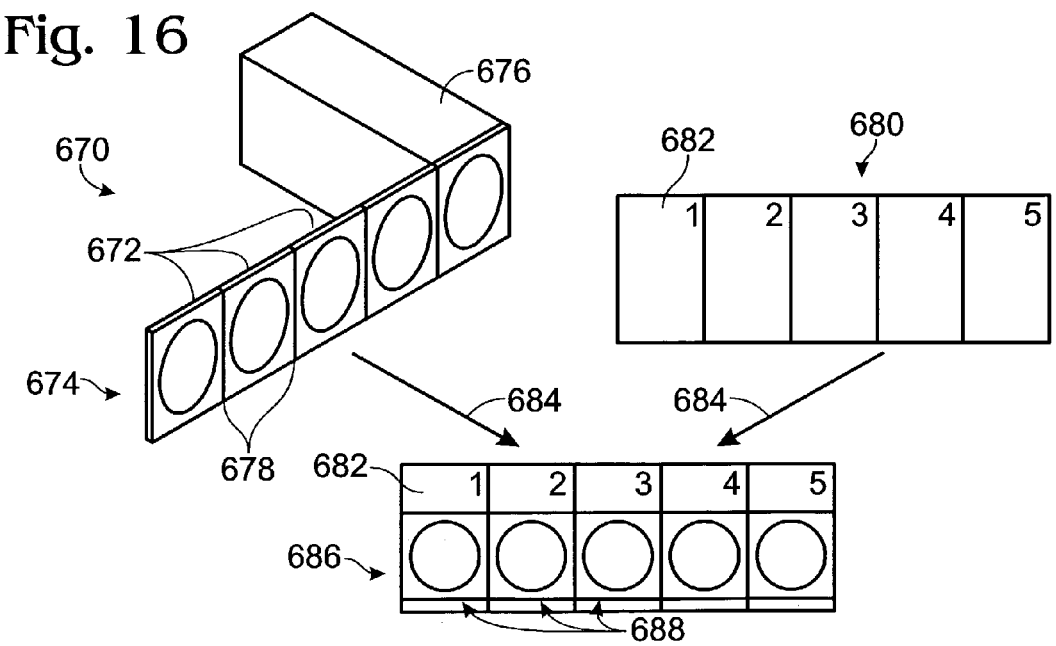
FIG. 16 is a schematic view of a method for associating a linear array of tissue sections with a linear array of carriers, in accordance with aspects of the invention.

FIG. 16 shows a modified version 670 of the method of FIG. 14. Specifically, plural tissue sections 672 are formed as a ribbon 674 when tissue 676 is sectioned. To form the ribbon, any standard sectioning protocol may be used that causes adjacent tissue sections to adhere at end-to-end junctions 678. For example, serial sections of paraffin-embedded tissue produced by a rotary microtome typically adhere at their ends to create ribbon 674. Tissue ribbon 674 may be applied to a linear array 680 of coded carriers 682, shown at 684, to form a tissue-carrier array 686. The width or spacing of each carrier in carrier array 680 may be substantially equal to the width or spacing of sections in ribbon 674, to facilitate proper application of each section to a carrier. Individual tissue-carrier assemblies 688 may be formed readily during separation of carriers 682 from a substrate (if used) because junctions 678 between sections are generally fragile.

Example 6

Multiplexed Analysis of Cell Characteristics

This example, illustrated in FIGS. 17-22, describes selected cell characteristics that may be suitable for multiplexed analysis of nonpositional arrays of cells and/or cell-analysis materials, including arrays of patient test samples. These cell characteristics may be used to screen for modulators affecting various aspects of cell function, such as subcellular distribution of a cellular component, transit through the cell cycle, specific cell cycle arrest, cell toxicity, and/or gene amplification. In addition, these cell characteristics may be used for any other analysis described in this Detailed Description.

6.1 Multiplexed Analysis of Subcellular Distribution

FIG. 17 illustrates a method 710 for measuring subcellular distribution of a cell component. Subcellular distribution may be used as a cell characteristic to screen modulators that alter aspects of cell function. In this case, the subcellular distribution of a cell cycle regulator, cyclin B, is measured. In cells undergoing cell division, cyclin B resides in the cell cytoplasm, but then translocates to the cell nucleus in late G2 phase of the cell cycle. Thus, the subcellular distribution of cyclin B within a cell population may measure or indicate cell characteristics such as mitotic index, growth state, and/or cell cycle arrest in G2 or elsewhere in the cell cycle, among others.

Cyclin B may be measured by labeling cyclin B in cells with antibodies specific for cyclin B. Alternatively, cells may be engineered to express GFP-cyclin B fusion protein. A GFP-cyclin B fusion is expected to colocalize in cells with unfused cyclin B, show directly detectable fluorescence after excitation with light, and thus may be detected in living cells. As a reference and/or to allow measurement of another cell characteristic, cells may also be labeled by a nuclear stain, such as DAPI.

Cells 712, 714 of FIG. 17 illustrate two expected patterns of cyclin B distribution and may represent a single cell cycling, shown at 716, into and out of late G2. In cell 712, the cyclin B signal 718 is observed in the cytoplasm, nonoverlapping with the DAPI nuclear signal 720. In contrast, as shown in cell 714 at late G2 in the cell cycle, both the cyclin B and DAPI signals are colocalized in the nucleus.

A normal population of growing cells analyzed in this fashion ("CONTROL") is expected to have a detectable percentage of cells that appear similar to cell 714 and a majority of cells similar to cell 712. Modulators may thus be analyzed to identify ones that alter the percentage of cells with cytoplasmic or nuclear cyclin B. For example, a modulator that directly or indirectly prevents cyclin B entry into the nucleus will produce a population of cells with many individual cells that appear as cell 722. Other modulators may produce an increased or predominantly nuclear cyclin B pattern within the population, such as that seen in cell 714.

In other embodiments, other GFP fusion proteins and/or other cell labels are used to identify modulators that regulate the distribution of other proteins. Exemplary proteins and/or other cell components/structures for fusion to GFP and/or labeling are included in Sections IV and X and elsewhere in this Detailed Description.

6.2 Multiplexed Quantification of a Cellular Component

The level of a cell component(s) may be used as a cell characteristic, as exemplified in FIG. 18. In method 730, a nuclear component is quantified. However, any subcellularly or widely distributed cellular component(s) may be analyzed. DNA content 732, 734 is revealed in cells 736, 738, respectively, by exposing the cells to a DNA label, such as DAPI. The level of DNA in quiescent and cycling diploid cells ranges between 2N (G0/G1) and 4N (G2/M) chromosome copy number, dependent upon position in the cell cycle. Thus, DNA content may provide an indication of cell characteristics related to cell cycle function, such as position in the cell cycle; ploidy, including aneuploidy; duration of the cell cycle; relative ratios of G0/G1, S, and G2/M cells in a population; and/or checkpoint function. In addition, modulators and/or other cell-analysis materials may be used to alter the average DNA content in a population of cells, allowing identification of cell-analysis materials of interest. Such a material of interest may arrest cells a specific point in the cell cycle (such as G2), remove cells from the cell cycle, shift cells to a more rapid rate of mitosis, and/or counteract the effect of a compound/modulator, among others.

6.3 Multiplexed Analysis of Nuclear Frequency

FIG. 19 exemplifies a method 750 for measuring the number of nuclei within cells to identify modulators that block or otherwise affect cytokinesis. Cells 752 are labeled with a cytoplasmic label 754 that detects cytoskeletal actin, and a nuclear label 756, such as DAPI. By labeling both cytoplasm and nucleus, the number of nuclei in each cell may be determined readily. As part of the analysis, cells may be exposed to cell-analysis materials, such as modulators, generally prior to labeling. Modulators that disrupt or block cytokinesis are expected to produce cells 758 that include two or more nuclei 756 or a tetraploid DNA content.

6.4 Multiplexed Analysis of Micronuclei Formation

FIG. 20 illustrates a method 770 for identifying modulators and/or other cell-analysis materials that affect micronuclei formation. The formation of micronuclei is an indicator of toxicity or carcinogenesis for a cell and may result from defects in cell cycle progression and/or checkpoint function, among others. Thus, many toxic agents promote formation of micronuclei.

In method 770, cells 772 are treated with a toxic agent, shown at 774. Total DNA is labeled in cells to allow detection of nuclei 776 and micronuclei 778 in cells 772. Cells may also be exposed to cell-analysis materials, such as modulators, shown at 780, generally prior to DNA labeling. As indicated by comparing the consequences of steps 774 and 780, an effective modulator may be identified that alters the action of the toxic agent by inhibiting micronuclei formation. In other embodiments, multiplexed analyses may be performed to screen for toxic agents that promote micronuclei formation.

6.5 Multiplexed Analysis of Spindle Defects

Figure 21:
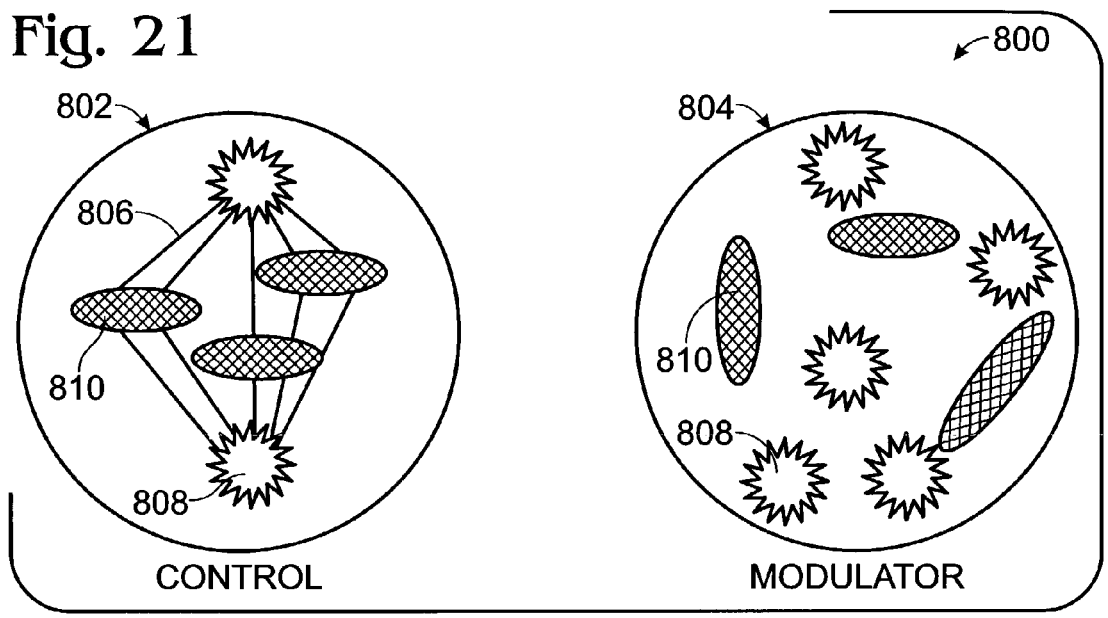
FIG. 21 is a schematic view of a method for analyzing mitotic cells, illustrating the appearance and/or functional activity of mitotic spindles as a cell characteristic for multiplexed cell and modulator analysis, in accordance with aspects of the invention.

Method 800, shown in FIG. 21, illustrates how cells may be analyzed in nonpositional arrays for spindle defects to identify cell-analysis materials, such as modulators, that produce, promote, and/or inhibit formation of spindle defects. Mitotic cells 802, 804 are labeled for microtubules 806 and/or microtubule organizing centers 808 (MTOCs; referred to as centrosomes during interphase). Microtubules may be identified using alpha or beta tubulin indicators, such as GFP-tubulin fusion proteins or anti-tubulin antibodies. MTOCs may be identified with gamma-tubulin labels. DNA/chromosomes 810 may be labeled with any suitable label such as a DNA stain, or a histone label, among others. Control cells 802 will generally show a normal bipolar spindle with condensed chromosomes aligned at the metaphase plate and chromosome migration toward opposite poles. In contrast, diseased cells or cells exposed to effective modulators or other cell-analysis materials, exemplified by cell 804, may show increased numbers of microtubule organizing centers, inability to form spindle fibers, inability to align chromosomes on the metaphase plate, increased numbers of chromosomes, ploidy, and/or increased centrosome number in interphase cells.

6.6 Multiplexed Analysis of Gene Amplification

Figure 22:
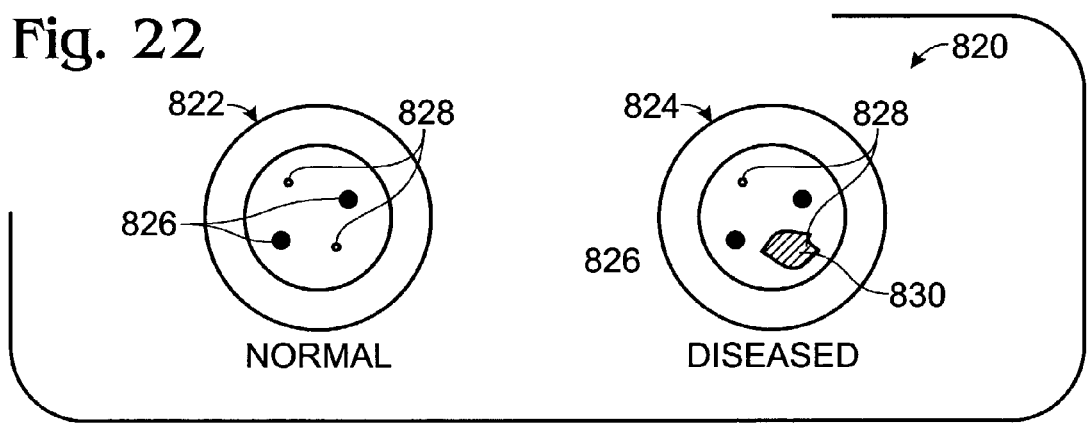
FIG. 22 is a schematic view of a method for measuring gene copy number of normal and diseased cells as a cell characteristic for multiplexed patient sample analysis and/or cell analysis, in accordance with aspects of the invention.

Method 820 shown in FIG. 22 illustrates how gene copy number, gene amplification, and/or other genetic abnormalities may be used as a cell characteristic to multiplex-analyze patient biopsies, tumor samples, or other clinical samples. Gene amplification is a frequent cause (and effect) of uncontrolled growth and tumorigenesis. To test for gene amplification, cells 822, 824 are obtained from patients, for example, from breast biopsies. The cells are associated with coded carriers and labeled with a control label, for example, to identify a region of chromosome 17. The control label produces control signals 826. In addition, the cells are labeled with a diagnostic DNA marker such as for HER-2 to produce a test signal 828. Normal diploid cells 822 will show two, three, or four chromosome control signals (two are shown here), depending upon position of each cell in the cell cycle. Diseased cells 824 also may show a similar number of control signals 826. However, test signal 828 is enhanced strongly in an amplification region 830 in diseased cells 824. In other embodiments, other diagnostic DNA labels may identify any other DNA sequence or region known to be diagnostic or prognostic for a disease state.

Example 7

Receptor/Ligand Assay Systems

This example, illustrated in FIGS. 23-28, describes the use of multiplexed assay systems with coded carriers to identify and/or characterize receptor ligands and/or modulators of receptor/ligand interactions.

Molecular pharmacology is the study of drugs at the cellular and subcellular levels, including their composition, uses, and effects. Table 3A illustrates a classic approach to molecular pharmacology. This approach begins with the identification of a biological function or activity to be studied and understood (i.e., it begins by identifying a problem to be solved). For example, under the classic molecular pharmacology approach, a given phenotype, such as a particular disease, is identified, and an experimental pathway is developed to find a therapy or cure for that phenotype. Typically, experimentation begins with isolation or purification of a ligand that is identified as being part of the biological pathway leading to the given phenotype. Unfortunately, this may be an expensive and time-consuming process. Once a particular ligand associated with the phenotype is identified, additional experimentation is performed to characterize the ligand and its biological function. Through this experimentation, a high affinity partner that interacts with the ligand such as a particular receptor or class of receptors may be identified. Unfortunately, this again may be an expensive and time-consuming process. Once a receptor or class of receptors is identified, a variety of compounds are screened for their ability to affect the interaction between the ligand and the receptor. The effect on interaction may be direct or indirect, and it may increase or decrease the ligand's ability to interact with the receptor. Once a compound of interest is found that affects the ligand-receptor interaction in a desirable manner, the compound of interest can be investigated for possible development into clinical applications, such as drugs, vaccines, therapeutic compounds, and the like.

TABLE 3

Classic vs. Reverse Molecular Pharmacology

| A. Classic | B. Reverse |
|---|---|
| Function/activity | Bioinformatics/Molecular Biology |
| Ligand | Receptor |
| Biology | Ligand |
| Receptor | Compound Screening |
| Compound Screening | Biology |
| Clinical Development | Clinical Development |

The invention provides improved assay systems for molecular pharmacology that use reverse molecular pharmacology and/or coded carriers to identify and/or characterize receptor ligands and/or modulators of receptor/ligand interactions. The reverse molecular pharmacology approach mines the large database of knowledge that has been accumulated through the growing field of bioinformatics for information that can lead to discovery of drug candidates and other potential therapeutic compounds. In other words, instead of looking for a specific biological problem to solve, the reverse molecular pharmacology approach looks for pre-existing or readily found answers and then identifies the problems that can be solved with those answers.

Table 3B shows a new reverse molecular pharmacology approach that is available with the use of coded carriers that may be used to search for receptor and/or ligand related drugs. Here, a particular receptor or class of receptors that is known or believed to be associated with a particular biological function, such as a particular disease pathway, is exposed to a variety of characterized or uncharacterized ligands. Ligands and receptors that show activity are isolated, and compounds are screened for their ability to affect the ligand-receptor interaction. Once target compounds are identified, the researcher may choose to characterize the biological function of the isolated ligand and receptor, i.e., the researcher may try to define the particular role that the ligand and receptor play in the disease pathway and/or in normal physiology. However, clinical development can take place with or without knowledge of the specific function of the ligand and receptor. The reverse molecular pharmacology approach typically requires significantly less discovery work than the classic molecular pharmacology approach and thus may provide target compounds faster, cheaper, and with less labor than the classic approach.

Figure 23:
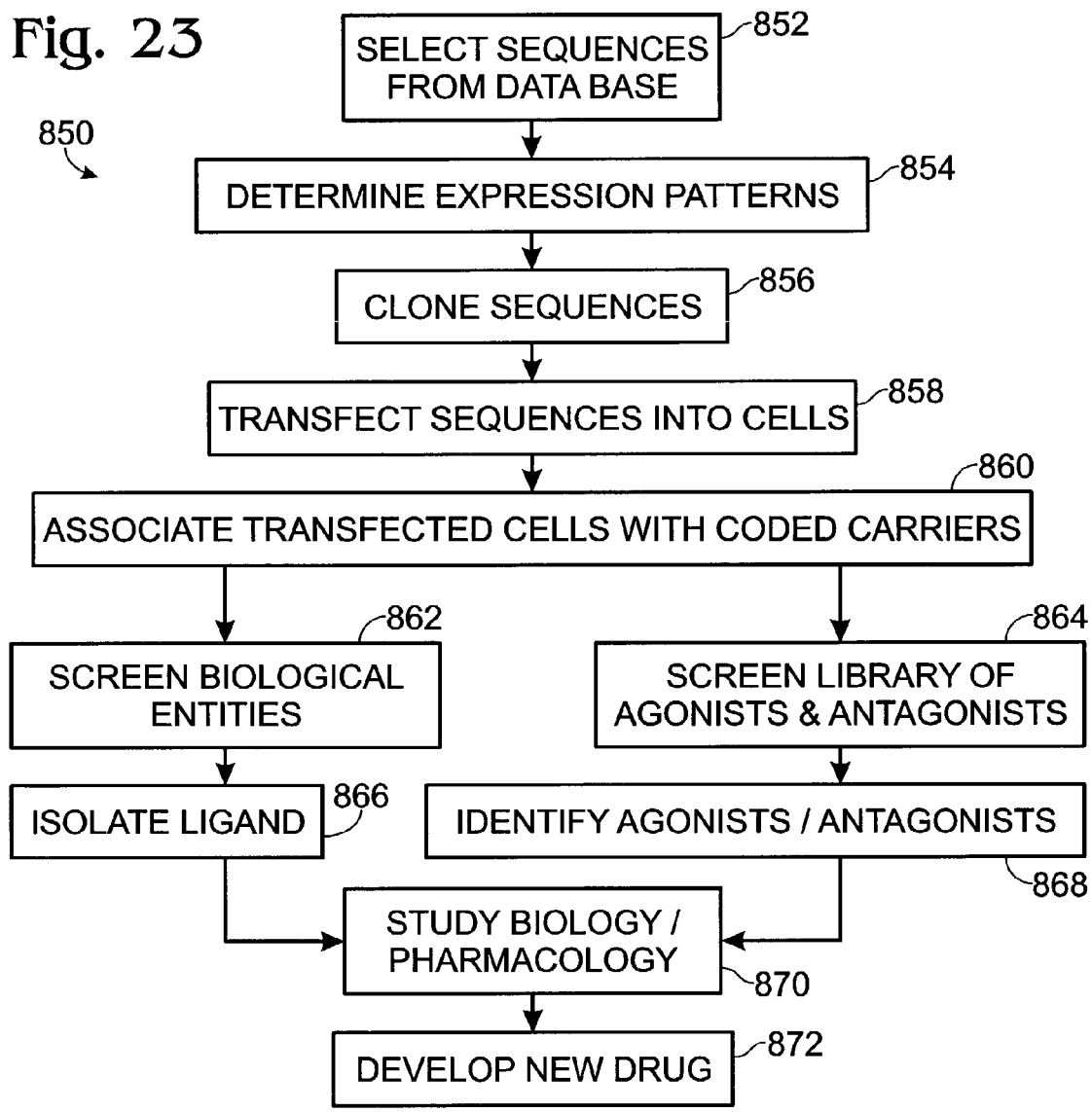
FIG. 23 is a flowchart showing methods for performing new reverse molecular pharmacology assays using multiplexed analysis of coded carriers, in accordance with aspects of the invention.

FIG. 23 shows how a reverse molecular pharmacology approach 850 may be used with coded carriers. First, nucleic acid sequences known or likely to correspond to receptors or other molecules of interest are identified from public or privately available databases such as gene banks or others sources, shown at 852. These nucleic acid sequences also may be analyzed to determine expression patterns of the receptors or other molecules of interest, for example, via gene microarrays, shown at 854. The nucleic acid sequences may be cloned into expression vectors to direct expression of the receptors or other molecules of interest, shown as 856. Next, in any order, these sequences are transfected into cells or other expression vehicles (such as E. coli, plant, yeast, and the like), shown at 858, and the cells are attached to or otherwise associated with distinguishable coded carriers, as shown at 860 and described in Section V. Generally, one or a small number of transfected cell lines are associated with each type of carrier, so that the transfected sequence(s) can be identified by reading the code on a carrier. Next, the carriers and their associated cell lines may be used to probe or screen, either singly or in combination, biological entities/cells, such as whole cells, viruses, phages, tissue, extracts, or the like, shown at 862. Alternatively, the carriers and cells may be used to screen members of a library, such as a compound or expression library of potential agonists or antagonists, shown at 864. Finally, as desired, those biological entities and/or library members that elicit a response may be isolated and/or identified, shown at 866 and 868, for use in studying their biology and/or pharmacology, shown at 870, which may result in developing new drugs or other applications, shown at 872 and described above.

This approach also facilitates identifying multi-component receptors or required receptor-associated proteins/macromolecules. For example, a population of cells may be transfected randomly with multiple expression sequences and then cultured to generate separate cell lines. Once such a multi-transfected cell line is shown to respond to one or more ligand, the sequences of the transfected components can be identified by isolating cellular DNA fragments containing a signature sequence of the transfection vehicle and sequencing the isolated fragments.

The receptor or other molecule of interest generally comprises any molecule or molecular assembly on or about an external surface, plasma membrane, or interior of a cell that interacts with a binding partner or ligand to effect a biological response or alter a cell characteristic (see Section X). Exemplary cell surface receptors may include G-protein coupled receptors (GPCRs), ion-channel-coupled receptors (e.g., transmitter-gated ion channels), enzyme-coupled receptors (e.g., protein kinases), and cytokine receptors (e.g., receptors for interleukins, lymphokines, interferons, colony stimulating factors, platelet-activating factors, and tumor necrosis factors), among others. Exemplary cell interior receptors may include nuclear hormone receptors such as steroid hormone receptors (e.g., receptors for cortisol, estradiol, and testosterone), thyroid hormone receptors (e.g., receptors for thyoxine), and retinoid receptors (e.g., receptors for retinoic acid). Exemplary binding partners may include antibodies, antigens, cells, cell-signaling components, drugs, peptides, pollutants, prions, proteins, recombinant proteins (wild type, mutant, or fusion proteins that include wild type, mutant, and/or altered proteins), toxins, viroids, viruses, and the like.

In turn, cell-signaling components may include endocrine hormones (e.g., adrenaline, cortisol, estradiol, glucagon, insulin, testosterone, thyroxine, etc.), local mediators or paracrine signals (e.g., epidermal growth factor (EGF), platelet-derived growth factor (PDGF), nerve growth factor (NGF), histamine, nitric oxide, etc.), neurotransmitters (e.g., acetylcholine, γ-aminobutyric acid (GABA), etc.), and contact-dependent signaling molecules (e.g., delta, etc.).

The nucleic acid sequences encoding the receptors, receptor synthesis pathways, or other molecules of interest may be identified using any suitable method. These methods include examining databanks for existing sequences having homology with known proteins displaying the desired function. These methods also include generating new sequences by modifying known sequences and/or by synthesizing novel sequences, for example, using combinatorial methods.

The identified nucleic acid sequences, also referred to as transfection materials, may be transfected into cells using any suitable method, including stable or transient, classical or and reverse transfection. Cells should transcribe, translate, and express the sequences in an at least partially functional form. Typically, cells are eukaryotic cells. In some cases, two or more nucleic acid sequences may be transfected into the same cell so that interactions between their respective gene products may be identified and/or studied. Other exemplary cells are included in Section III and exemplary transfection materials and methods of transfection are included in Section IV(C).

The cells may be associated with coded carriers using any suitable method, including covalent and/or noncovalent interactions. In some embodiments, such as those involving adherent cells and/or substantially planar particles, the cells may be grown directly on the carriers. Additional exemplary methods for cell association are included in Section V.

Coded cell populations (or, equivalently, the coded carriers associated with cells) may be used to probe or interrogate a biological entity and/or a library member(s) by (1) exposing the coded cell populations to the biological entity, library member(s), and/or other cell-analysis material(s), and (2) detecting interactions through effects on a characteristic(s) of the cell populations such as the extent of binding alone and/or the effects of binding on a biological activity (a phenotypic effect). Interactions may be detected directly, for example, by counting bound ligands. Interactions also may be detected indirectly, for example, by a phenotypic effect brought about by binding. Suitable methods of detecting interactions include using a reporter assay such as a calorimetric, luminescence (e.g., fluorescence, phosphorescence, or chemiluminescence), or other assay having an output signal reflecting binding or an associated biological activity. Exemplary reporter assays include gene expression assays in which the expression of a reporter gene is controlled by a promoter that responds to receptor activation by a ligand. Assay results may be reported qualitatively, for example, binding or no binding, or a change in binding or no change in binding. Alternatively, or in addition, assay results may be reported quantitatively, for example, an absolute or relative amount of binding, or an absolute or relative change in binding. Additional exemplary methods of exposing cell-analysis materials to cells are included in Section VI. Other exemplary cell characteristics and interactions are included in Section X.

The use of coded carriers allows layers of multiplexing. Specifically, because each distinct coded sample can be identified by the code on the associated coded carrier, multiple coded samples can be mixed together in at least substantially arbitrary positions as a nonpositional or partially positional array for exposure to ligands or other stimuli, such as modulators. In this way, the cell populations that are affected by exposure to a given ligand may be identified. Moreover, sets of ligands capable of interacting with a given cell population, and modulators thereof, may be identified, and the ligands and/or modulators further characterized and studied for possible development into new drugs and/or treatments. In some embodiments, multiple cell populations may be exposed to multiple ligands simultaneously, where the multiple cell populations and multiple ligands may be studied individually if any combination displays a ligand-mediated change in cell characteristic. In other embodiments, multiple cell populations may be exposed to a library of agonists and antagonists, singly or in combination. Those agonists and/or antagonists that interact with the cell populations are then identified and studied for possible drug discovery. Without coded particles, different cell populations typically would have to be grown, treated, and analyzed in separate containers, such as in the individual wells of a microplate. Exemplary modulators are included Section IV(A) and nonpositional and partially positional arrays in Section VIII 7.1 Analysis of G-Protein Coupled Receptors The following describes application of multiplexed analysis with coded carriers to the molecular pharmacology of G-protein coupled receptors (GPCRs); see FIGS. 24-26.

GPCRs are a large superfamily of typically seven-pass transmembrane cell-surface receptors that transduce signals across cell membranes. They mediate responses to an enormous diversity of extracellular signal molecules, including hormones, local mediators, and neurotransmitters. These signal molecules are as varied in structure as they are in function: the signal molecules can be proteins, small peptides, or derivatives of amino acids or fatty acids. Moreover, for each signal molecule, there is a different receptor or set of receptors. GPCRs are involved, to various degrees, in each of the five senses—hearing, sight, smell, touch, and taste—and they are implicated in a large number of diseases. At present, sixty percent of prescription drugs are GPCR agonists or antagonists. Currently, about 600 GPCRs have been identified, including about 200 "orphan" receptors of unknown function. These GPCRs can be used for screening, with the "orphan" receptors especially suitable for reverse molecular pharmacology approaches due to their unknown functions.

Figure 24:
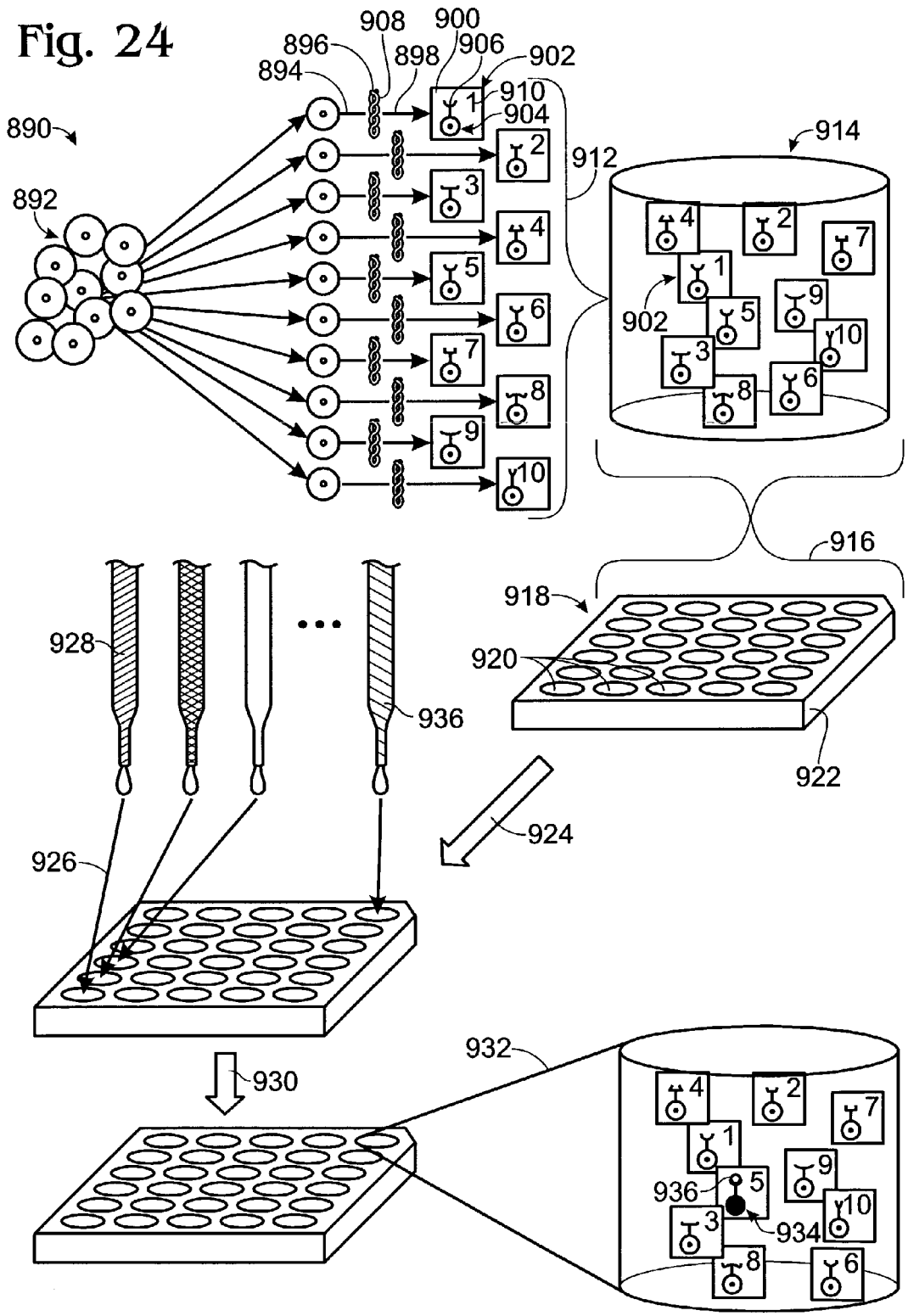
FIG. 24 is a schematic view of an application of a new reverse molecular pharmacology approach to the study of G-protein coupled receptors (or seven transmembrane receptors), in accordance with aspects of the invention.

FIG. 24 illustrates a method 890 for multiplexed GPCR assays in accordance with aspects of the invention. Generally, cells 892 are transfected, shown at 894, with nucleic acids 896 encoding different GPCRs. The cells may be associated, shown at 898, with coded carriers 900, to form cell-carrier assemblies 902, with each associated cell population 904 expressing a distinct GPCR 906. The step of transfection may be carried out before or after association of the cells with the coded carriers. When transfected after association, the cells may be classically or reverse-transfected. In method 890, HEK293 cells are transfected with ten different GPCR receptor sequences 896 and a beta-galactosidase (β-Gal) reporter gene controlled by a cyclic AMP response element (CRE-β-Gal) 908. The CRE-β-Gal reporter generally responds to increased cAMP, which is produced by ligand or agonist binding to many GPCRs, particularly receptors that couple to G-protein complexes that include $G_s$ and $G_q$ protein subunits. In method 890, ten different coded cell populations 904 are produced, each including the CRE-β-Gal reporter 908 and expressing a different GPCR receptor 906. Each cell population is associated with a coded carrier 900 having a distinct code 910.

The coded cell populations 904 are combined, shown at step 912, to form a nonpositional array 914. The array is distributed, shown at 916, to form a positional array 918 that includes plural positionally identifiable nonpositional sibling arrays 920. The sibling arrays are positionally distributed in wells of a microplate 922. Each sibling array 920 may have a substantially similar representation of the coded cell populations 902, or at least generally include each of the coded cell populations. As shown at 924, each array 920 is then exposed, shown at 926, to a prospective agonist 928. After appropriate incubation, shown at 930, β-Gal expression within each cell population is measured by reacting with X-Gal. Measuring β-Gal expression and reading codes on the carriers are shown at 932. An interacting cell population 934 that responds to a particular agonist 936 turns blue upon exposure to the X-Gal, a chromogenic β-Gal substrate, due to increased β-Gal protein levels/activity. Increased β-Gal protein activity is produced by activation of the CRE-β-Gal reporter and is caused by binding interaction between the cell population's GPCR receptor and the particular agonist. By determining which populations turn blue in response to which agonist, specific receptor-agonist interactions are identified. Because the cell populations are coded, it is possible to correlate results with cell type. For example, as shown in FIG. 24, only interacting cell population 934 shows a positive β-Gal signal in response to exposure to agonist 936, and this cell population is identified by reading the "5" code on the associated carrier.

Table 4 more generally expresses the relationship between agonist binding specificity and β-Gal signal for method 890 of FIG. 24. If specific agonist #1 is capable of interacting only with the GPCR expressed on coded carrier number 1 (GPCR1) then only the cell populations containing GPCR1 will turn blue. If specific agonist #2 is capable of interacting only with GPCR2 on carrier number 2, then agonist #2, will show a similar specific effect on cells associated with coded carrier number 2, and so. However, a nonspecific agonist capable of interacting with GPCRs 1-10 will produce a positive β-Gal signal in cell populations associated with carriers having codes 1-10.

TABLE 4

Expected Agonist Specificity Results

| TEST | AGONIST | GPCR | EXPECTED RESULT |
|---|---|---|---|
| 1 | 1 | 1-10 | ONLY GPCR1 CELLS ARE BLUE |
| 2 | 2 | 1-10 | ONLY GPCR2 CELLS ARE BLUE |
| 3 | 3 | 1-10 | ONLY GPCR3 CELLS ARE BLUE |
| • | • | • | • |
| • | • | • | • |
| 6 | 6 | 1-10 | ONLY GPCR6 CELLS ARE BLUE |
| • | • | • | • |
| • | • | • | • |
| 11 | 1-10 | 1-10 | ALL GPCR CELLS ARE BLUE |

Alternative embodiments of method 890 may 1) transfect distinct reporter genes into different cell populations; 2) expose each nonpositional array to more than one cell-analysis material, including a mixture of modulators and/or ligands, one or more local capturing agents, and/or one or more labels; 3) transfect other types of receptors into cells, including unrelated types of receptors in different cell populations; and/or 4) measure effects of cell-analysis materials on endogenous receptor(s) rather than transfected receptors. Additional exemplary embodiments of method 890 are included elsewhere in this Detailed Description.

Figure 25:
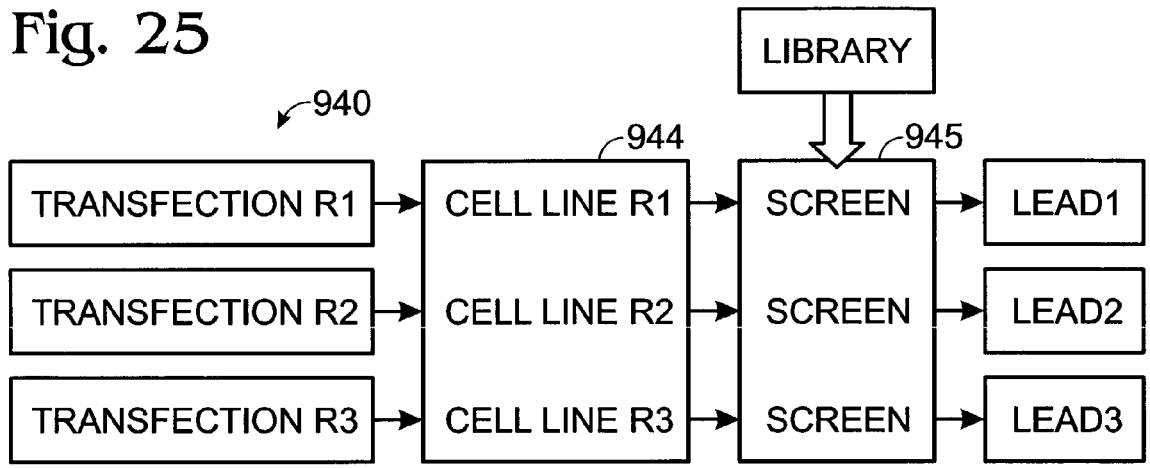
FIG. 25 is a flowchart showing a new reverse molecular pharmacology approach to a multiplexed library screen for the discovery of novel drugs and/or other beneficial compounds, in accordance with aspects of the invention.
Figure 26:
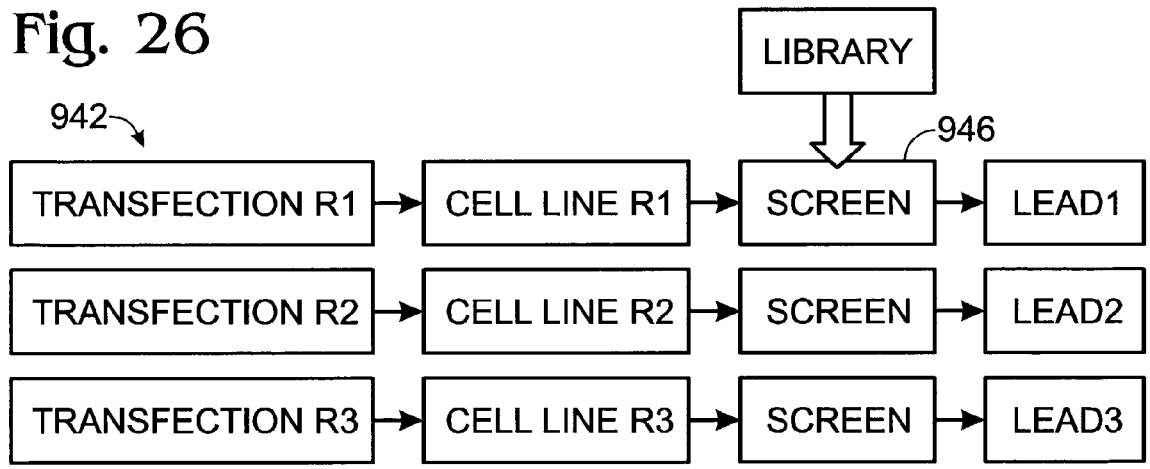
FIG. 26 is a flowchart, for comparison with FIG. 25, showing a current screening approach for the discovery of novel drugs and/or other beneficial compounds.

FIGS. 25 and 26 compare a multiplexed GPCR (and other) assay system 940 with an assay system 942 currently in use, showing how multiplexing may be used to reduce or eliminate assay steps. Specifically, by using a nonpositional array of cell lines 944 expressing distinct receptors (R1, R2, R3) in system 940, a lead compound that interacts with each receptor (lead1, -2, -3) is identified in a single multiplexed library screen 945. In contrast, system 942 performs a distinct screen 946 for each receptor.

Multiplexed GPCR assay systems in accordance with aspects of the invention may include many advantages over other nonmultiplexed systems. These advantages may include cost savings in time, labor, and expensive materials (e.g., chemical libraries). These advantages also may include assay specificity, and sensitivity, and built-in internal controls, allowing focus on diverse GPCRs or families of GPCRs.

7.2 Potency and Specificity Screens Combined

Multiplexed analyses with coded carriers may be used to conduct screens that measure modulator potency, specificity, and toxicity in a single screening step. In contrast, conventional high throughput modulator screens generally are carried out with at least two distinct screening steps. During the first screening step, modulators are identified that show high potency. A second screening step determines the specificity and toxicity of high potency modulators identified during the first screening step. Thus, conventional screens may require additional time, effort, and expense to identify specific, high potency, low toxicity modulators relative to a multiplexed approach with coded carriers. Furthermore, the conventional two-screen approach may overlook useful modulators that show lower potency but high specificity. Such modulators may be important lead compounds in derivatization strategies that increase the potency of lead compounds by synthesizing and testing a set of lead-compound derivatives. In contrast to the conventional screening approach, multiplexed screens with coded carriers may be well suited to identify lead compounds with lower potency but higher specificity.

Figure 27:
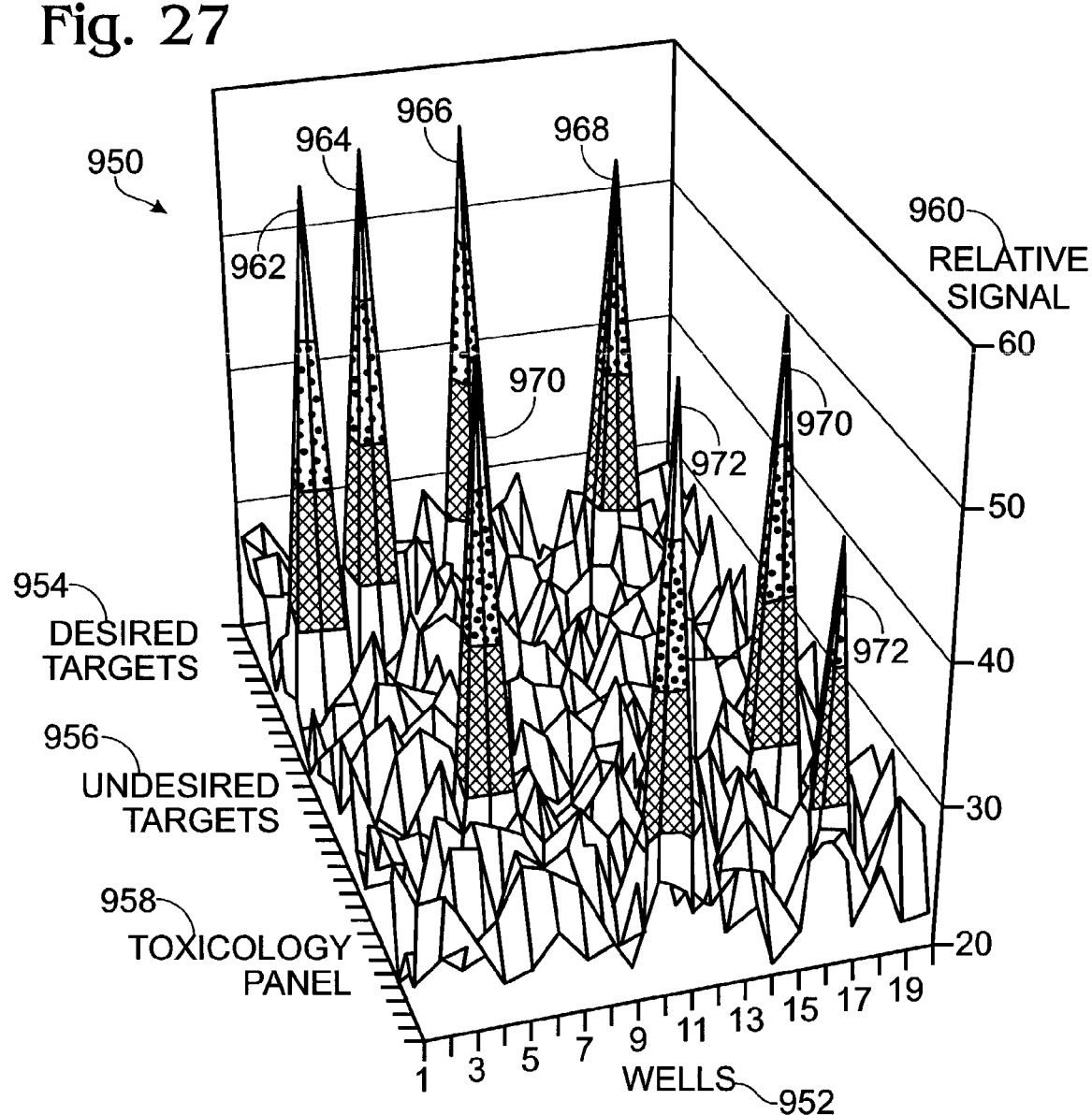
FIG. 27 is a three-dimensional plot showing a multiplexed analysis using coded carriers to identify differences in specificity and toxicity of modulators acting on desired targets, undesired targets, and a toxicology panel, in accordance with aspects of the invention.

Multiplexed analysis 950 of FIG. 27 illustrates how a multiplexed screen with coded carriers may measure modulator toxicity and specificity for targets in a single screen. The analysis is carried out in microplate wells (1-20), indicated at 952, with each well holding a different modulator for screening. Cell lines expressing and/or carrying desired targets 954, undesired targets 956, or toxicity indicators 958 are each associated with a different class of coded carrier, combined to form a nonpositional array, and distributed to form sibling arrays in each of the wells. Desired targets 954 may correspond to a related family of receptors, and undesired targets 956 may correspond to other receptors. Each cell line that carries a desired or undesired target also carries a reporter gene that responds to activation of the desired or undesired target. In addition, the toxicology panel may correspond to receptors with known toxic effects, reporter genes that generally respond to toxic compounds, or other suitable toxicity indicators exemplified elsewhere in this Detailed Description.

Exposure of cell lines to a potential modulator in each well produces signals for each of the cell lines. Relative signals 960 produced by modulator action on each target and toxicity indicator are plotted along the z-axis. As shown, several wells hold modulators that show potent effects 962, 964, 966, 968 on desired targets. However, modulators that produce effects 964, 966, 968 also show nonspecific effects 970, affecting undesired targets 956, and/or toxic effects 972, exhibiting signals within toxicology panel 958. Thus, multiplexed analysis 950 identifies a modulator/compound in well #2 that produces a specific, nontoxic effect 962.

Figure 28:
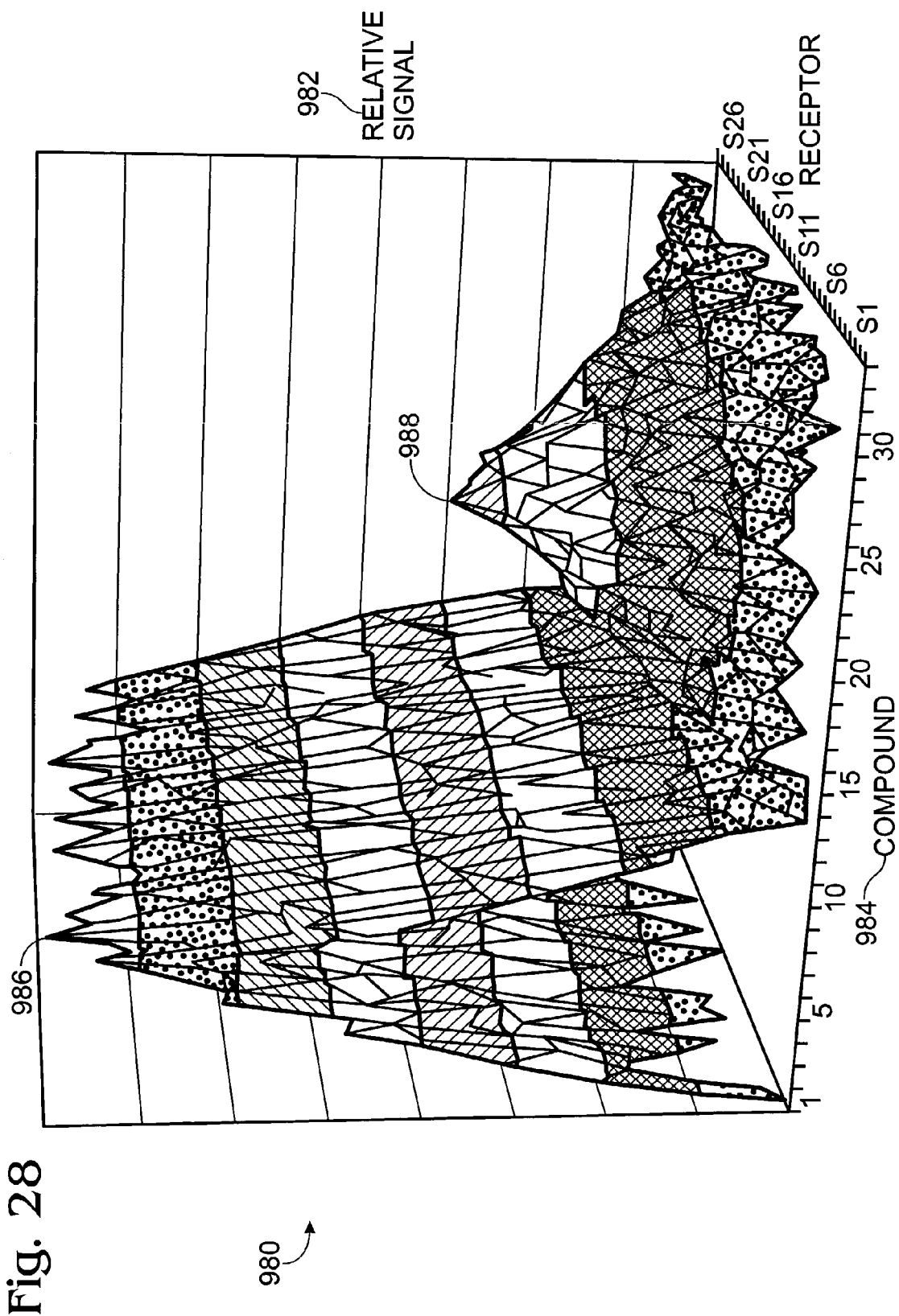
FIG. 28 is a three-dimensional plot showing a multiplexed analysis using coded carriers to identify differences in potency and specificity of modulators (compounds), in accordance with aspects of the invention.

Multiplexed analysis 980 illustrates how compounds with different potencies and specificities may be identified in a modulator screen; see FIG. 28. Here, cell lines expressing different receptors, indicated as S1-S26, are associated with distinct coded carriers and combined in a nonpositional array for multiplexed analysis. Each cell line produces a signal, plotted as relative signal 982 along the z-axis, that reports receptor activity. The signal may be provided by a reporter gene that responds to receptor activation or any other suitable measure of receptor activity. The nonpositional array is distributed to form sibling arrays, and each sibling array is exposed to one of 33 distinct compounds 984. Two compounds with measurable effects are identified. The first compound, #3, produces a relatively strong, but nonspecific signal 986 that is not restricted to specific receptors. In contrast, the second compound, #24, shows a weaker, but more specific signal 988. Signal 988 might be overlooked in a conventional modulator screen, where it would be masked by stronger signals such as signal 986. However, compound #24 may provide an important lead compound for further studies, whereas compound #3 is identified as nonspecific without any additional analysis.

7.3 Further Examples of Receptor/Ligand Methods and Compositions

The following numbered paragraphs illustrate without limitation further aspects of the invention.

1. A method for identifying and/or characterizing receptor/ligand interactions, comprising (1) associating a first cell population expressing a first receptor with a first coded microcarrier to obtain a first encoded cell population; (2) associating a second cell population expressing a second receptor with a second coded microcarrier to obtain a second encoded cell population; (3) exposing the first and second encoded cell populations to at least one ligand; and (4) detecting any interaction between the at least one ligand and the first and second encoded cell populations.

2. The method of paragraph 1 further comprising combining the first and second cell populations prior to the exposing step.

3. The method of paragraph 1, where the exposing step is performed in a multiplexed format.

4. The method of paragraph 1 further comprising depositing the first and second cell populations on a surface.

5. The method of paragraph 1 further comprising screening compounds for their ability to affect any interaction between the at least one ligand and the first and second encoded cell populations.

6. The method of paragraph 1 further comprising identifying an at least one ligand that interacts with at least one of the first and second encoded cell population as a drug candidate.

7. The method of paragraph 1, where the first and second cell populations have been transfected with nucleic acid sequences coding for the first and second receptors, respectively.

8. The method of paragraph 1, where the first and/or second receptors are cell surface receptors.

9. The method of paragraph 8, where the first and second receptors are G-protein coupled receptors.

10. The method of paragraph 1, where the first and/or second receptors are intracellular receptors.

11. The method of paragraph 1, where the ligand is selected from the group consisting of hormones, local mediators, and neurotransmitters.

12. The method of paragraph 1, where the ligand is selected from the group consisting of antibodies, antigens, cells, drugs, pollutants, prions, proteins, recombinant proteins, toxins, viroids, and viruses.

13. The method of paragraph 1, where the each of the first and second coded microcarriers is characterized by an optically detectable code.

14. The method of paragraph 13, where code is formed of plural coding portions, and the plural coding portions are noncontiguous.

15. The method of paragraph 13, where the code is a positional color code.

16. The method of paragraph 1, where the step of detecting any interaction includes detecting ligand bound to receptor.

17. The method of paragraph 1, where the step of detecting any interaction includes detecting a change in phenotype brought about by ligand bound to receptor.

18. The method of paragraph 17, where the step of detecting includes performing a calorimetric or luminescence assay to detect gene expression regulated by ligand bound to receptor.

19. The method of paragraph 1, where the step of detecting includes acquiring a digital image of the first and second cell populations after the exposing step.

20. The method of paragraph 1, where the step of detecting includes acquiring an averaged signal from a well, the well including the first and second coded microcarriers, determining if the averaged signal is positive, and measuring individual signals from each of the first and second coded microcarriers if the signal is positive.

21. The method of paragraph 20, where the individual signals are measured by acquiring at least one digital image.

22. The method of paragraph 1 further comprising relating an assay result from the detecting step to a code on the corresponding microcarrier.

Example 8

Biological Assays Using Coded Carriers

This example, illustrated in FIGS. 29-33, describes the use of coded carriers associated with compound or expression libraries and/or cell populations for fingerprinting, proteomics, and/or molecular screening, among others.

Biological systems are incredibly complex. A single organism may include thousands of different cells, a single cell may include thousands of different molecules, and a single molecule such as DNA may include thousands of different functional domains. Moreover, these different cells, molecules, and functional domains may interact with one another in an almost limitless number of ways.

Despite this complexity, the study of biological systems classically has proceeded by the serial study of single cells, single molecules, and single functional domains. However, recent interest in pharmaceutics, genomics, and proteomics, among others, has demanded at least quasi-simultaneous study, leading to the development of multiplexed systems such as the microplate and the microarray. These multiplexed systems permit the high-throughput analysis of tens or even hundreds of thousands of samples per day.

Despite their success, current multiplexed systems suffer from a number of shortcomings. Microplate assays typically consume considerable quantities of reagents, pushing the average cost to twenty-five cents or more per sample, and limiting the number of assays that may be performed with scarce samples. Microarray assays may consume smaller quantities of reagents, but their smaller size and limited geometries may make them less useful with larger reagents, such as cells. Microarray assays also require costly equipment for production of the microarray. Microplate and microarray assays both require positioning samples at predefined locations, limiting flexibility and requiring the use of costly detection systems.

The invention provides multiplexed assay systems for analyzing biological systems. This example illustrates the use of multiplexed assay system for a variety of applications, including cell and protein fingerprinting, cell phenotyping, proteomics, and molecular screening, among others. In some embodiments, the assay systems involve (1) associating coded carriers with cell-analysis materials that include cell selectors, ligands, receptors, antibodies, and/or modulators, and (2) exposing the associated cell-analysis materials to one or more cell populations to test interaction between the cell-analysis materials and the cell populations. The assays may involve determining the presence, absence, extent, nature, and/or implications of interactions between the cell-analysis materials associated with the carriers and the cells being tested. Interactions may include binding of cell populations to cell-analysis materials, phenotypic effects exerted on the cell populations and/or the cell-analysis materials, and/or any other measurable produced by the step of exposing. The assays also may involve determining the identity and/or effects of modulators on these interactions. The carriers may be distinguishable based on an associated code, so that multiple samples can be mixed together in a single container for simultaneous exposure to an assay condition, such as a cell mixture, a candidate modulator(s), an environmental condition, and the like.

8.1 Associating Cell-Analysis Materials with Coded Carriers

The coded carriers may be associated with cell-analysis materials of interest, generally through attachment to carriers prior to cell association. Suitable cell-analysis materials may include cell selectors, modulators, ligands, receptors, and/or antibodies, and may be provided as libraries. Cell-analysis materials may be attached directly or indirectly based on the form of the cell-analysis materials (and the carriers). Cell-analysis materials that may be attached directly generally include cell-independent materials such as libraries of chemical compound, and secreted or extracted, purified or crude biomolecules or biomolecular complexes. Alternatively, carriers may be attached indirectly to the cell-analysis materials, for example, by associating carriers with expression vehicles that are expressing the cell-analysis materials of interest. Expression vehicles generally include cells such as eukaryotic or prokaryotic cells, viruses, phages, tissues, or fragments thereof (such as organelles or extracts). These expression vehicles may naturally express the cell-analysis materials or species of interest, but more typically are induced to express the species of interest as part of a suitable expression library such as a display library. For example, each carrier may be associated with one or more member phage populations from a phage library. Each phage population may display a particular antibody directed to a particular protein expressed by a given cell population. Alternatively, each phage population may display ligands (or receptors) that can combine with receptors (or ligands) present in a given cell population, potentially producing measurable changes in those cells.

Exemplary cell-analysis materials are included in Section IV, and exemplary methods for associating cell-analysis materials and expression vehicles (cells) with coded carriers are included in Section V.

8.2 Exposing Carrier Assemblies to Measure Interaction

Coded carriers may be associated with cell-analysis materials of interest to form carrier assemblies. The carrier assemblies may be used to probe or interrogate cells and/or at least one member of a library to test interaction. The carrier assemblies are exposed to the cells and/or at least one library member, and then tested for interactions such as binding or phenotypic effects.

8.3 Detection of Binding

Interaction may be measured as binding between cell-analysis materials and cells. The binding if any between the carriers (or more specifically the cell-analysis materials associated with the carriers) and the cells and/or at least one library member being probed may be detected using any suitable method, such as the labels described in Section IV(G). This binding may be of interest intrinsically, or it may be of interest as a measure of the amount of expression, among others. Typically, the cells being probed are labeled using a suitable marker before and/or after being exposed to the carrier assemblies. These markers may include optical markers detectable, for example, using luminescence (including photoluminescence (e.g., fluorescence and phosphorescence) and chemiluminescence), absorption, scattering, reflection, and/or physical or functional orientation (for example, as in myocardiocyte populations). These markers also may include other indicia detectable using other mechanisms, for example, radioactivity, mass, morphology, activity, and/or function, among others. The carrier may be identified before and/or after the detection of binding, typically by reading the associated code. Exemplary methods for measuring cell characteristics, such as binding, and reading codes are included in Sections X and XI.

The following detection method is suitable for optical detection of cells. First, cells are loaded with different luminophores distinguishable by some optical characteristic, such as spectrum, polarization, and/or lifetime, among others. The cells may be labeled in their interiors (e.g., in the cytoplasm) and/or on their exteriors (e.g., on the cell surface). Second, the cells are visualized using an optical detection system, such as an optical microscope and an imaging (e.g., charge-coupled device (CCD)) detector. The steps of labeling, exposing, and/or detecting may be performed on any suitable substrate, including microscope slides, chamber slides, microplate wells, and so on.

8.4 Applications

The assay systems presented in this example may be used for a variety of applications, including cell or protein fingerprinting, cell phenotyping, proteomics (e.g., comparative proteomics), and molecular (e.g., ligand and receptor) screening, among others, as described in the following sub-examples. These applications generally involve using information regarding binding interactions to identify, characterize, and/or compare the members of libraries and/or cell populations.

The assay systems provided by the invention and the associated applications may have one or more advantages over prior systems. For example, the invention provides assays for comparative protein expression at a high-throughput level. These assays may use ligands and/or receptors (e.g. antibodies) as tools for identifying, measuring, and/or isolating proteins, and analyzing structural and/or functional changes associated with protein binding. The assays may be multiplexed by disease, disease stage, developmental stage, and the like. The assays may be used with cells, such as eukaryotic or prokaryotic cells (bacteria), viruses, phages, or tissues, where secondary labeling of the cells allows for increased analytical complexity. The assays also may be useful for diagnostics, facilitating the identification and treatment of diseases.

8.5 Fingerprinting

Figure 29:
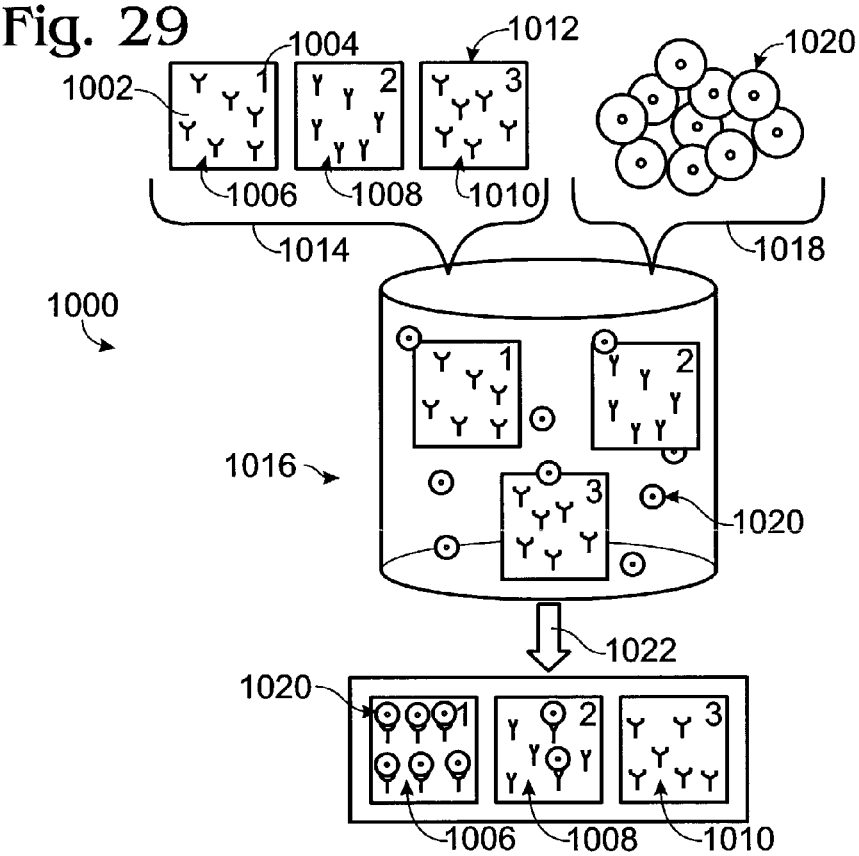
FIG. 29 is a schematic view of a method for disease stage fingerprinting with a coded phage display library, in accordance with aspects of the invention.

FIG. 29 illustrates a system 1000 for using coded carriers to fingerprint various stages of a disease. Coded carriers 1002 with distinguishable codes 1004 are pre-associated with cell-analysis materials that include molecules of interest, such as different antibodies 1006, 1008, 1010, receptors, ligands, or the like. The molecules of interest may be directly associated, or indirectly associated when expressed by cells, as described above. Generally, each type of carrier is associated with one or a few types of each antibody to produce coded antibodies, or antibody-carrier assemblies, 1012. Coded antibodies are combined, shown at 1014, to produce a nonpositional array 1016 of coded antibodies. The nonpositional array is exposed, shown at 1018, to a population of cells 1020 from a stage of a disease (or any other cells of interest). Next, as shown at step 1022, the number of cells bound to each carrier is measured and the code on each carrier assembly is read. Step 1022 measures binding interaction between cell population 1020 and each antibody 1006, 1008, 1010. Here, cell population 1020 binds efficiently to antibody 1006, less efficiently to antibody 1008, and shows no interaction with antibody 1010. Generally, the different antibodies bind the cell population with different efficiencies based on the number of high affinity epitopes for each antibody that are present in the cell population. Thus, epitopes for antibody 1006 are expected to be present, those for antibody 1008 may be of lower abundance or of altered structure, whereas epitopes for antibody 1010 are low or absent. If antibodies 1006, 1008, 1010 recognize specific cellular proteins, expression levels for these proteins in cells from a certain disease stage may be determined from this analysis.

The protein expression pattern, or fingerprint, may be determined by cataloging the presence, absence, and/or extent of binding between different carrier assemblies and different cell populations. The different carrier assemblies may be identified by reading their codes. The presence, absence, and/or extent of binding may be determined by counting or otherwise characterizing the number of bound cells using any suitable technique, such as optical analysis (for example, following labeling). Exemplary methods of labeling are included in Section IV(G) and methods of measurement in Section XI.

The fingerprints may be used for a variety of purposes. Initially, the fingerprints may be used to create a database associating particular protein expression patterns with specific disease stages. Later, this database may be used to identify different disease stages in cells from various sources, including tissue biopsies. In addition, molecules of interest such as 1) antibodies and/or ligands, or 2) proteins and/or receptors shown to display differential binding patterns based on the disease stage of the cell population may become leads for new 1) drugs or 2) drug targets, respectively.

This approach more generally may be used to distinguish any two or more cell populations that differ in their binding characteristics in the context of the molecules of interest. For example, these two or more populations may be the same cell type distinguished by developmental stage (e.g., before and after differentiation, stimulation, apoptosis, or the like), by disease stage (e.g., normal and diseased, early diseased and late diseased, first disease clone and second disease clone, or the like), or by exposure to some modulator (e.g., a chemical, a hormone, a temperature change, a mechanical challenge, or the like). Alternatively, these two or more populations may be fundamentally different cell types, such as nerve, muscle, or fat cell, among others. The differences in binding characteristics between different cell populations may reflect differences in their cell surfaces and/or cell interiors (e.g., if the cells have been permeabilized). Exemplary cells and modulators are included in Sections III and IV(A), respectively.

Figure 30:
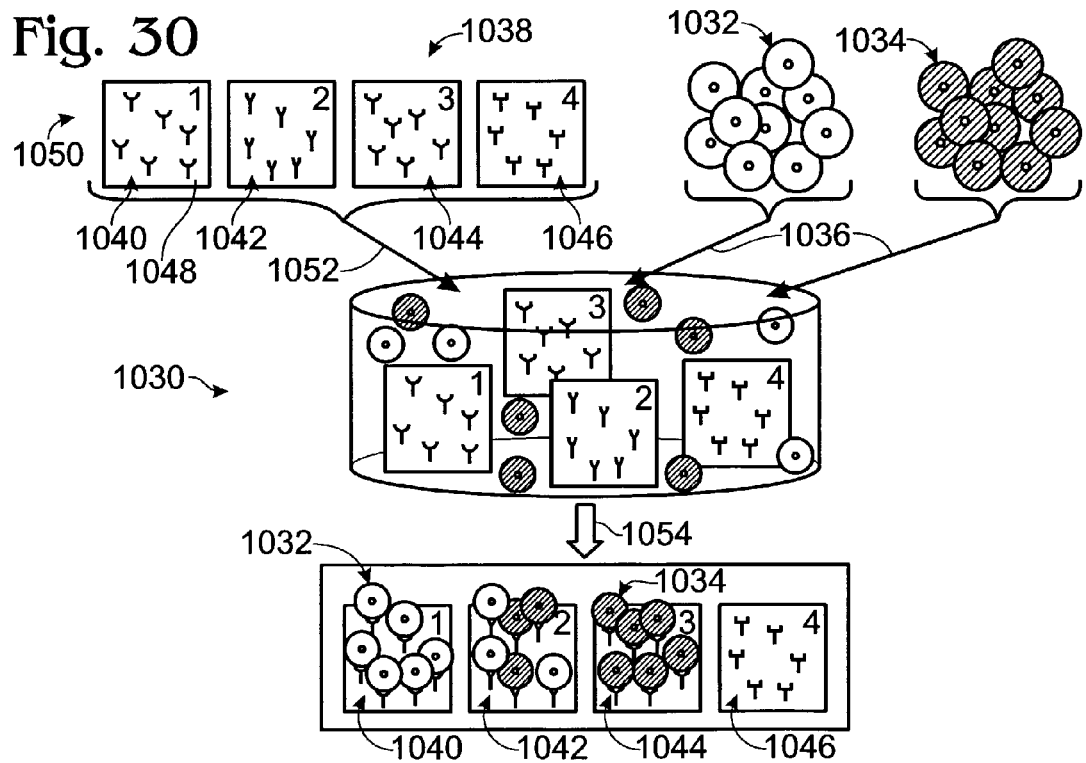
FIG. 30 is a schematic view of a method for using coded carriers for high-throughput comparative proteomics, in accordance with aspects of the invention.

8.6 Proteomics The use of coded carriers for high-throughput comparative proteomics (HTCP) is illustrated in FIG. 30. Proteomics includes the study of protein expression and activity, typically involving the identification of proteins in viruses, cells, tissues, and the like, and a determination of the role of these proteins in activities such as disease transmission. Here, the coded carriers are (1) pre-associated directly and/or indirectly with cell-analysis materials of interest, such as antibodies, and (2) exposed to two or more distinguishable populations of cells. Molecules that bind preferentially or exclusively to a particular population or populations of cells may be identified and/or isolated for further study.

FIG. 30 illustrates method 1030 for performing single disease high-throughput comparative proteomics (SD-HTCP). Here, normal and diseased cell populations, 1032 and 1034, respectively, are prelabeled to be distinguishable, for example, using colored markers, such that normal cells appear blue and diseased cells appear red. (Exemplary methods of cell labeling are included in Section IV(G) and Example 8.3). The normal and diseased cells then are exposed, shown at 1036, to a coded antibody library 1038. Library 1038 is formed by associating an antibody population 1040, 1042, 1044, 1046 with each coded carrier 1048 to form antibody-carrier assemblies 1050, and then the antibody-carrier assemblies are combined, shown at 1052, to form coded library 1038. After exposure, binding of cell populations 1032, 1034 to coded library 1038 is measured and carrier codes are read, shown at 1054. As shown at the bottom of FIG. 30, antibody population 1040 binds only cell population 1032, antibody population 1042 binds both cell populations, antibody population 1044 binds only cell population 1034, and antibody population 1046 binds neither cell population. Thus, an antibody population, such as 1044, that binds only to the diseased cells may be identified and/or isolated for further study. The above method is not reduced only to the use of antibodies as ligands, as modulators, receptors, other proteins, and/or peptides may be used to capture surface markers.

Method 1030 may be adapted to analyze more than two cell populations to perform multiple disease high-throughput comparative proteomics (MD-HTCP). In this case, normal and multiple diseased cell populations are prelabeled using distinct colored markers and exposed to a coded antibody library. The multiple disease cell populations may be from different diseases and/or different stages of the same disease. The results of these studies may be used to characterize the disease(s) and/or disease stage(s), to develop new drugs, and/or to build a database of information.

Table 5 shows possible results from MD-HTCP using a coded antibody library with four members. The coded antibody library is exposed to four distinctly labeled cell populations that correspond to normal cells, breast carcinoma, ductal carcinoma, and ovarian carcinoma. Detectable cell binding is indicated by "+" and absence of binding by "−". These results indicate that Antibody 10010 binds all cell populations except ductal carcinoma cells, Antibody 10110 is specific for ductal carcinoma, Antibody 10101 binds all three carcinoma cell populations but not normal cells, and Antibody 10001 is nonspecific. Thus, Antibody 10110 may be useful for identification, characterization, and/or treatment of ductal carcinomas. In addition, Antibody 10101 may be suitable for identification, characterization, and/or treatment of many or all carcinomas.

TABLE 5

Examples of Results from High-throughput Comparative Proteomics

|  | Antibody 10010 | Antibody 10110 | Antibody 10101 | Antibody 10001 |
| --- | --- | --- | --- | --- |
| Normal | + | − | − | + |
| Breast Carcinoma | + | − | + | + |
| Ductal Carcinoma | − | + | + | + |
| Ovarian Carcinoma | + | − | + | + |

This approach more generally may be used to characterize and/or compare the presence and/or abundance of any molecular components of cells, including viruses, phages, eukaryotic or prokaryotic cells, tissues, and the like. The molecular components probed typically will comprise cell surface molecules but also may comprise cytoplasmic molecules if the cells are permeabilized.

8.7 Molecular Screening—1

Figure 31:
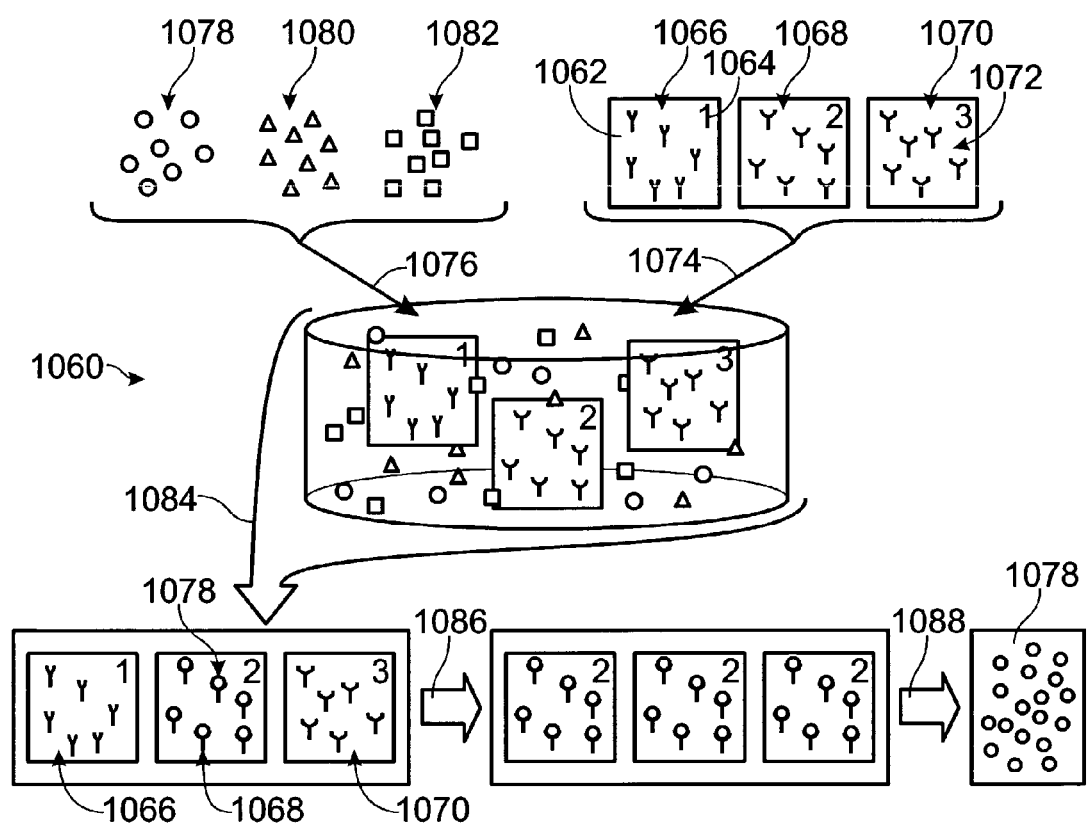
FIG. 31 is a schematic view of a method for using phage display libraries for the identification and purification of ligands to receptors of interest, in accordance with aspects of the invention.

Method 1060 illustrates how coded carriers may be used to screen an expression library for molecules of interest; see FIG. 31. Coded carriers 1062 with distinct codes 1064 are associated with cell populations (not shown) expressing different molecules and/or different concentrations of molecules, such as different G-protein coupled receptors 1066, 1068, 1070 to produce carrier assemblies 1072. The cell populations may include viruses, phages, whole cells, tissues, extracts, and the like. The different molecules may include any cell surface molecule, including pre- and/or post-translationally modified membrane proteins. The carrier assemblies are combined, shown at 1074, to produce a nonpositional array, and then the array is exposed, shown at 1076, to member populations 1078, 1080, 1082. These member populations are from an expression library of vehicles expressing possible companion molecules to the different proteins, such as a protein phage display library expressing possible ligands. The expression library may be labeled using any suitable method, such as those exemplified in Section IV(G). Members of the expression library that bind to carriers are identified, shown at 1084. In this example, coded carriers with code "2" bind some (or all) of population 1078 through interaction with receptor population 1068. These carriers may be sorted from the nonpositional array, shown at 1086, for example by flow sorting or mechanical manipulation. Member population 1078 may be isolated from associated carriers, shown at 1088, by using any suitable method, such as chemical methods (e.g., a change in pH, ionic strength, and the like) and/or mechanical methods (e.g., shaking, spinning, exposure to an electric and/or magnetic field, and the like). Isolated members 1078 may be cloned. Companion molecules expressed by the members may be characterized and studied as possible modulators, such as agonists and antagonists, of the receptors expressed by the coded cell population.

8.8 Molecular Screening—2

FIGS. 32 and 33 compare a current method 1090 and a high-throughput comparative proteomics method 1100, in accordance with aspects of the invention, for identifying and/or characterizing serum markers. Serum markers are soluble or cell-associated molecules present in blood serum whose presence, concentration, structure, and/or other properties may be used as an indicator of an associated biological activity, including abnormalities thereof. Known serum markers include, among others, (1) alpha-fetoprotein (AFP), unconjugated estriol (uE3), and human chorionic gonadotropin (hCG) for Down syndrome, (2) prostate specific antigen (PSA) for prostate cancer, (3) CA 15-3 (also known as MUC1) for breast cancer, and (4) vascular endothelial growth factor (VEGF) for ovarian cancer. These markers may be used for diagnosis and/or targets, among others, facilitating the identification and treatment of diseases.

Method 1090 uses a nucleic acid-based approach to identify and select genes that are differentially expressed in cancer cells relative to normal cells. Each selected gene is used to express the encoded protein and produce antibodies specific to the encoded protein, eventually proceeding to clinical trials.

In contrast, method 1100, shown in FIG. 33, uses an HTCP approach to identify more directly materials of interest and clinical importance. Normal and multiple disease cells are labeled distinctly and used to screen libraries of potential serum markers or libraries of antibodies or ligands that bind potential serum markers, for example, using the strategy illustrated in FIG. 30. The libraries may be biased in favor of sequences encoding identifiable secretory motifs, may be subtracted libraries that over-represent sequences that are expressed or overexpressed in diseased cells, or may be antibody libraries formed against epitopes of diseased cells.

Library screens may identify serum markers and/or reagents, such as antibodies or ligands, that bind to serum markers. In some cases, a library member identified using HTCP may represent a partial coding sequence. The partial coding sequence may encode a peptide or partial protein having altered activity, for example, acting as a dominant negative derivative, or antagonist. The encoded dominant negative derivative may bind a receptor normally but without normal functional consequences. Such a dominant negative derivative may be useful as a drug lead or in clinical treatment. In addition to serum, the HTCP approach more generally may be used to identify and/or characterize suitable markers or targets in other biological fluids and/or secretions, including lymph, milk, mucous, perspiration, saliva, semen, tears, urine, feces, and the like.

Example 9

Multiplexed Cell Analysis System Using Reverse Transfection

Figure 34:
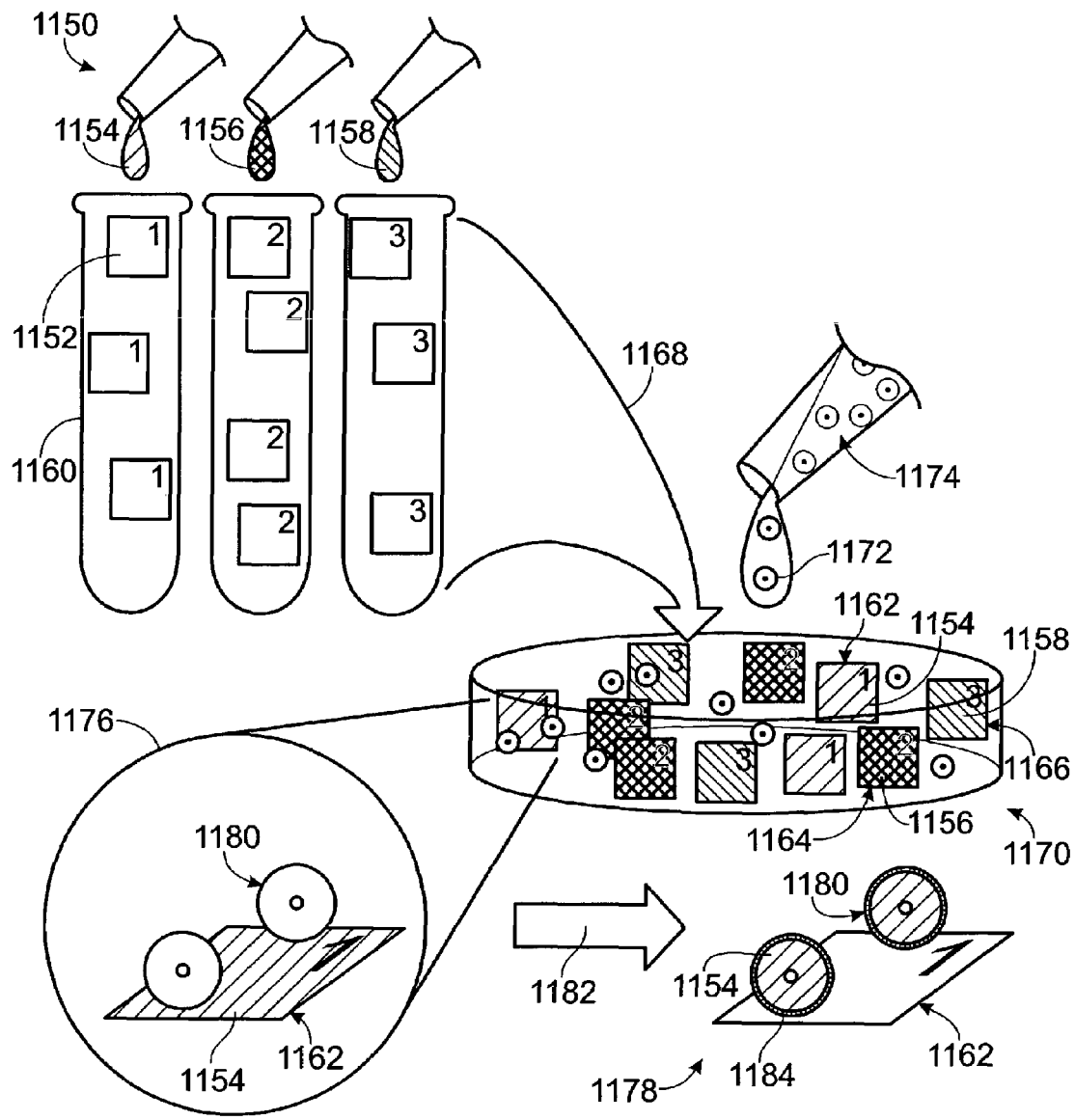
FIG. 34 is a schematic view of a method for producing a nonpositional array of transfected cells using reverse transfection, in accordance with aspects of the invention.
Figure 35:
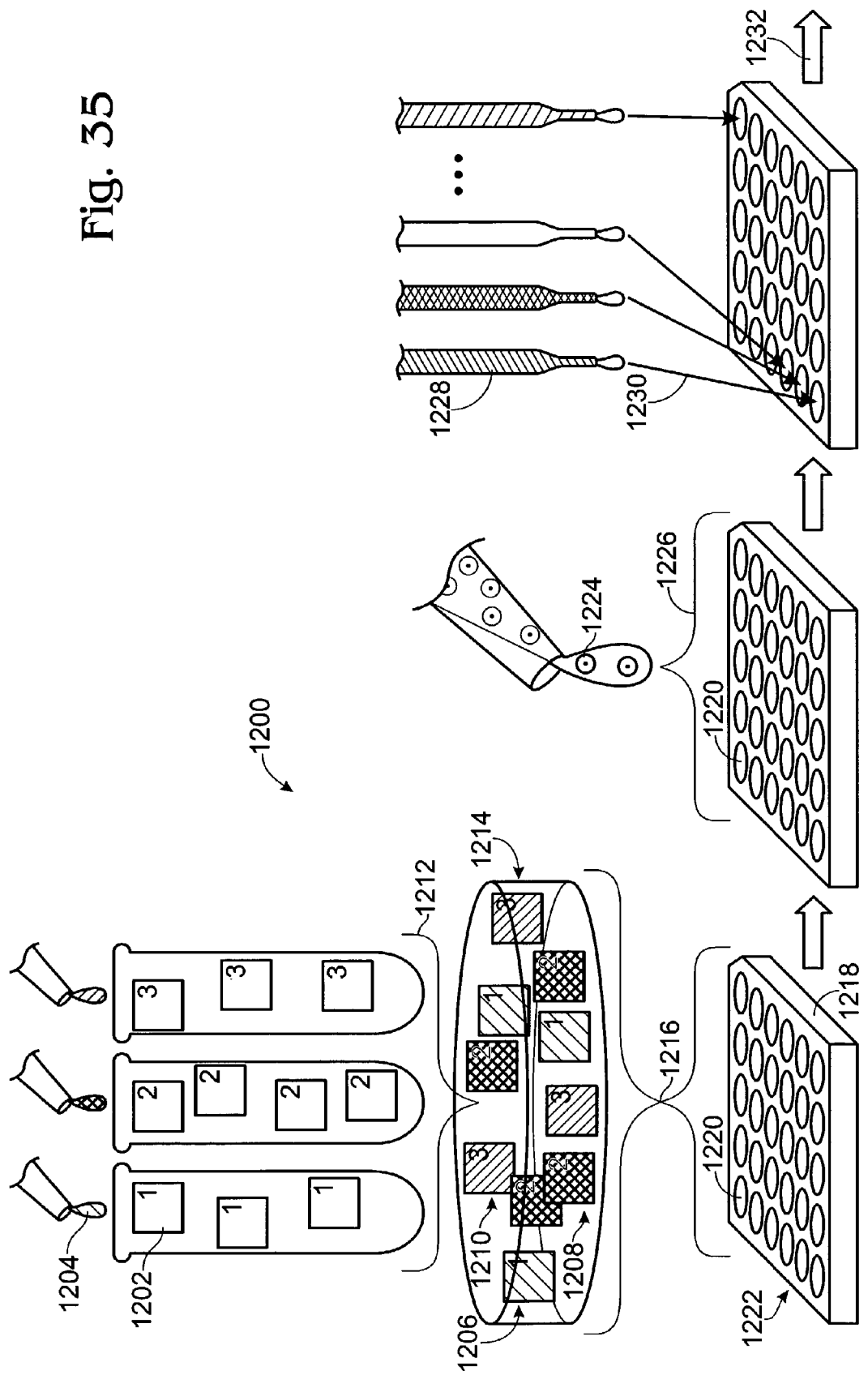
FIG. 35 is a schematic view of a method for screening modulators using the nonpositional cell array of FIG. 34, in accordance with aspects of the invention.
Figure 36:
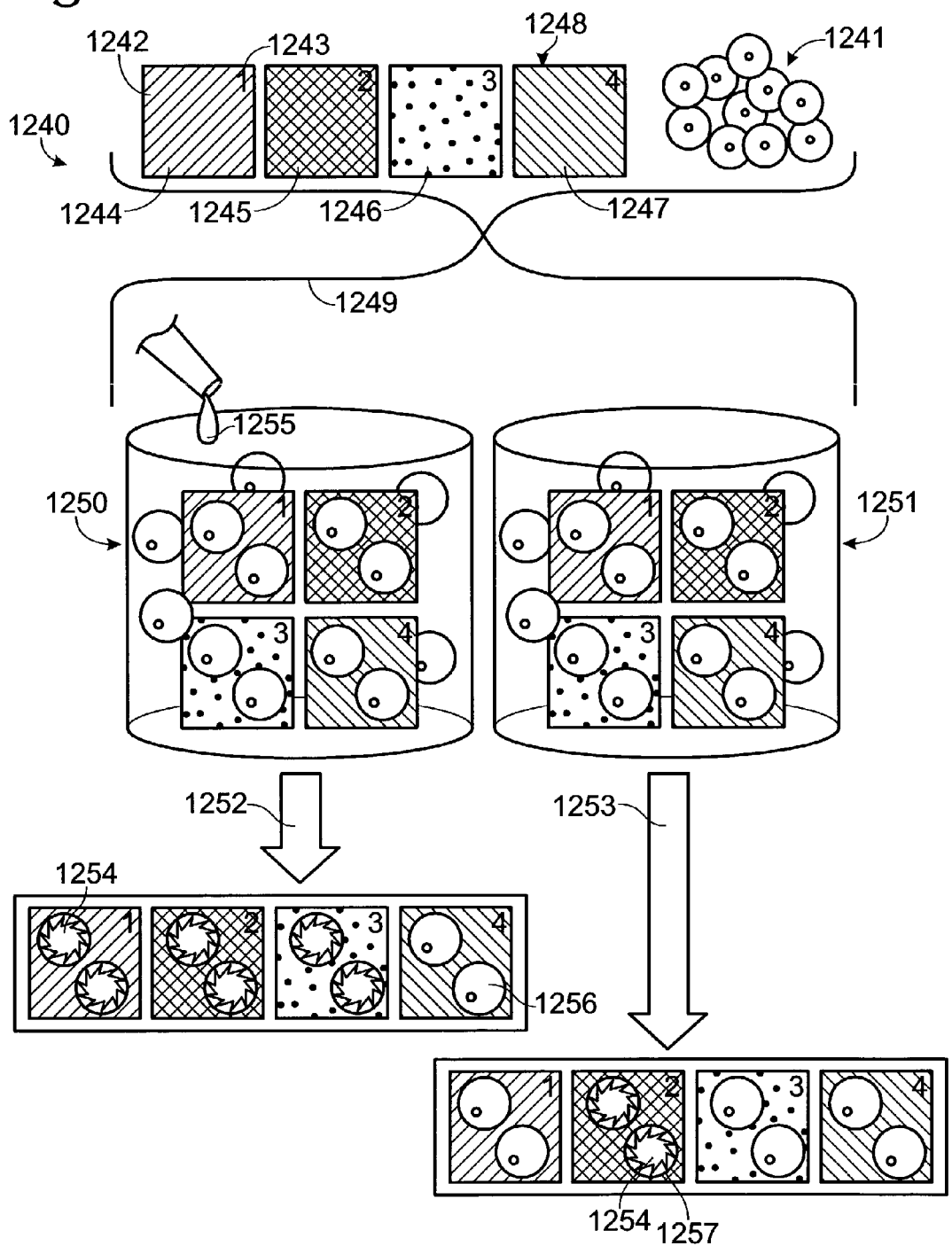
FIG. 36 is a schematic view of a method for multiplexed analysis of changes in reporter gene activity mediated by reverse-transfected antisense nucleic acids, in accordance with aspects of the invention.

This example, illustrated in FIGS. 34-36, describes the use of reverse transfection to reverse-transfect cells on coded carriers. Transfection materials are arrayed on coded carriers and then combined with cells to reverse transfect the cells. The resulting reverse-transfected cell arrays may be used for positional and/or nonpositional multiplexed analysis of biological systems.

Transfection provides a powerful tool for studying biological systems. The transfection technique introduces foreign material into cells. In one transfection approach, the foreign material is a polynucleotide-based gene expression vector encoding an effector protein. Expression of the effector protein may provide biochemical or functional information about the effector protein itself and any phenotypic response of the host cell to the effector protein. Alternatively, or in addition, a transfected gene expression vector may encode a reporter protein or RNA that reports a property of the cell. For example, a transfected reporter gene may include gene regulatory sequences that control the expression of a readily measured reporter protein (or RNA). The transfected gene regulatory sequences may mimic endogenous regulatory sequences, and thus the level of reporter protein may serve as an indicator of gene expression and cell phenotype. Furthermore, cell transfection may introduce an antisense oligonucleotide or antisense polynucleotide expression vector. Transfection of antisense nucleic acids may test a gene's function by blocking expression of the gene. Accordingly, cell transfection frequently plays a critical role in identifying new drugs and in understanding protein function and cell biology.

Molecular biologists have developed widely used transfection procedures, referred to here as classical transfection, for transfection of adherent cells. Classical transfection generally presents a nucleic acid to cells adhered to a substrate such as a cover slip. Appropriate treatment of the nucleic acid and/or the cells with a transfection enhancer such as a lipid may promote uptake of the nucleic acid into the cells.

Despite the prevalence of classical transfection, this approach may be difficult to adapt to high-throughput applications involving microarrays. In particular, microarrays lacking boundaries to fluid movement between samples of the microarray may not be suited for classical transfection. For example, it may not be practical to place different nucleic acids at defined positions in an array on a pre-attached layer of cells, because most cells used for transfection require a constant fluid bath for survival. Efforts to carry out localized addition of a nucleic acid to the cell layer would thus be thwarted by the randomizing motion of fluid (and nucleic acid).

By reversing the order in which cells and nucleic acids are placed on a substrate, Sabatini and Collins provide a reverse transfection strategy. This strategy is described in PCT Application No. PCT/US00/25457, filed Sep. 18, 2000, which is hereby incorporated by reference. In the Sabatini strategy, nucleic acids are placed on a substrate prior to cell attachment to the substrate. As a result, forming an array of nucleic acids on the substrate does not require fluid to bathe the substrate. Therefore, different nucleic acids are adhered to discrete regions of the substrate, for example as a printed planar array. Subsequently, a cell population adheres to the printed array of nucleic acids, allowing the nucleic acids to be transfected into a corresponding array pattern of cells within the cell population.

Despite the attractiveness of a printed planar array of nucleic acids for positional transfection, the strategy of Sabatini and Collins lacks flexibility. For example, the printed array may not be readily modified after printing. Thus, it may be difficult to remove samples from the array or add additional samples, if available space on the substrate is exhausted. Due to this lack of flexibility, addition of new candidates or modification of a screening strategy may require preprinted arrays to be discarded and replaced with new printed arrays. Other disadvantages of a fixed planar array may be increased expense and decreased reproducibility. A planar array may overuse valuable reagents because reagents generally need to be uniformly distributed over the entire array surface, increasing the amount of reagents required. Problems also may arise in ensuring uniform exposure of the entire array to any drug or reaction condition. Furthermore, the planar array may not be compatible with microtiter plates, a significant drawback since microtiter-plate compatibility is a standard requirement in the high-throughput environment of modern drug discovery.

This example provides methods and compositions for making and using arrays of transfection materials and reverse-transfected cells. These methods and compositions involve coded carriers having detectable, distinguishable codes. The coded carriers are associated with transfection materials, such as nucleic acids, to create coded transfection materials that may be combined to create positional and/or nonpositional arrays of transfection materials that are identifiable based on the associated code. The arrays of transfection materials may be associated with a cell population to link cells to each code and transfection material. The cell population may internalize some of each transfection material, leading to positional and/or nonpositional reverse transfection of each transfection material into the cell population. By reading the code and measuring a characteristic of the transfected cell population, the effect of each transfection material on the cell population may be analyzed. Linkage of the code to the characteristic allows the measured characteristic on each carrier to be related to the corresponding transfection material. This approach (and particularly the nonpositional approach) may offer significant improvements in flexibility, cost, and reliability over previous transfection and analysis methods. For example, the nonpositional arrays may be used to screen and/or analyze libraries of transfection materials and/or the effects of physical modulators and/or libraries of chemical/biological modulators, ligands, and/or antibodies on reverse transfected cells using a multiplexed microtiter format.

9.1 Associating Coded Carriers with Transfection Materials Transfection materials may be associated with coded carriers in a cell-independent manner through pre-association. This cell-independent association may allow the code on a carrier to relate information about or identify the transfection material, or a property of the transfection material, such as its origin.

Pre-association of transfection materials with carriers may require a balancing act between stable and unstable association. Pre-association should be sufficiently stable to retain a portion of the transfection material on the carrier during subsequent association of cells and reverse transfection manipulations. However, the pre-association may be transient enough so that transfection material is released for uptake by cells attached to the carrier. Transient association may be mediated by incorporation of the transfection material into a gel matrix, such as that formed by a gel-forming material such as gelatin. In some cases, stable association between the carrier and transfection material also may be suitable if a carrier treatment or the cells are capable of destabilizing the association. For example, cells may cleave the transfection material from the carrier or activate release of a transfection material from a stably bound viral particle.

Cell-independent association generally is carried out by mixing or otherwise exposing one or more transfection materials with a population of coded carriers having one or more known or determinable codes. The resulting association may be facilitated by any suitable treatment, including desiccation, temperature changes, light, radiation, chemical reaction, or treatment with an association promoter, such as the gel-forming material described above. Pre-association also may include treatment of the transfection material with a reverse transfection enhancer, as described below. Once stable or transient association has been effected, carriers associated with different transfection materials may be combined in a single container, such as a tube or a microplate well, to produce a nonpositional array of transfectables.

9.2 Transfection Materials and Libraries

Transfection materials suitable for use in reverse transfection are described in Section IV(C) above. Transfection materials may be used to form libraries of coded transfectables on carriers. A library of transfection materials has two or more members and usually includes a property that is related between the members. For example, a library may encode, or include, a family of structurally and/or functionally related proteins, such as nuclear hormone receptors or G-protein coupled receptors (GPCRs). A library also may encode wild type and mutant derivatives of a protein. Furthermore, a library may encode defined or random complementary or genomic DNAs from an organism, tissue, cell type, patient sample, disease state, developmental stage, tumor, blood, genetic background, and the like, and each complementary or genomic DNA may have known or unknown structure and/or function. In addition, a library may encode two or more reporter genes with distinct regulatory sequences and/or reporter sequences.

9.3 Subsequent Association of Coded Carriers with Cells

Each coded carrier may be associated with cells after the carrier has been pre-associated with a transfection material(s). Cell association may be carried out either directly with the coded carrier or indirectly using a cell selector, described in Section IV(D), or using an adherence promoter. Cell association links a cell population to a carrier code. The cell population may include any suitable cells or mixture of cells.

The coded carriers may be mixed after pre-association and/or cell association to form nonpositional arrays. In each case, the code associated with the coded carriers may be used to identify the associated transfection materials and/or cell populations.

Exemplary cells and cell association procedures are described in Sections III and V above and in elsewhere in this Detailed Description. In addition, exemplary arrays are described in Section VIII above.

9.4 Reverse Transfection

Reverse transfection generally comprises any transfection of transfection materials into cells that follows the ordered association (pre-association) of a carrier first with a transfection material and association second with a cell population. Transfection (reverse or classical) may include any uptake mechanism that moves the transfection material from the exterior to the interior of a cell, including active or passive transport. For example, transfection may proceed by endocytosis, infection, or direct transport or diffusion through a cell's surface membrane.

The transfection material and/or cells may be exposed to any suitable transfection enhancer(s) to promote transfection, such as a lipid, calcium phosphate, polyethylene glycol, glycerol, heat, or an electric field. The transfection material may be exposed to a transfection enhancer before, during, and/or after pre-associating the material with a carrier. Similarly, cells may be exposed to a transfection enhancer at any time. In an exemplary embodiment, transfection materials are associated with carriers in a pre-association step and then exposed to a lipid transfection enhancer, all prior to association with cells. In an alternative exemplary embodiment, transfection materials are exposed to a lipid transfection enhancer before and/or during the pre-association step.

Further aspects of reverse transfection are described in the following patent applications, where are incorporated herein by reference: PCT Patent Application Serial No. PCT/US00/25457, filed Sep. 18, 2000; and U.S. Provisional Patent Application Ser. No. 60/307,650, filed Jul. 24, 2001.

9.5 Reading the Code and Measuring Cell Characteristics

Reverse transfection gives rise to one or more populations of transfected cells associated with coded carriers. Following reverse transfection, the code may be read, and a characteristic of the cell population may be measured and/or analyzed. Exemplary methods for reading codes and measuring cell characteristics are included in Section XI above and elsewhere in this Detailed Description.

The code may be used to identify the carrier and associated sample before and during measurement and to track the associated results after measurement. The code may be read before, during, and/or after measuring the cell characteristic. Whenever the code is read, it should be linked or linkable to the measured cell characteristic. This linkage identifies the transfection material (or an aspect of the material) that is pre-associated with the carrier, and may also identify other aspects related to the carrier including the cell population, modulator exposed to the cell population, or any other experimental parameters. Exemplary information that may be related by the code is included in Section VII.

The characteristic may include any molecular or cellular aspect of each reverse-transfected cell or the cell population as a whole, where the aspect is linkable to the carrier. Exemplary characteristics that may be suitable are listed in Section X above.

9.6 Modulators

Reverse-transfected cell populations on coded carriers may be exposed to modulators, ligands, antibodies, labels, and/or any other suitable cell-analysis materials. Modulators, ligands, and/or antibodies may include any drug, hormone, ligand, growth factor, growth inhibitor, or other agent that may affect a measurable characteristic of the cell population, the transfection material, or a material encoded by and expressed from the transfection material. Exemplary modulators and other suitable cell-analysis materials are included in Section IV above.

Exemplary modulators and/or ligands include drug candidates used to carry out a drug screen. Reverse-transfection may provide a direct or indirect target for a drug screen. Thus, any effect on the target may be a measurable characteristic of the cell population present on a coded carrier. For example, the target may be a reporter gene whose activity may be regulated by the cell modulator. Alternatively, or in addition, the target may be directly bound by the modulator. For example, the target may be a receptor whose activity may be inhibited or activated by the modulator.

9.7 Reverse Transfection with a Coded Nonpositional Array

FIG. 34 illustrates a method 1150 for making a coded nonpositional array of transfectable DNA molecules, and reverse-transfection of cells with this coded array. The method more generally may be used with RNA molecules or any other transfection material.

Coded carriers 1152 are pre-associated with transfection materials 1154, 1156, 1158, which are DNA molecules in the form of distinct expression vectors. Each species of carrier has a distinct code (or codes) and pre-associates with a distinct transfection material or set of materials The three species illustrated here are segregated from each other spatially, for example, by placing them in different locations on a substrate or by placing them on different substrates or in distinct containers 1160. Pre-association may be conducted, for example, by coating the carriers with the DNA, either with the carriers arranged as a monolayer or piled randomly. After pre-association, the three resulting coded DNAs 1162, 1164, 1166 may be combined, shown at 1168, to produce a nonpositional library array 1170 of coded transfectable DNAs. The identity of each DNA in the array is maintained by the code present on each linked carrier. The DNAs may be treated with a transfection enhancer at any time during pre-association and subsequent steps.

Cells 1172 are associated the coded transfectable DNA array 1170 by combining the cells with the array. Any suitable method may be used for association, such as placing a fluid containing the cells over the coded carriers. In this example, a single cell population 1174 contributes cell subpopulations for association with each coded carrier. However, more complex manipulations may be carried out, such as dividing array 1170 into sibling arrays and associating each sibling array with a different cell population.

As shown in the magnified views 1176, 1178 at the bottom, cell subpopulation 1180 that has associated with a coded carrier is reverse-transfected by taking up transfectable DNA 1154 pre-associated with the carrier, shown at 1182. This step may occur spontaneously and/or through the action of a transfection promoter, as described above, and generally results in some of the transfectable DNA entering the cells. The cells typically are associated with the carrier through binding interactions that are distinct from interactions with the transfection material. As a result of reverse-transfection, transfectable DNA 1154 is expressed. Here, the expressed DNA produces a cell surface protein 1184 such as an integral membrane receptor.

9.8 Ligand/Modulator Screen Using a Reverse-Transfected Cell Array

FIG. 35 illustrates a method 1200 using reverse-transfected cell arrays to screen ligands and/or modulators. The method is illustrated for a DNA transfection for purposes of drug discovery; however, the method more generally may be used with any transfection material for any suitable purpose.

Coded carriers 1202 are pre-associated with transfectable DNAs 1204. The resulting DNA-carrier assemblies 1206, 1208, 1210 are combined, shown at 1212, to produce a nonpositional parent array 1214 of coded DNAs. Parent array 1214 may be divided, shown at 1216, by transferring portions of the array to a microplate 1218. Each portion is a sibling array 1220, with substantially the same representation of DNA-carrier assemblies as parent array 1214. Together, sibling arrays 1220 provide a positional set 1222. Alternatively, array 1214 may be divided to form a nonpositional set of sibling arrays, for example, by transferring portions of parent array 1214 into individually identifiable containers.

Positional set 1222 is associated with cells 1224 by combining a population of cells with each sibling array 1220, shown at 1226. The same and/or different populations of cells may be used in each well, depending on whether the assay is intended to look at variations between cell lines or variations between ligands and/or modulators. Here, a single population of cells is distributed to the microplate wells to associate with the distributed sibling arrays of coded DNA. In some embodiments, cell association may be carried out before transferring portions of parent array 1214 to microplate 1218 (step 1216), or before combining individual coded transfectable DNAs (step 1212). In addition, in some embodiments cell association with the coded carriers may be carried out prior to exposing transfection materials to the carriers, thus effecting classical rather than the reverse-transfection of cells shown here.

During and/or after cell association, DNA pre-associated with each carrier reverse-transfects cells associated with the carrier, for example, as described above.

Reverse-transfection results in expression of the reverse-transfected DNA to produce a gene product, for example, as described above. Before, during, and/or after reverse-transfection candidate ligands and/or modulators 1228 are exposed to cells, shown at 1230. Here, the identity of each ligand/modulator 1228 may be tracked positionally during exposure, or nonpositionally in an externally marked container or with an internally marked array. However, the identity of the ligand/modulators also may be carried by the code, particularly during subsequent manipulations that destroy array-identifying information, such as positional information.

After appropriate incubation with ligands/modulators, a characteristic of each carrier cell population is measured and the code on the carrier is read, shown at 1232. Here, the characteristic and the code are determined by optical measurement of a property of the cells and the carriers, respectively. Each microplate well may include one or more types of coded carriers and thus one or more types of reverse-transfected DNA. As a result, each well of the microplate in this example provides information about the ligand/modulator's effect on three different transfected cell populations. However, any suitable number of transfected cell populations may be provided in a mixture. Accordingly, analyzing the information provided by a nonpositional array in a single well or container may produce information from many different reverse-transfected cell populations.

9.9 Reverse Transfection of Antisense Nucleic Acids

Reverse transfection of antisense nucleic acids and PTGS agents into cells associated with coded carriers may be used to study gene function, as exemplified below.

Sequencing the human genome has identified all human genes. Determining the function of these genes is a much more formidable task often referred to as functional genomics. Typically, to determine the function of a specific gene the expression of that gene is altered and then a physiological parameter is measured. The choice of which parameter to measure, although strongly influenced by bioinformatics, is relatively arbitrary. Such parameters may be the activation of a signaling cascade, the inhibition of a cell surface receptor, the expression level of a gene or set of genes, the effect on cell cycle progression, and the like.

In order to alter the level of target gene expression, the gene is overexpressed, under expressed (knocked-down), or gene expression is blocked completely (knocked-out). Although a variety of techniques are available to alter expression of a target gene, a common technique is the expression of an antisense RNA or PTGS agent (double-stranded RNA, such as RNAi, siRNA, etc) to block expression of a gene of interest. The antisense RNA or PTGS agents is complementary to and/or overlaps at least a portion of a sense transcript from the gene of interest and generally lowers, or in some cases shuts off, expression of the gene of interest. However, approaches that use antisense RNA or PTGS agents require more efficient assay systems to effectively analyze the wealth of genome information currently available.

The invention provides multiplexed assay systems with coded carriers to reverse transfect cells with antisense nucleic acids or antisense expression vectors. The antisense nucleic acids may be synthetic DNA or RNA oligonucleotides, including modified nucleic acids, such as peptide nucleic acids, or the antisense nucleic acids may be antisense expression vectors, such as plasmids, that produce antisense RNA transcripts. Effects of the antisense nucleic acids may be measured by monitoring reporter gene activity or any other suitable cell characteristics, such as those exemplified in Sections IV and X and described elsewhere in this Detailed Description.

The invention also provides multiplexed assay systems with coded carriers to reverse transfect cells with PTGS agents, such as double-stranded RNAs or vectors encoding double-stranded RNAs. Double-stranded RNA that is reverse (or classically) transfected may be synthetic, produced enzymatically in vitro (for example, with an in vitro transcription system), or expressed in cells and isolated or used directly (for example, by cell fusion). Alternatively, the double-stranded RNA may be expressed from transfected nucleic acids. For example, the double-stranded RNA may be expressed as an inverted repeat that self-anneals, or as two separate transcripts that anneal intermolecularly. Exemplary PTGS agents are described in further detail in Section IV(C).

Method 1240 illustrates reverse transfection of, antisense expression vectors to identify genes that regulate cellular activities; see FIG. 36. In method 1240, cells 1241 easily assayed for the physiological parameter of choice are used. In this example, cells 1241 are a stable reporter cell line engineered to express a reporter gene when a signaling cascade is activated. Specifically, reporter cells 1241 express GFP when the NF-kappaB cascade is activated. Separate classes of coded carriers 1242, each having a distinct code 1243, are pre-associated with different expression vectors 1244, 1245, 1246, 1247 to form DNA-carrier assemblies 1248. Each expression vector expresses antisense RNA to a gene of interest.

Reporter cells 1241 are combined with carrier assemblies 1248, shown at 1249, to form nonpositional arrays 1250, 1251 of cells associated with DNA-carrier assemblies. During and/or after association of cells 1241 with DNA-carrier assemblies 1248, the cells are reverse transfected with the DNA expression vectors 1244-1247. After reverse transfection, each expression vector expresses antisense RNA, which may decrease or abolish expression of the corresponding gene of interest. As shown at 1252 and 1253, reverse-transfected cells are assayed for GFP expression. At the bottom of FIG. 36, detectable or increased GFP expression is shown as a star 1254 inside the cells.

Cells measured at 1252 on the left are derived from array 1250 treated with an activator 1255 of the NF-kappaB pathway. Since most genes are not expected to be required for the NF-kappaB pathway, most DNA-carrier assemblies include cells that show GFP expression. However, carriers with cells that do not express GFP, such as cells 1256, identify antisense vector 1247 and thus a positive regulator gene targeted by antisense vector 1247. Activity of the positive regulator gene is required for activation or functioning of the NF-kappaB pathway.

Negative regulators of the NF-kappaB pathway are identified using array 1251 that has not been treated with an NF-kappaB pathway activator. Since most genes are not expected to encode negative regulators of the NF-kappaB pathway, most reverse-transfected cells show no GFP signal, exemplified in carriers with codes "1", "3", and "4" on the bottom right of FIG. 36. However, a GFP signal 1254 is detectable in cells 1257 that were reverse-transfected with antisense expression vector 1245. This suggests that a corresponding antisense-targeted gene is a negative regulator of the NF-kappaB pathway, since decreased levels of target gene expression resulted in activation of the pathway.

The multiplexed analysis may be modified to measure more than one physiological parameter. In method 1240 of FIG. 36, plural target genes are assayed for their involvement, either positive or negative, in the regulation of a single physiological parameter, NF-kappaB signaling. Alternatively, an antisense nucleic acid or antisense expression vector to a gene of interest may be pre-associated with different classes of coded carriers. Then, different reporter cell lines that measure distinct cell pathways may be associated with each carrier class for reverse transfection and decrease of target gene expression. For example, reporter cell lines may be used that express GFP in response to the activation of different signaling cascades, such as NF-kappaB, CREB, Gs-GPCR, NFAT, ELK, MAP kinase, and the like. After reverse transfection of antisense nucleic acids into the reporter cell lines, the cell lines may be analyzed for GFP expression, either in presence or absence of pathway activators, to determine if the gene of interest is involved in regulation, either positive or negative, of these signaling pathways. This method measures the role of a single gene on multiple physiological readouts. In alternative embodiments, the reporter cell lines may be associated with coded carriers first and then transfected by a classical rather than a reverse approach. In other embodiments, plural antisense nucleic acids may be reverse-transfected into plural reporter cell lines. These embodiments would multiplex analyze the roles of plural genes on plural pathways. For example, reporter cell lines for the signaling pathways mentioned above each may be reverse-transfected on plural different classes of coded carrier with different antisense vectors.

9.10 Transfection of Sense Nucleic Acids

In other multiplexed cell transfection assays, information about a cell population (or individual cells within the population) may be determined by transfection of a sense expression vector or nucleic acid, either by reverse or classical transfection. The sense expression vector or nucleic acid may encode a wild type, mutant, or fusion derivative of a protein of interest, particularly a regulator. These transfections of sense nucleic acids (or sense-encoding nucleic acids) may be used to identify cells that do not respond to the regulator. Cells may not respond for various reasons, generally due to changes in the structure (i.e. mutation or modification, among others) or expression level of a target of the regulator. For example, the cells may express a nonbinding derivative of the target or may overexpress the target, when the target is a protein. Similarly, when the target is nucleic acid, the nucleic acid may be amplified or mutated so that overexpression of the transfected regulator has little or no effect.

Example 10

Multiplexed Cell Analysis Using Coded Arrays of Cell-Analysis Materials

Figure 37:
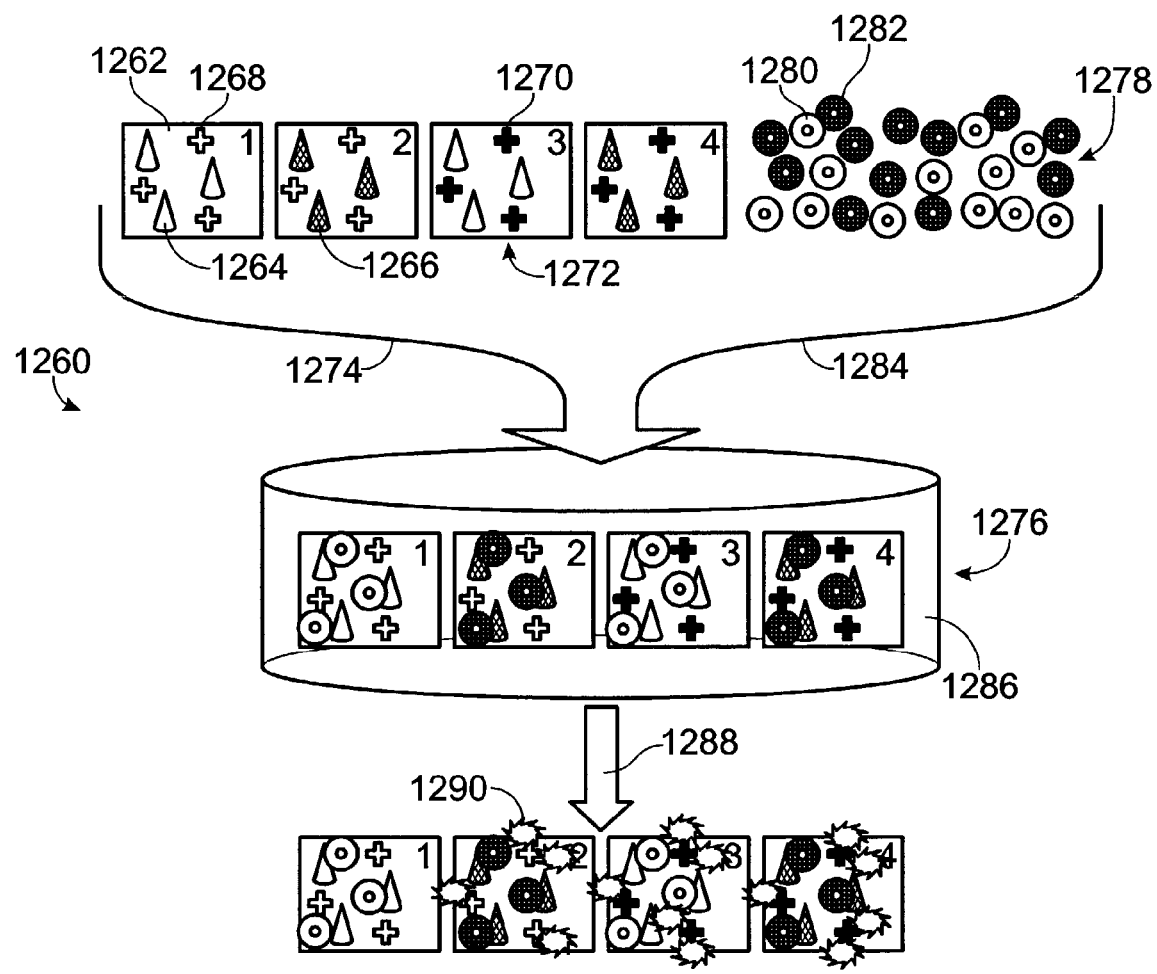
FIG. 37 is a schematic view of a method for multiplexed analysis using coded carriers that are pre-associated with a cell selector and a local capturing agent, in accordance with aspects of the invention.
Figure 38:
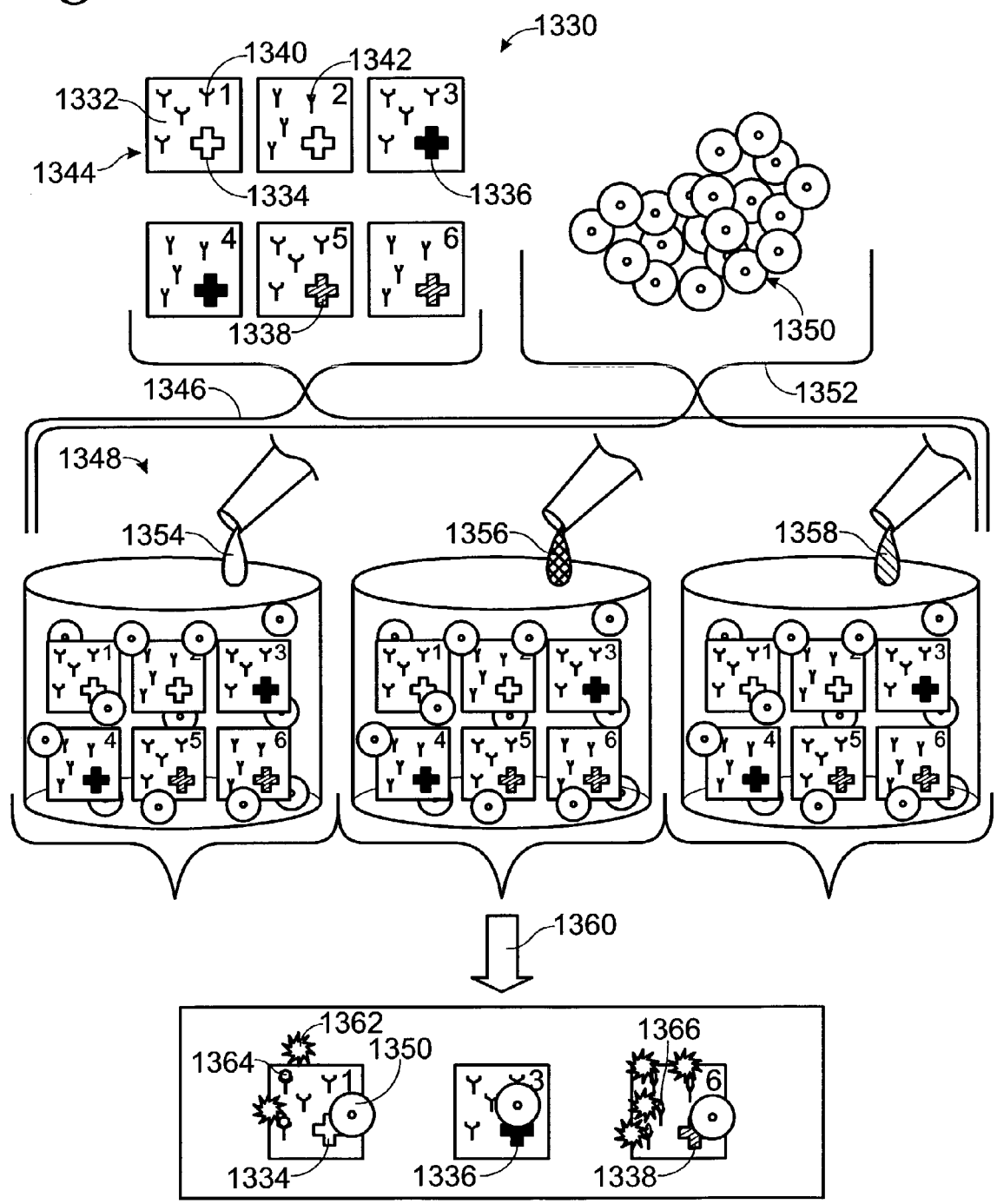
FIG. 38 is a schematic view of a method for multiplexed analysis using coded carriers that are pre-associated with a candidate cytokine production modulator and a cytokine capturing agent, in accordance with aspects of the invention.
Figure 39:
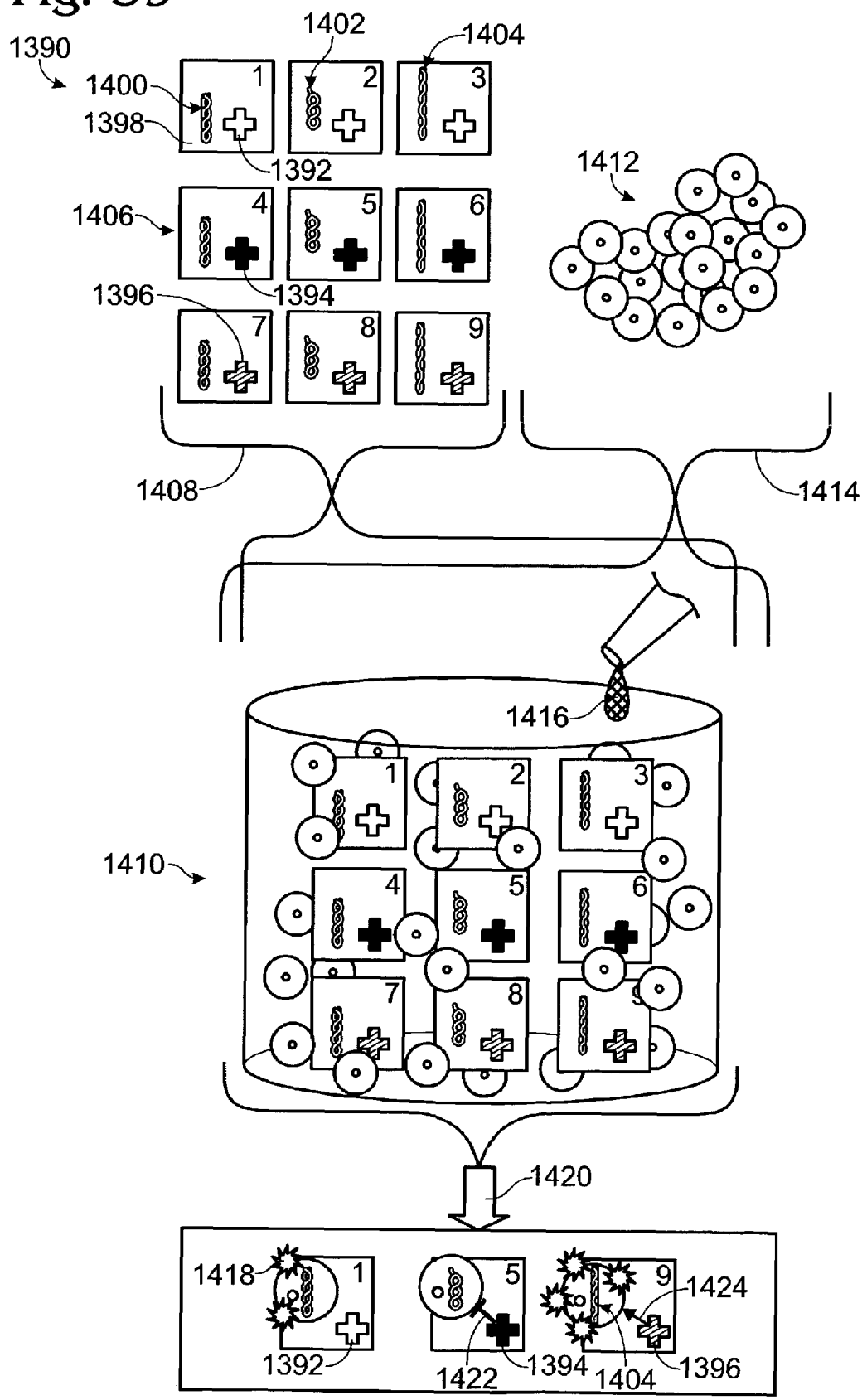
FIG. 39 is a schematic view of a method for multiplexed analysis using coded carriers pre-associated with transfection materials and a candidate modulator, in accordance with aspects of the invention.

This example, illustrated in FIGS. 37-39, describes methods and compositions for multiplexed analysis of biological systems using arrays of coded carriers that are pre-associated with cell-analysis materials such as local capturing agents.

During embryonic development, cells differentiate into the many cell types that exist in the mature organism. These cell types may exhibit very different, yet often stereotypical, phenotypes. These phenotypes may range from simple differences in gene expression to complex morphological and structural differences. Therefore, to identify individual cells and to understand the physiology of the identified cells, multiple measurements often are used. In many cases, researchers must stain cells for multiple markers to both positively identify a cell of interest as well as assay a property of the cell. Unfortunately, this staining approach has multiple disadvantages, especially if the cells of interest are of low abundance within a cell population or if the data signal from the cells of interest is low.

One approach to overcoming low abundance for cells of interest is to purify the cells from a mixed cell population by virtue of a surface protein specific to the cells of interest. This purification may eliminate the need to stain cells for the surface protein. The purification also serves to provide a relatively homogenous, concentrated population of relevant cells for the experiment, allowing for a higher data signal. However, this purification strategy generally is impractical when an investigator is attempting to assess the effects of many compounds on the physiology of multiple cell types.

The measurement of cytokine expression from thymocytes specifically illustrates problems associated with studying cells of interest present at low abundance in a cell population. For example, a researcher might be interested in assaying the secretion of multiple cytokines, such as Interferon-γ (IFN-γ)

and Interleukin-2 (IL-2,), by multiple cell types, such as CD-4 and CD-8 thymocytes. In this case, double staining typically would not be used because the signal for each cytokine often is very low, such that special protocols are required to obtain good data. Therefore, the investigator may first need to purify each individual cell type, CD-4 and CD-8, for example, by using cell-type specific antibodies attached to solid supports, and then to split each pool of cells into multiple tubes and assay them for cytokine secretion, for example, with specific cytokine antibodies. In addition to the time-consuming and costly requirement for a separate cell purification step to obtain each cell type, this purification approach also is limited in the number of cytokines that are detectable from the purified cell population. Generally, the cells in each tube allow measurement of no more than a limited number of cytokine antibodies that are optically distinguishable, typically a maximum of four or five.

Problems associated with measuring cytokine production typify a growing problem in measuring and understanding complex cellular phenotypes and inter-relationships between these phenotypes and drug candidates. Analytical tools continually are being developed to measure and modify cell phenotypes. These analytical tools include specific antibodies, gene sequences as probes, expression and reporter vectors for transfection, and compound libraries.

The availability of so many analytical tools makes the task of effectively using the tools, alone and in combination, increasingly difficult. Efforts to make more efficient use of these analytical tools have focused generally on the speed with which samples are manipulated and measured. For example, very high-density microplates have been developed to hold samples, along with more efficient microfluidic manipulations of the samples and more rapid sample measurement. However, with each combination of cell type and analytical tool occupying a separate microplate well, a prohibitively large number of microplates and manipulations of the microplates may be required to analyze a sufficient number of cell and tool combinations to meet goals of discovery or understanding.

The invention provides methods and compositions for multiplexed analysis of biological systems using arrays of coded carriers that are pre-associated with cell-analysis materials such as local capturing agents. The coded carriers are carriers or classes of carriers that have detectable, distinguishable codes. The coded carriers are exposed to and pre-associated with one or more cell-analysis materials and may be combined with other pre-associated coded carriers to create positional and/or nonpositional arrays. The cell analysis materials on each carrier are identifiable based on the linked code. Furthermore, the cell-analysis materials on each carrier may predetermine an aspect of the analysis that will be conducted for the carrier. After pre-association, the analytical arrays may be associated with a cell population or a subset of the cell population, linking the cell population to each code and cell-analysis material(s). Subsequently, a characteristic of the cell population is measured, and the code is read, thus linking the cell analysis material(s) to the characteristic for each carrier.

The cell-analysis materials on each coded carrier facilitate or directly promote analysis of cells and/or cellular materials and may be functionally distinct. For example, the cell-analysis material may facilitate measuring the level and/or location of a material in, on, and/or released by the cell population. Alternatively, or in addition, the cell-analysis material may be a candidate ligand, modulator, and/or may introduce a foreign genetic material into the cell population. Alternatively, or in addition, the cell-analysis material may select and/or identify the associated cell population. The use of two or more functionally distinct cell-analysis materials may allow two or more parameters to be, varied between the carriers within an array. For example, the two or more parameters may include the level and/or location of a biological material related to the cell population, a material transfected into the cell population, a candidate modulator exposed to the cell population, and/or the cell population associated with the carrier. This pre-association approach may allow distinct cell types present in simple or complex cell mixtures to be purified, characterized, transfected, and/or tested in various drug screens without complex or lengthy purification and manipulation of the cells. Furthermore, this approach may allow multiple cellular phenotypes to be interrogated on each carrier 10.1 Cell-Analysis Materials A cell-analysis material suitable for pre-association generally comprises any cell-analysis material that may be associated with a coded carrier prior to associating cells with the carrier and that may recruit cells for analysis or that may affect and/or detect a property of the cells. Suitable cell-analysis materials may be selected from any of the categories described in Section IV above, including modulators, ligands/receptors, transfection materials, cell selectors, local capturing agents, cells, and/or labels. Thus, a cell-analysis material used for pre-association may select the types of cell that bind to a coded carrier, may affect the phenotype of cells after the cells are associated with the carrier, and/or may facilitate measuring a characteristic of cells on the carrier.

10.2 Pre-associating Coded Carriers with Cell-Analysis Materials

In this example, pre-association links one or more cell-analysis material with a coded carrier. Thus, pre-association allows the code on a carrier to relate encoded information about linked cell-analysis materials.

Pre-association may require a balancing act between stable and unstable linkages. Linkage between a cell-analysis material and a coded carrier should be sufficiently stable to retain a portion of the cell-analysis material linked to the carrier during subsequent association of cells. However, the linkage may be transient enough so that a cell-analysis material, such as a transfection material or internalized modulator, is released for uptake by cells attached to the carrier. Unstable, transient linkage may be mediated by incorporation of the cell-analysis material into a gel or carrier matrix, such as that formed by a gel-forming material, for example, gelatin.

Pre-association generally is carried out by mixing or otherwise exposing one or more cell-analysis materials to a population of coded carriers having one or more known or determinable codes. Linkage of the cell-analysis materials to the carriers may be facilitated by any suitable treatment, including desiccation, temperature changes, light, radiation, chemical reaction, or treatment with an association promoter, such as a gel-forming material. Once stable or transient linkage has been effected, carriers with different linked cell-analysis materials (and different codes) may be combined in a single container, such as a tube or a microplate well, to produce a nonpositional array or library of cell-analysis materials.

A transfection material may pre-associated with a carrier so that it becomes available for transfection only when the carrier is associated with certain cell types or cell populations. Release or exposure of the transfection material may be dependent on the cell type or cell population that associates subsequently with the carrier. For example, a transfection material may be attached to a carrier via a linkage that is susceptible to a particular enzyme, cleavage activity, or interaction-disrupting material secreted by specific cells. The linkage may be through a peptide, specific nucleic acid sequence, or glycosidic bond, among others, or through a non-covalent interaction, such as a receptor/ligand pair. Thus, the transfection material may become available (be released) for transfection only by specific cells due to the expression of the appropriate "activating" or releasing material that disrupts the linkage.

Pre-association may include linking a coded carrier to a combination of two or more functionally distinct (or similar) cell-analysis materials. For example, a coded carrier may be linked to a transfection material and a cell selector, a cell selector and a local capturing agent, or any other suitable combination or two or more cell-analysis materials. Pre-associating plural cell-analysis materials with a carrier may be carried out sequentially and/or concomitantly. The code on each carrier may be used to identify the combination of cell-analysis materials linked to the carrier.

Exemplary methods of pre-association and further details about encoded information that may be related by cell-analysis materials are described in Sections V and VII, respectively.

10.3 Associating Cells with Coded Arrays of Cell-Analysis Materials

Coded carriers may be associated with cells after the carriers are pre-associated with a cell-analysis material. Association may be carried out using any mechanism that allows cells to adhere to the carriers and/or interact with the cell-analysis materials linked to the carriers. Cells may associate directly with the coded carrier and/or may use an agent, such as a cell selector or cell adherence promoter, that is linked to the carrier. General or specific cell adherence promoters may include antibodies, gelatin, polylysine, fibronectin, and other extracellular matrix proteins. Association may link one or more cells with a coded carrier, providing a cell population associated with the carrier. The cell population may be provided by any source or mixture of sources, including cells and cell mixtures from patient samples.

The coded carriers may be mixed after pre-association with cell-analysis materials and/or association with cells to form nonpositional arrays. In each case, the code linked to each coded carrier may be used to identify an aspect of the associated cell-analysis material(s) and/or cell population.

Exemplary cells and cell association procedures are described in more detail in Sections III and V above.

10.4 Reading the Code and Measuring Cell Characteristics

After cells are associated with a coded array of cell-analysis materials, a characteristic of the cell population may be measured, and the code of the carrier may be read. Exemplary cell characteristics and methods for reading codes and measuring cell characteristics are described in more detail in Sections X and XI and elsewhere in this Detailed Description.

10.5 Combination Arrays of Cell Selectors and Local Capturing Agents

FIG. 37 illustrates a method 1260 that uses a nonpositional array in which each coded carrier is pre-associated with two functionally distinct cell-analysis materials: a cell selector and a local capturing agent. The method eliminates sequential purification of cells before a cytokine assay and may provide the ability to assay as many as 50 or more cytokines in each reaction.

Coded carriers 1262 are pre-associated with a cell-selector antibody 1264, 1266 that binds a cell type by virtue of its cell surface marker, CD-4 or CD-8, respectively. In addition, coded carriers are pre-associated with a local capturing agent, antibody 1268, 1270 that recognizes the cytokine to be assayed, IFN-γ or IL-2, respectively. Each carrier assembly 1272 supports one of four possible combinations of cell selector and local capturing agent. Combining the carrier assemblies, shown at 1274, provides a nonpositional array 1276 of carrier assemblies.

A cell sample 1278, containing distinct populations of T-cells, such as found in blood and including CD-4 thymocytes 1280 and CD-8 thymocytes 1282, is used in the assay. The cell sample is combined with the carrier assemblies in the array, shown at 1284. Only the cells expressing CD-4 or CD-8 associate with their respective antibodies on the carriers, shown at 1286. Thus CD-4 cells are selected by carriers having codes "1" and "3", whereas CD-8 cells are selected by carriers having codes "2" and "4". The selection, in effect, serves to "purify" each specific cell type from a cell mixture.

While attached to the coded carriers, the cells continue to secrete a spectrum of cytokines dictated by their physiology. For example, CD-4 thymocytes secrete IL-2, and CD-8 thymocytes secrete both IL-2 and IFN-γ. If the selected cell is on a coded carrier that contains an antibody to a cytokine that the cell is secreting, the secreted cytokine is captured by the corresponding antibody of the coded carrier during the desired incubation period. Detection of the secreted cytokine proceeds by adding a secondary antibody that recognizes a different epitope on the cytokine than that recognized by the immobilized capturing antibody on the carrier assembly. This secondary antibody may be directly labeled with a fluorophore, or the secondary antibody may be detected by a tertiary antibody that is fluorescently labeled.

In general, secretion of each cytokine is measured with a pair of specific capturing and detecting antibodies. Each captured cytokine is detected using a second, detecting anti-cytokine antibody that binds an exposed epitope on the captured cytokine. Thus, at least some antibodies in each of the pre-associated (capturing) and detecting anti-cytokine antibody pairs should bind to distinct epitopes on a cytokine. Furthermore, the pre-associated (capturing) and detecting anti-cytokine antibodies should be differentially distinguishable. For example, the pre-associated and detecting antibodies may be derived from distinct species to allow selective secondary labeling of the detecting antibodies, or the detecting antibody may be pre-tagged with a detectable moiety.

After reading the code on each carrier, and measuring the cytokine signal associated with each carrier, shown at 1288, the investigator is able to determine which cells, CD-4 or CD-8, are secreting cytokines IFN-γ and/or IL-2. Thus, cytokine signals 1290 are detectable on carriers with codes "2", "3", and "4", demonstrating IL-2 (but not IFN-γ) production by CD-4 cells, and IL-2 and IFN-γ production by CD-8 cells.

Counter-staining the selected cells for other cellular markers, intra- or extracellular, may increase the utility of the method. For example, an investigator may also stain the cells for a cancer or other disease marker. When applied to the example above, the researcher not only would ascertain which cell types are secreting which cytokines but also whether those cells were cancerous.

The method illustrated in FIG. 37 may be applied to any assay that identifies a cell surface marker and a response to or identification of an extracellular molecule. Furthermore, the method is not limited to the attachment of only two cell-analysis materials/items/molecules to each coded carrier.

10.6 Combination Arrays of Modulators and Local Capturing Agents

FIG. 38 illustrates a method 1330 that uses pre-associated coded carriers to measure functional interplay between cytokine production modulators and cytokine stimulating factors. In method 1330, each type of coded carrier 1332 is pre-associated with a distinct two-component combination of cell-analysis materials. The first component is a cytokine production modulator 1334, 1336, 1338 that is linked to the carriers. The second component is a local capturing antibody for a cytokine 1340, 1342.

Nonpositional arrays are formed and treated as follows. Each carrier type is pre-associated with the appropriate combination of cell-analysis materials to produce carrier assemblies 1344. The carrier assemblies are then combined and aliquoted to separate containers, shown at 1346, to create similar nonpositional arrays, or sibling arrays 1348. Alternatively, the carrier assemblies may be aliquoted directly after pre-association to combine with other carrier assemblies to form the sibling arrays. A cell population of interest 1350 is associated with the sibling arrays, shown at 1352. Associating the carriers with cells may be carried out before or after aliquoting/distributing the carriers into separate sibling arrays 1348. Each sibling array then is treated with an activating ligand/cytokine stimulating factor 1354, 1356, 1358.

Cytokine production is measured, shown at 1360, after incubation of the arrays :1348 with each stimulating factor for an appropriate time period. As outlined in method 1260 of FIG. 37, a second, detecting antibody is used to bind and detect exposed epitopes on captured cytokines. Detected cytokine signal 1362 is shown, with two stars indicating unmodulated cytokine levels defined by stimulating factor 1356.

Some example outcomes of interest are illustrated at the bottom. Each outcome results from treatment of cells with stimulating factor 1356, which promotes production of cytokines 1364, 1366. As shown on the carrier assembly with code "1", the cells production of cytokine 1364 is unaffected by pre-association of modulator 1334; an unmodulated, stimulated level of cytokine 1364 is measured (two stars). In contrast, on the carrier assembly with code "3", no signal for cytokine 1364 is detectable, indicating that modulator 1336 is an antagonist of stimulating factor 1356 action. Finally, carrier assembly with code "6" shows an increased signal for cytokine 1366 (four stars), indicating that modulator 1338 enhances production of cytokine 1366.

10.7 Combination Arrays of Modulators and Transfection Materials

Method 1390 of FIG. 39 illustrates the use of pre-associated coded carriers to measure the ability of potential ligands/modulators to regulate activity of a receptor expressed from a reverse-transfected expression vector. Here, DNA in the form of plasmids or other vectors is pre-associated with coded carriers so as to promote reverse transfection and to allow interrogation of different receptors expressed by the cells on the same carrier where transfection occurs. Signaling by the receptor is reported by a reporter gene that also is introduced by reverse-transfection.

In this example, each type of coded carrier is pre-associated with a distinct two-component combination of cell-analysis materials. The first component is a modulator 1392, 1394, 1396 that is linked to each coded carrier 1398. The second component is a mixture of transfection materials: (i) an expression vector encoding a known or candidate receptor protein of interest, and (ii) a reporter gene that measures receptor activity. Distinct transfection material mixtures 1400, 1402, 1404 are pre-associated with each coded carrier type. The resulting pre-associated carrier assemblies 1406 include all nine combinations of modulator and transfection materials.

Subsequent steps in method 1390 involve forming an array, cell association, reverse transfection, receptor modulation, and reporter gene measurement. Carrier assemblies 1406 are combined, shown at 1408, to create a nonpositional array 1410. Cell population 1412 is combined, shown at 1414, with array 1410 to associate the cell population with the carrier assemblies. The cell-array mixture then is incubated for an appropriate time period in the presence of an activating, specific receptor ligand 1416. The incubation allows reverse transfection of DNAs 1400, 1402, 1404 into cells associated with each carrier, and receptor expression from the reverse-transfected DNAs. As a result, receptors are activated by specific ligand 1416 and/or modulated by pre-associated modulators 1392, 1394, 1396. Reporter gene expression from reverse-transfected reporter DNAs depends upon the extent of ligand-receptor modulation by each pre-associated modulator. In this example, reporter gene expression from reverse-transfected cells is represented by signal stars 1418, with two stars indicating an unmodulated, ligand-stimulated reporter expression level.

Some example outcomes produced by measuring reporter gene expression and reading the code, shown at 1420, are illustrated at the bottom of FIG. 39. The coded carrier assembly with code "1" shows two signal stars 1418, indicating normal reporter gene activity mediated by activation of the expressed receptor by ligand 1416. Thus modulator 1392 has no measurable effect. In contrast, carrier assembly with code "5" shows no detectable reporter gene activity, indicating an antagonist action 1422 of modulator 1394. Finally, carrier assembly with code "9" shows enhanced activity of transfected reporter gene activity due to modulator 1396 activity, suggesting that modulator 1396 has agonist action 1424 for the receptor encoded by DNA 1404.

Example 11

Library Screening System Using Coded Carriers

Figure 40:
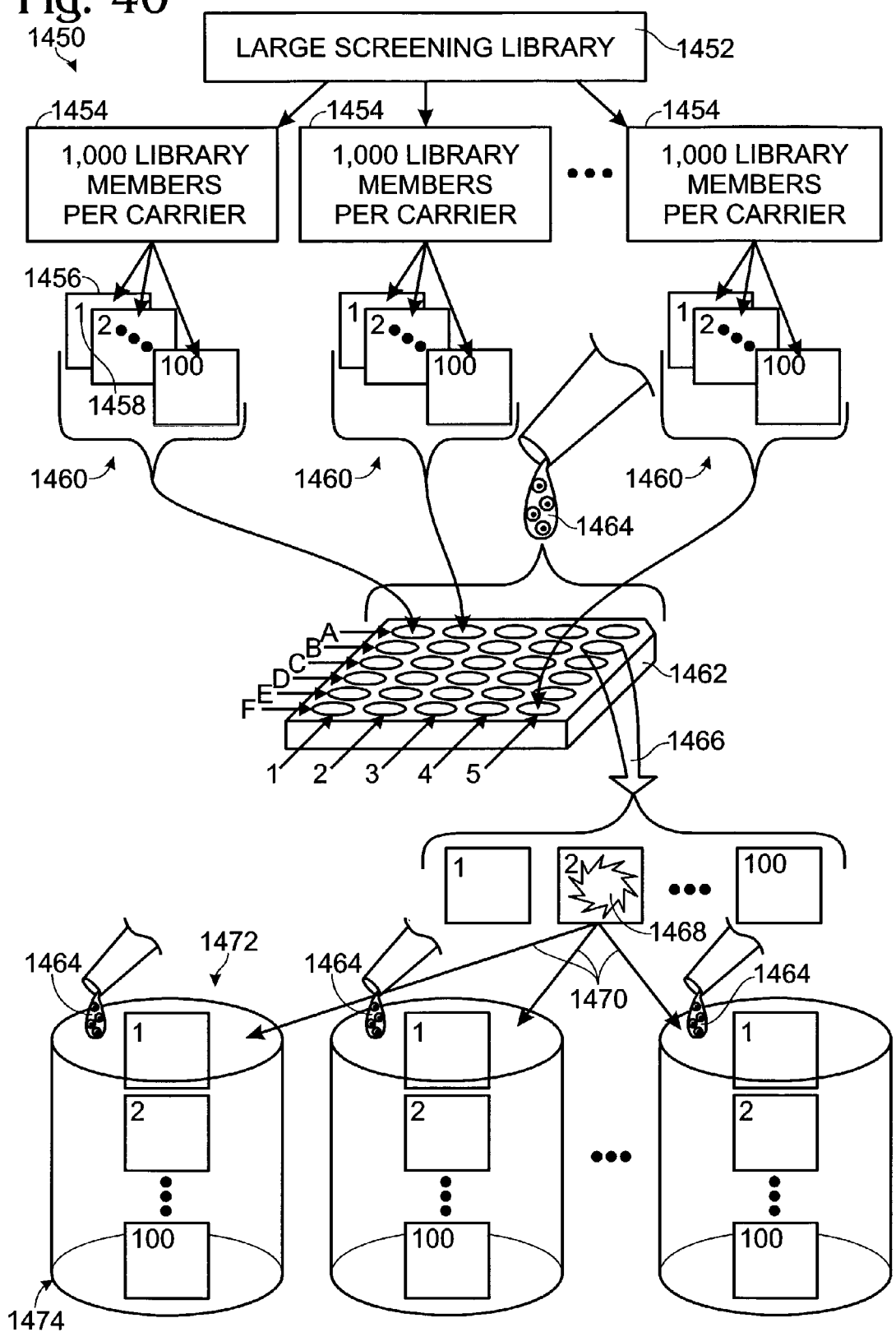
FIG. 40 is a schematic view of a method for a library screen using a partially positional array of coded carriers, in accordance with aspects of the invention.

This example, illustrated in FIG. 40, describes systems for screening libraries using partially positional or nonpositional arrays that include pools of library members associated with coded carriers.

Collections of related biological materials often are assembled as libraries. For example, libraries of expressed proteins, receptors, ligands, chemical compounds, and genes offer sets of related molecules from which useful molecules may be identified and/or isolated. Molecules may be identified that have a desired property, such as an ability to bind to a specific partner molecule or to mediate a specific biological effect. Molecules may be isolated to allow further testing and analysis. For example, library screening may be used to identify and isolate a lead compound in a drug screen of a chemical compound library. The lead compound may be directly suitable for animal studies or clinical trials, for example, as a drug candidate. The lead compound also may serve as a model for selecting or developing a second, more specific compound library for use in a second library screen.

Most screens attempt to identify library members with specific, and thus uncommon, properties. Unfortunately, the probability of identifying a library member with a particular specific property generally is proportional to the number of candidates, or distinct library members, screened. Thus, a library screen of high complexity, in which many candidate library members are tested, generally is more likely to identify a useful library member than is a library screen of low complexity, in which only a few library members are tested.

Despite their importance, library screens of high-complexity often are limited in complexity by the number of library members that can be practically screened. For example, existing compound libraries have millions of members, and synthetic libraries produced by combinatorial strategies may have many more than a billion members. A screen that individually tests each member of such a high-complexity library would be time consuming, costly, and in many cases impractical.

Efforts to reduce the time and cost of such library screens have focused on using "library pools" in which library members are mixed and analyzed as a pool in a test system. However, the use of library pools creates its own difficulties, such as how to select the size of the library pool, because each pool size has distinct advantages and disadvantages. A small pool may provide a signal-to-noise ratio high enough to detect a positive signal produced by a member of the pool, and require little additional screening to identify an individual positive member from a positive pool. However, a large number of small library pools may need to be screened in a primary screen to identify a positive pool. In contrast, a large pool may allow a smaller number of library pools to be screened to search through a larger number of library members. However, several additional screens may be required to identify a single library member from a large positive pool, and the signal-to-noise ratio for a large pool may be too low to provide reliable identification of a positive signal. Therefore, a library screening method that combines the advantages of small pools and large pools would be useful.

The invention provides methods and compositions for screening libraries involving pools of library members associated with coded carriers. The members of each library pool may be associated as a mix, so that they occupy overlapping regions on a carrier, or the members may have distinct, assigned spatial positions on a carrier. In some embodiments, the carriers and their associated library pools may be placed in a partially positional array, in which each library pool is identifiable by a combination of the code and the position of the pool's carrier. The partially positional array may include a nonpositional aspect defined by plural different coded carriers and their associated library pools randomly disposed relative to each other at each position of the array. Furthermore, one code may be used at plural positions, if a combination of the carrier's code and position identify a pool of library members. In other embodiments, a nonpositional array of coded carriers may be used to screen a library, with each carrier associated with a pool of library members.

The partially positional array or nonpositional array is tested for interaction with a target, to find a positive-signal carrier. Reading the code on the carrier, in combination with the carrier's position within the array, if the array is partially positional, identifies the positive library pool that interacts with the target. An additional screen or screens may be conducted to screen subpools or individual members of the positive library pool to identify the particular library member that interacts with the target.

The invention potentially provides at least several advantages over other library screening methods. First, each pool of library members is associated with a carrier, so any interaction and resultant positive signal provided by a member of the library pool may be restricted to the vicinity of the carrier. This proximity effect may provide a greater signal-to-noise ratio and thus allow a greater number of library members to be screened at a single position in an array. Second, because a positive pool of library members may be identified among plural pools at a position, a positive signal restricts further analysis to a relatively small number of library members. Thus, the size and extent of additional pool screening will be reduced. Finally, one set of carrier codes may be used repeatedly at different positions within the array, which may reduce the number of distinctly coded carriers that need to be manufactured. As a result of these advantages, the invention may significantly reduce the time and cost required to screen a high-complexity library.

11.1 Libraries and Library Pools

The invention provides methods for arraying and screening a library. A library generally comprises a collection of two or more different members, such as molecules, viruses, cells, and/or tissues, among others, related by a common characteristic. Thus, the library may comprise a collection of two or more different chemical compounds, receptors, ligands, drugs, antibodies, peptides, proteins, nucleic acids, phages expressing different proteins, viruses, bacteria, or eukaryotic cells, among others. A library may be produced by an enzymatic or synthetic route, such as a cDNA library or a combinatorial synthetic library, may be assembled from natural sources, such as a library of bacteria, or may be a mixed collection from two or more synthetic and/or natural sources. Additional exemplary libraries are included in Section IX above.

A library pool generally comprises a subset of one, or more typically, two or more members from a library. The pool may be defined by a specific number of members from the library, for example, when members of the library are maintained separately, and may include a known subset of the library. For example, a chemical library with $10^5$ defined members may provide 1,000 pools of exactly 100 members each, with each of the 100 members being known. Alternatively, the pool may represent an approximate fraction of a library and may include an unidentified subset of library members, for example, when the library is maintained as a mixed population of library members. In this case, the mixed population may be sampled randomly to provide library pools. For example, a phage display library may include approximately $10^7$ members in a mixture, at a titer of about $10^9$ phages/mL. Aliquots of 1 nL will sample the library randomly to produce library pools of about 1,000 members each.

11.2 Associating Library Pools with Coded Carriers

Library pools are associated with coded carriers to provide coded library pools that are identifiable based on the code and, optionally, on the position of the carrier. A coded carrier and an associated library pool may be referred to as a pool-carrier assembly.

Associating generally comprises any coupling mechanism that maintains members of a library pool in spatial proximity to a coded carrier. A library pool may be associated with a carrier through covalent linkages or through noncovalent interactions. Furthermore, interaction between the library pool and the carrier may be direct or indirect.

Members of a library pool and corresponding coded carriers may be associated in any suitable combination. For example, members of a library pool may be premixed and then associated with the carrier simultaneously. Alternatively, members or groups of members (i.e., subpools) of a library pool may be associated with the carrier sequentially. The members or subpools may associate with substantially overlapping regions of the carrier to achieve a nonpositional mixed library pool on the carrier. Alternatively, the members or subpools may occupy distinct locations on the carrier. Distinct locations may provide positional identification within the carrier to identify the member or subpool on the carrier.

Exemplary carriers, codes, and methods of library association are included above in Sections I, II, and V, respectively.

11.3 Partially Positional and Nonpositional Library Arrays

Coded carriers with associated library pools may be distributed to a library array for library screening. The library array may be partially positional or nonpositional.

A partially positional array generally comprises an array in which each library pool may be identified based on a combination of the position and code of the associated carrier. With a partially positional array, the code or the position of a carrier may be shared with other carriers that carry distinct library pools. Specifically, the same code may be used at more than one position in the array, and more than one type of coded carrier may be placed at the same position in the array. However, the combination of the code and the position together provide a unique identifier for a library pool in a library array. By relying on code and position to identify a library pool, a limited set of carrier codes may be used to carry and screen any size of library. To form a partially positional array, coded carriers are placed at positions in an array, generally after association with library pools. The array may be provided by containers in a fixed-positional format such as a microplate or by positionally unconstrained containers that are individually identifiable by markings or labels.

A nonpositional array generally comprises an array in which each library pool may be identified based solely on the code of the associated carrier without consideration of the carrier's position in a positional array, so that the carrier may have an unfixed or arbitrary position in a mixture of carriers. Exemplary positional and nonpositional arrays are described above in more detail in Section VIII.

11.4. Testing Target Interaction

A partially positional or nonpositional library array of library pools may be tested for target interaction to identify a library pool that interacts with the target. A positive library pool provides a positive interaction signal in a library screen and may include one or more library members that determine the positive signal.

Testing generally comprises mixing a target with library pools for an amount of time sufficient for an interaction to occur and then measuring the presence, extent, and/or nature of interaction.

A target generally comprises any material of interest such as a molecule, a molecular complex, a virus, a cell, or a tissue for which a specific interacting partner is desired. Thus, the target may include one or more chemical compounds, receptors, ligands, drugs, antibodies, peptides, proteins, nucleic acids, phages, viruses, bacteria, or eukaryotic cells, among others. As indicated, a mixture of plural targets may be used as the target to screen for interacting library pools for each of the plural targets at the same time.

Interaction generally comprises any measurable effect mediated by exposure of a pool of library members to a target. Such interaction typically arises by the target acting directly or indirectly on one or more members of the pool, or vice versa. The measurable effect may include binding and/or some other physical interaction between member(s) of the pool and the target. Here, binding generally comprises any interaction between the target and the library member that is sufficiently long-lived to allow detection during testing for interaction. The measurable effect may be a measurable pairing of the target and the library member, for example, when the target is labeled with a detectable marker, such as an optically detectable label. Alternatively, the measurable effect may be a phenotypic response elicited by action of the target on the library member or by action of the library member on the target. A phenotypic response generally comprises any functional response elicited from a biological entity. Examples of a phenotypic response include altered reporter gene activity; growth; differentiation; apoptosis; necrosis; a change in number, location, or shape. of subcellular organelles; altered secretion of a material; altered transport of a material; cell cycle modification or arrest; altered expression of a gene; a change in the level, location, or form of a cellular material, such as a protein, an ion, a hormone, a lipid, a carbohydrate; and the like. Other exemplary interactions are included above in Section X.

11.5 Measuring Interaction and Reading Codes

Interaction between the target and library pools in a library array may be measured after exposure of the target to the library pools. Coded carriers may be analyzed for interaction in situ within the array or they may be transferred to a suitable analysis site, such as a microscope slide or a flow cytometer. The code on each carrier may be determined and its position located before, during, or after measurement for interaction. For example, in a library screen in which interactions are rare, or in which interactions yield qualitative (e.g., yes/no) results, it may be more efficient to read the code only for those carriers on which an interaction is detected. In contrast, in a library screen in which interactions are common, or in which interactions yield quantitative (e.g., graded) results, it may be equally efficient to read the code and assay results in any order.

Exemplary methods for reading codes and measuring interactions are described above in more detail in Section XI.

11.6 Secondary Screening

A library pool that tests positive for interaction with a target may be characterized further by secondary screening. Secondary screening generally comprises testing individual members or subpools of a library pool for interaction with the target, and may be carried out in one or more narrowing, sequential screens. Testing may be carried out according to the strategy outlined above, but with the library pool acting as the library, and the subpools or individual members from the library pool acting as library pools. In this case, each subpool or individual member may be associated with a coded carrier in a partially positional or a nonpositional array and re-tested for interaction. The choice of associating a subpool or individual library members with coded carriers in the secondary screening may be determined by any suitable criteria, such as the complexity of the positive library pool, the available number of carrier codes, and the time involved in performing each library screen.

11.7 High Complexity Library Screening

Method 1450 illustrates a screen of a high complexity library 1452 using a coded, partially positional library array; see FIG. 40. The high-complexity library may include greater than about $10^7$ members, such as an antibody, peptide, or chemical library.

The top portion of FIG. 40 shows pools 1454 of about 1,000 library members associated with each of 100 distinctly coded carriers 1456 having codes 1458, to form nonpositional arrays 1460. Each array 1460 includes 100 library pools with a total of about 1,000 members in each pool. The arrays are placed at defined positions in a positional array, such as sample well "A1" in microplate 1462. Distinct nonpositional arrays are produced using the same or a different set of 100 carriers but using different pools of about 1,000 library members 1454 from library 1452. Each of these distinct nonpositional arrays 1460 is disposed at a different, defined position in the positional array, thus allowing identification of each library pool based on a combination of the carrier code and the position in the array. In a specific example of method 1450, a positional array is used that has 384 positions, such as a 384-well microplate. With 100 different carriers codes, about 38,400 pools, or about $3.8 \times 10^7$ library members can be screened in one partially positional array.

The middle portion of FIG. 40 shows addition of a target 1464 to the positional array to test for interaction in this primary screen. Here, transfected cells are used as target 1464, and interaction is measured as a phenotypic response in the transfected cells. Specifically, cells are cotransfected with (i) an expression vector for a cell surface receptor, such as a G-protein coupled receptor, and (ii) a reporter gene that responds to the receptor upon binding of a receptor agonist (or antagonist), giving a measurable reporter response. Library pools are tested for their ability to produce the reporter response. A positive pool may include a receptor agonist that stimulates reporter gene activity, or a receptor agonist that suppresses reporter gene activity, depending on how the assay is set up, thereby producing a measurable positive signal on a carrier with which the positive pool is associated. Reading the code and locating the position of the carrier within the array identify the positive library pool, shown at 1466. Here, sample well "B5" shows a positive signal 1468 on a carrier with code "2". Thus, at least one of 1,000 library members associated with this carrier provides the positive signal.

The bottom portion of FIG. 40 illustrates a secondary screen to analyze individual library members of the positive pool. Each library member of the positive pool is associated with a coded carrier, shown at 1470, and placed in a nonpositional array or a partially positional array. Here, a partially positional array 1472 is preferable because the number of library members in each pool (1,000) is larger than the number of codes (100). Similar to the primary screen, a nonpositional array of 100 coded carriers is formed by association with library members and placed at a position in an array. However, in this case, a single library member may be associated with a carrier, rather than a pool of 1,000 members. Thus, each position 1474 of the array includes 100 library members. Distinct nonpositional arrays are formed at nine other positions, using the same 100 coded carriers, to form a partially positional array 1472 from the positive pool.

The library, coded carriers, and screening protocol generally may be selected as appropriate for the assay; the numbers, targets, and other details stated here are for example only. Thus, the complexity of the library, the size of the library pools, the number of distinct carrier codes, the number of carriers in the nonpositional array, and the number of positions in the positional array all may assume independently any suitable values. Moreover, the screens, including the secondary screens, may test single members and/or library subpools, as described above, and may require yet additional screens to identify individual, positive library members. In addition, other targets may be used, such as untransfected cells, bacteria, phages, viruses, molecules, and the like.

Example 12

Film-based Coded Carriers

This example, illustrated in FIGS. 41-45, describes coded carriers comprising photosensitive film for use in nonpositional and/or positional arrays.

There are many methods for making coded carriers. However, these methods may be complex and/or expensive to carry out, particularly if the carriers are to have an extremely small dimension, for example, 400 microns or less. Thus, there is a need for a simple and inexpensive method for making coded carriers.

The invention provides coded carriers and methods for making coded carriers for use in analysis of biological and/or other samples. The carriers may be particularly useful for multiplexed analysis of biological samples.

FIG. 41 shows a method 1550 of making coded carriers, or coded particles, in accordance with aspects of the invention.

In method 1550, a photosensitive film 1552 is exposed, shown at 1554, to a base image or pattern to form a replica or film image 1556, for example, as a pattern on the film, thus coding the film. Coded film 1558 then may be cut into a plurality of small coded particles having the same or different code suitable for use as carriers for biological samples, such as nucleic acids, polymers, proteins, cells, tissue slices, etc. Alternatively, a biological sample, such as tissue section 1560, may be immobilized to coded film 1558 prior to cutting, shown at 1562, essentially creating an open-faced sandwich 1564; see FIGS. 41 and 42. The film/sample sandwich 1564 then can be partitioned, shown at 1566, into a plurality of segments 1568. In either case, each segment of film, or carrier, to which the biological sample is immobilized includes an image or coding portion 1570 of replica image 1556. Thus, image portion 1570 may act as an identifiable code, allowing the coded carriers, and thus the associated biological samples, to be identified and tracked throughout analysis.

A base image generally comprises any image that may be photographed, projected onto, or otherwise reproduced on photosensitive film. The image may or may not include a reproducible pattern. Suitable images include, for example, easily identifiable patterns, such as stripes, grids, repeating shapes (such as spots), and the like. In some embodiments, the image includes a repeated pattern of stripes of different colors.

Film 1552 generally comprises any thin sheet or strip of photosensitive material capable of recording and/or used to record a photographic image, including but not limited to cellulose derivatives and thermoplastic resins coated with a photosensitive emulsion and used to make photographic negatives or transparencies. Any suitable film may be used, including black and white or color film, depending on the nature of the code and the application. Commercial film may be suitable, although some commercial films are intrinsically fluorescent, which may interfere with reading the code, and/or the results of luminescence and/or calorimetric assays. In these cases, the code and/or assay may be read using a wavelength and/or other property separately detectable from the film fluorescence.

The film may be exposed to the base image using any suitable technique. For example, the film may be exposed to the base image by photographing the base image using a suitable detection device such as a camera. In brief, when a camera's shutter is open, the lens focuses light originating from the object in the field of view of the camera onto the film. Such light may arise from reflection, transmission, and/or emission from the object. Photosensitive chemicals in the film react to exposure to the light. When the film is developed, the reacted areas change properties, for example, changing colors and/or opacity, among others, such that the base image is recorded on the film as a film image, creating a negative. Color film typically makes use of three dyes corresponding to the three primary colors: blue, yellow, and red. More generally, the film may be exposed to the base image or pattern by directing light or other radiation directly onto the film, for example, using direct laser or CRT writing, with or without the use of any imaging optics.

The coded carriers of the invention are particularly useful for multiplexed analysis, as stated above. Multiplexed analysis typically involves conducting experiments on a number of different samples from different sources pooled together. This multiplexed approach may save the researcher a significant amount of time and expense, and it allows for a better comparison of results from different sample sources. However, multiplexed analysis also requires a determination of which sample came from which source to interpret the results of the experiments. For this reason, it often is desirable to label samples from different sources with different identifiable markers or codes.

The simplest multiplexed analysis involves study of two different types of samples, for example, a first sample and a second sample that differ in kind and/or condition, among others. These samples may comprise different types of cells, tissues, etc., such as Swiss 3T3 and HeLa cells, or kidney and uterine tissues, among others. Alternatively, or in addition, these samples may comprise the same types of cells, tissues, etc., taken at different times and/or under different conditions, among others.

Multiplexed analysis of two types of samples may be used to conduct experiments on a particular tissue or other sample before and after treatment with a particular chemical to test the effects of that chemical on the tissue. In such experiments, a sample of the tissue is obtained prior to treatment (the pretreatment sample), and a sample of the tissue is obtained after treatment (the posttreatment sample). The pretreatment sample is labeled with a first code, and the posttreatment sample is labeled with a second, distinguishable code. To accomplish this, two different base images are photographed or otherwise reproduced on film to form two different replica or coded images. The pretreatment sample is immobilized to film displaying the first coded image, and the posttreatment sample is immobilized to film displaying the second coded image. Thereafter, the sandwiches are cut into carriers or particles. The carriers then may be combined and experiments may be conducted on all or a portion of the pooled carriers. Detection of the pattern (or coded image portion) displayed by the carrier will indicate whether a given carrier supports tissue from the pretreatment or posttreatment sample.

More complex multiplexed analysis may involve study of three or more samples, for example, a first, second, and third sample that differ in kind and/or condition, among others.

In a multiplexed analysis, for the various samples to be distinguished after the samples have been pooled, the images recorded on the film must be distinguishable after the film (and generally the film image) has been partitioned into carriers (and image portions). Thus, the images/image portions used to code the carriers may be chosen to allow the user to distinguish between different samples.

The film image may be designed such that the image portion on each carrier derived from a single frame of film will be identical when the film is cut into pieces of a given size. For example, method 1590 of FIG. 43 shows a single frame of film 1592 having a film image 1594 that is a repeating pattern of the letter "X". After cutting along lines 1596 between each "X", shown at 1598, each carrier 1600 contains an "X" as image portion 1602. Thus, all carriers having an "X" as their identifying code may carry a portion of the same biological sample.

Alternatively, the film image may be designed such that the image portions on two or more carriers derived from a single frame of film will be distinguishable from each other when the film is cut into pieces of a given size. In this case, the film image produces at least two distinct codes (and coded carriers) when divided into image portions. In some embodiments, all carriers derived from one or more frames of film may have different codes, making them particularly useful in combinatorial applications or in-situ synthesis. An example of a method 1620 for forming distinct coded carriers along one of two cutting dimensions is shown in FIG. 44. Here, a single frame of film 1622 includes a film image 1624 of vertical bands 1626, and the vertical bands have a decreased width, from left to right, along the film. After cutting along lines 1628, shown at 1630, carriers 1632 from the far left-hand side of the film have four bands, carriers 1634 from columns progressively moving to the right have five, six, or seven bands, and carriers 1636 from the far right-hand side of the film have eight bands. Thus, when associated with a tissue section, as in method 1550 of FIG. 41, a carrier having four bands will be determined to carry a portion of the far left-hand side of the tissue, a carrier having five to seven bands will be determined to carry a portion of the middle of the tissue, and a carrier having eight bands will be determined to carry a portion of the far right-hand side of the tissue. In other embodiments, the carriers may have the same number of bands but different codes as determined by properties of the bands, such as the size, position, color, and intensity of the bands. In yet other embodiments, the carriers may have codes determined by properties of the carriers other than bands.

The film image may be designed so that the code is positioned at any suitable location or locations on the carrier, including the entire carrier or a portion or portions thereof. A code positioned only at a portion of the carrier effectively divides the carrier into a coding region and a noncoding region. Assays such as cell assays then may be performed, if desired, only at noncoding regions, even if cells or samples are associated at both regions, to reduce any possible interference between the code and the assay. In these assays, the noncoding regions, or portions thereof, effectively constitute an assay or measuring region.

The film image also may include additional (i.e., noncoding) features, such as alignment marks that may be used independent of the code to align the image of the carrier before interpreting the code. Suitable alignment marks include spots, crosses, and/or other shapes positioned at defined positions on the carrier relative to the coding and/or noncoding regions.

The film can be cut into any number of shapes and any number of sizes, although the figures show film being cut into a 5×5 grid of squares. An individual film frame may be used as a carrier without portioning the film. Typically, however, it is desirable for the carriers to be smaller than an individual frame of film. Thus, the film may be cut into particles having a largest characteristic dimension between about 0.001 and 35 mm, between about 0.01 and 5 mm, or between about 0.1 and 1 mm in diameter, among others, depending on the properties of the carrier and/or the application. Generally, smaller particles will be better prepared with thinner, finer grained film. For standard photographic film, the film is about 0.130 mm thick, so the largest dimension will be somewhat larger than this value.

The film and/or sandwiches may be portioned using any method capable of cutting or otherwise separating the film into portions, including, for example, mechanical means such as a sharp cutting edge or punch, manual means such as tearing, chemical means such as etching, and/or optical means such as laser cutting. The portioning may be facilitated using any suitable mechanism, including guidelines, perforations, and/or scoring. In some embodiments, the film may be precut into a plurality of portions that remain attached to one another and/or to a common surface by a dissolvable attachment substance, such as gelatin. Individual particles then may be created by dissolving the attachment surface, before or after immobilizing or in-situ synthesizing a sample, such as a biological sample on the precut film.

The particles may be portioned into separate coded carriers before and/or after immobilization of the sample onto the carriers. Thus, in some embodiments, film encoding a suitable pattern may be cut into a first set of pieces, a set of samples may be affixed to the pieces, and then the pieces and affixed samples may be cut further into a second set of pieces for analysis.

Methods of use for the coded carriers are described elsewhere in this Detailed Description. Once the experiments are conducted, the origin of the samples immobilized on each carrier can be determined by observing the pattern or image portion displayed by the carrier. Typically, the carriers are viewed by a microscope and/or with a film scanner, although more generally any suitable detection device may be used. Films may be scanned at any desired resolution, with the preferred resolutions limited by film grain size. Commonly, films are scanned with a resolution of about 6-10 microns per pixel.

The number of different codes available is determined by interplay among the size of the carrier, the grain size of the carrier, and the base image selected. Most common films are between 130 and 170 microns thick. At this thickness, for the carrier to lie flat (to enable viewing or scanning), the carrier should have a width of about 400 microns or more. The size and/or density of the coding features is determined by the grain size of the film. For example, if a coded image including a series of stripes, bands, or other features is chosen, it generally is desirable for each band to have a width of between about 4-5 pixels; thus, each stripe typically is about 25-50 microns in width. Consequently, each carrier can have more than 10 bands. If color film is used, each band may be of a different color; as a result, the total number of possible codes is nearly unlimited. Use of specialty or custom-built films may reduce the grain size of the film and/or the, thickness of the base and allow for even smaller particles.

12.1 Specific Example of a Color-Coded Particle

A specific example of method for making a color-coded particle is described here. A color stripe chart of a repeated pattern with four colored stripes is printed on an ink jet printer and photographed with a 35 mm camera. The film is developed and cut into approximately 0.5 mm squares. These squares are mounted in a slide frame and scanned with a film scanner at the resolution of about 6 microns per pixel. The color patterns are easily recognized by eye and computer, with the four-stripe pattern repeating about every 200 microns.

12.2 Alternative Color-Coded Particle

FIG. 45 is an image of an alternative color-coded particle 1650 produced in accordance with the invention. The particle includes a coding region 1652, a noncoding assay or measuring region 1654 that is spatially distinct from region 1652, an alignment region 1656, and a frame 1658. The coding region may be used for containing a code for identifying the particle or particle type. The assay region may be used for conducting assays on cells, tissues, or other samples affixed thereto. The alignment region may be used for aligning a detection system prior to reading and interpreting the code and/or analyzing the sample. The alignment region includes an asymmetric set of spots 1660 positioned at predefined positions relative to one another, the coding region, and the assay region. The frame may be used to define the exterior of the particle, or the usable region of the particle, and may serve as a guideline for separating the particle from other particles during manufacture and/or subsequent use.

Example 13

Coded Carriers with Surface Area Enhancements and/or Magnetic Portions

This example, illustrated in FIGS. 46-49, describes coded carriers having recesses and/or magnetic portions for use in nonpositional and/or positional arrays.

Particles, such as microparticles, have numerous uses as fillers, tracers, carriers, or tags. For example, particles may be useful as identifying labels to track a material and/or to mark the material for future identification. The general usefulness of particles stems in part from their small size, which may render individual particles unobtrusive or completely invisible to the unaided eye. In addition, small particles may be readily manipulable, for example, in a fluid environment.

Despite the many uses of particles, their small size may limit their effective use in biological assays as coded microcarriers of biological samples. In particular, the small size of particles tends to reduce the available surface area for attaching cells and/or cell-analysis materials, thus limiting the amount of sample that can be analyzed on one particle. In addition, the small size of particles may render the particles difficult to sort or separate after analysis, for example, to isolate or purify cells, cell components, and/or cell-analysis materials bound during the analysis. Thus, a coded carrier having a small overall size but an increased surface area would be useful. Furthermore, a coded carrier that is easily separated from other carriers during or after an analysis also would be useful.

The invention provides coded carriers having increased surface area and/or magnetic portions. The coded carriers may include one or more surface area enhancements such as recesses and/or extensions formed on one or more sides of the carriers. The recesses may include indentations or through-holes, among others, while the extensions may include projections or flaps, among others. Recesses may be preferable to extensions, particularly because they may be less likely to break, entangle, or impede motion or mixing. The surface area enhancements may provide relatively flat association surfaces, such as interior association surfaces in the case of recesses that are at least generally parallel to exterior association surfaces on the carriers. In addition, the surface area enhancements may be formed in an assay region of each carrier that is spatially distinct from a coding region of the carrier. Furthermore, the surface area enhancements may be in a central portion of each carrier, whereas the coding region may flank the central portion on one or both sides. Alternatively, or in addition, the coded carriers may include a magnetic portion. The magnetic portion may include a magnetic material attached to, embedded in, or otherwise associated with the carrier and the code. Coded carriers with recesses and/or magnetic portions may be used in nonpositional and/or positional arrays to provide greater sample capacity, more efficient carrier sorting, and/or more versatile use of carriers in biological assays.

13.1 Coded Carriers with Recesses

The coded carriers may be formed to include one or more recesses. A recess generally comprises any concave portion of a carrier and may have any desired shape. A recess may extend between opposing sides of a carrier to form a through-hole, or the recess may extend to, and terminate at an interior region of the carrier. Generally, the recess provides interior association surfaces that are in fluid communication with exterior surfaces of the carrier. The interior association surfaces may include generally planar surfaces that are parallel to exterior top and bottom surfaces of a planar carrier. The recess may have a rectilinear configuration, bounded by rectangles, or any other suitable geometry, such as cylindrical or elliptical.

A carrier generally may include one or more recesses. These recesses may have similar sizes and/or shapes, and they may have at least generally parallel orientations relative to one another and/or the carrier. For example, the recesses may originate at a side of the carrier and extend to a common, opposing side of the carrier. Alternatively, or in addition, at least some of the plural recesses may have different sizes, shapes, or orientations.

A recess may be disposed in a noncoding and/or a coding region of the carrier. The recess may be disposed in a noncoding region, with the code formed in a spatially distinct, generally nonoverlapping region of the carrier. For example, the recess may be centrally located and flanked on one or more sides by a code. In addition, the recess may extend completely, as a through-hole, across a central portion, with code elements disposed on one or both flanking side portions of the carrier. Alternatively, the recess may be disposed, at least partially, in a coding region of the carrier. For example, the recess may partially overlap a coding region, or may be included completely in a coding region, particularly when a coding region forms a substantial portion of a carrier.

13.2 Forming Coded Carriers with Recesses

A recess may be formed in a coded carrier before, during, or after carrier production.

The recess may be formed before carrier production, for example, especially when the carrier is manufactured as a composite of distinct structures. In this case, at least one of the distinct structures may include a preformed recess, so that joining the distinct structures places the preformed recess in the particle.

The recess also may be formed during carrier production. For example, a recess may be formed by joining component structures in offset positions. Alternatively, a recess may be formed by molding the carrier to include the recess.

The recess also may be formed after carrier production. For example, a recess may be introduced with a cutting or boring device. In other embodiments, a recess may be formed by physical or chemical modifiers that promote structural alteration or removal of a portion of the carrier. Physical or chemical modifiers may include etching reagents, such as acid, base, oxidizing agents, reducing agents, and the like; light; or any other treatment that locally or globally alters the properties of the carrier. A portion of the carrier may be locally exposed to modifiers, for example, by using a mask or template. Alternatively, the entire carrier may be exposed to modifiers, but portions of the carrier may be differentially sensitive to a modifier. For example, the carrier may be formed as a composite of first and second materials, such as two types of glass, with the first material sensitive, and the second material resistant, to the modifier.

13.3 Coded Carriers with Magnetic Portions

A coded carrier may include one or more magnetic portions. A magnetic portion generally comprises a region of the carrier that is capable of being magnetized or attracted by an appropriate magnet. The magnetic portion may allow the carrier to adhere to and/or be moved/rotated by a magnet or ferromagnetic material. The magnetic portion may be used to separate the carrier from other carriers. Alternatively, the magnetic portion may be used to rotate and thus orient the carrier or a group of carriers for reading the code and analyzing the sample. The magnetic portion may include a premagnetized material, or an inductively magnetized material. Suitable materials for the magnetic portion may include any ferromagnetic materials, such as iron, nickel, and cobalt, among others.

The magnetic portions may be attached externally and/or internally and may be disposed in a discrete region of the carrier or extend throughout the carrier. The magnetic portions be embedded in the carrier during its formation, or they may be attached to the carrier after it is formed, for example, by bonding. The magnetic portions may have any suitable configuration, including a cylinder, a sheet, a beam, a bead(s), or any other structure that provides sufficient mass relative to the carrier mass to create an attractive force with an appropriate magnet. In some embodiments, the carrier may be formed entirely of a material that has ferromagnetic properties.

13.4 Glass Carriers with Coding and Noncoding Regions

Figure 46:
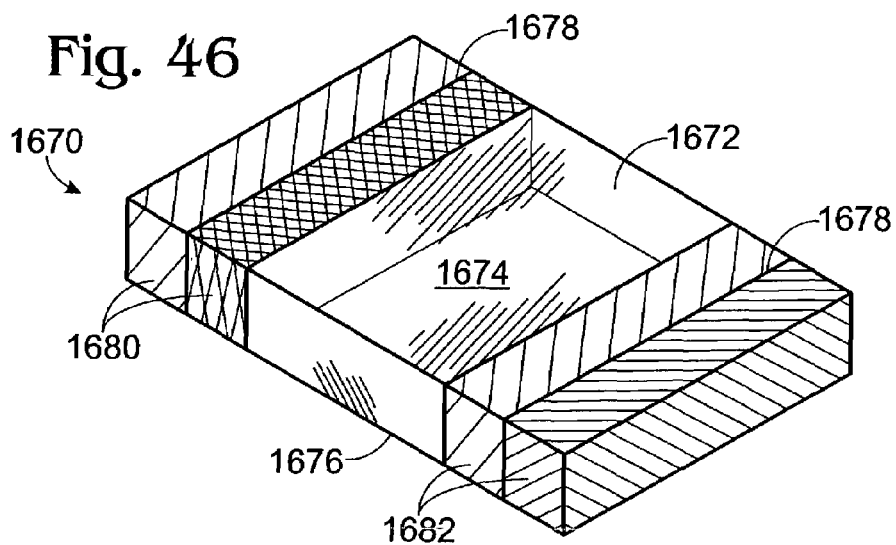
FIG. 46 is an isometric view of a coded carrier without a recess, in accordance with aspects of the invention.

FIG. 46 shows an embodiment of a glass carrier 1670 that includes both coding and noncoding regions, but lacks a recess or magnetic portion. Carrier 1670 includes a centrally disposed noncoding or assay region 1672, having upper and lower association surfaces 1674, 1676 for attaching cells and/or cell-analysis materials. The noncoding region may be constructed of clear, uncolored glass. The noncoding region is flanked by coding regions 1678 that are formed of noncontiguous code elements 1680, 1682 on each side of the noncoding region. In this specific example, code elements 1680, 1682 are colored glass strips that include optical limiting agents, which determine the absorption spectrum of visible light, thus giving each code element an identifying color.

Carriers 1670 may be manufactured using blocks or fibers of clear and colored glass. The blocks or fibers are arranged and fused to form an assembly of coding and noncoding regions within the carriers. Specifically, a separate block or fiber is used for each of the code elements and the central noncoding region. After fusion, the assembly is drawn into a fiber. The resulting fiber may be cut to any desired length to form coded carriers.

13.5 Carriers with Recesses and/or Magnetic Portions

Figure 47:
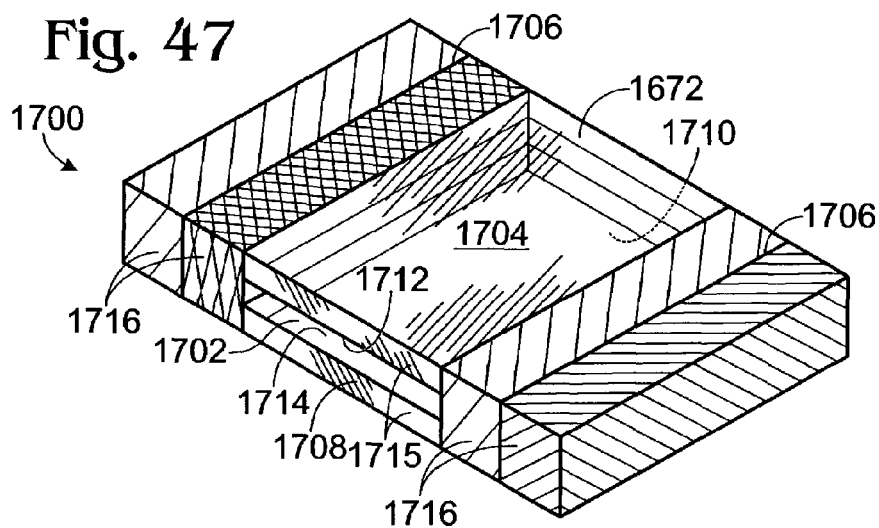
FIG. 47 is an isometric view of a coded carrier with a recess, in accordance with aspects of the invention.

FIG. 47 shows an embodiment of a carrier 1700 with a single recess 1702. Carrier 1700 includes a centrally disposed noncoding region 1704 flanked by coding regions 1706. Recess 1702 is included in noncoding region 1704 and, in this case, is a through-hole that extends between opposing sides 1708, 1710 of the carrier. The recess defines interior association surfaces 1712, 1714 provided by recess walls 1715. The interior association surfaces are at least generally parallel to exterior upper and lower association surfaces formed by walls 1715 of the carrier. Coding regions 1706 are formed of code elements 1716 on each side of noncoding region 1704. In this specific example, code elements 1716 include optical limiting agents that determine the absorption spectrum of visible light, thus giving each code element an identifying color.

Figure 48:
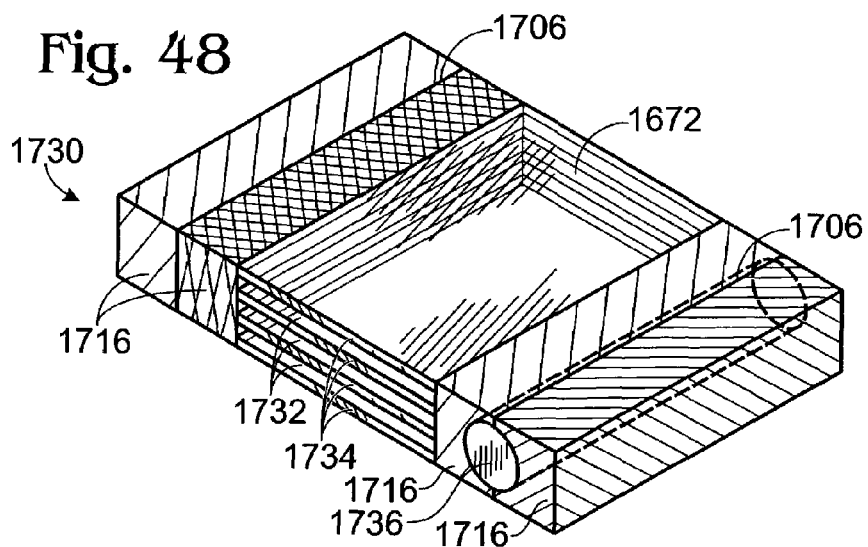
FIG. 48 is an isometric view of a coded carrier with plural recesses and a magnetic portion, in accordance with aspects of the invention.

FIG. 48 shows an embodiment of a carrier 1730 with plural recesses 1732. As in carrier 1700 of FIG. 47, each of the plural recesses defines interior association surfaces that are at least generally parallel to the upper and low association surfaces of the carrier. Each recess is bounded above and below by exterior or interior walls 1734. Carrier 1730 also includes magnetic portion 1736 in the form of a ferromagnetic cylinder embedded between two code elements 1716. Although carrier 1730 includes three recesses and a magnetic portion, in alternative embodiments this carrier may be formed with zero, one, two, or greater than three recesses, and/or without the magnetic portion.

Carriers 1700 and 1730 may be manufactured using similar methods. Blocks or fibers of glass are arranged and fused to form the general arrangement of coding and noncoding regions within the carriers. Specifically, a separate block is used for each of the code elements 1716, each of walls 1715 or 1734, and the recess(es) 1702 or 1732. After fusion, the assembly is drawn into a fiber, during which magnetic portion 1736, such as a wire, may be inserted and embedded. After drawing the assembly to the desired size, the resulting fiber may be cut to any desired length. To allow formation of the recess, the assembly is formed with a removable material in the position of the future recess(es). In this case, an acid-sensitive glass is used at each recess position, whereas acid-resistant glass is used to form the other structures of the carrier. Acid treatment of the carrier etches the acid-sensitive glass and removes it from the carrier to create a recess.

13.6 Analysis of Magnetically Sorted Samples

Figure 49:
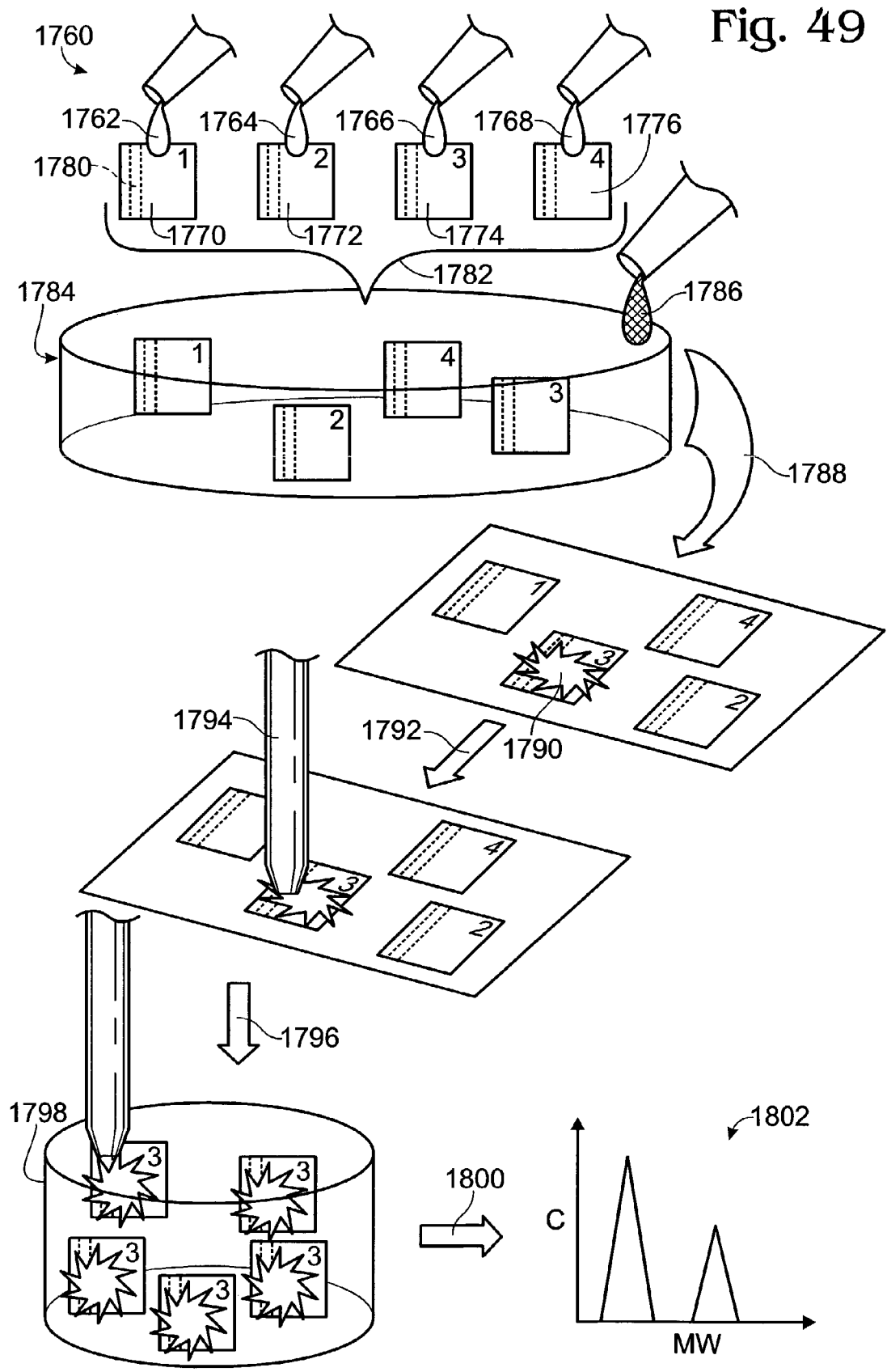
FIG. 49 is a schematic view of a system for purifying and analyzing cell components using coded carriers that include a magnetic portion, in accordance with aspects of the invention.

FIG. 49 shows a method 1760 of using coded carriers with magnetic portions to purify and analyze bound components, such as proteins, from a cell extract. As shown at the top of FIG. 49, proteins 1762, 1764, 1766, 1768 are associated with distinct classes of coded carriers 1770, 1772, 1774, 1776, respectively, having distinct codes 1778. Each of the carriers also includes a magnetic portion 1780 embedded in the carrier. The resulting protein-carrier assemblies are combined, shown at 1782, to form a nonpositional array 1784 of protein probes. A cell or tissue extract 1786 then is combined with array 1784 to allow specific components in extract 1786 to bind to the carriers. As shown at step 1788, the protein-carrier assemblies then are measured to identify a positive signal 1790 produced by bound extract components.

Individual carriers that show a positive signal may be removed and further analyzed. As shown at step 1792, a magnetic element 1794 may be manually or automatically positioned near a carrier with a positive signal (code "3") to attract the carrier to the magnetic element. As shown at step 1796, carriers that exhibit a positive signal and share a common code may be combined in a tube 1798. The bound component from extract 1786 then may be eluted from the carrier, shown at step 1800, and analyzed further. In this case, the eluted component, which represents a single species, is analyzed by mass spectrometry to determine structural features of the single species.

In other embodiments, magnetic carriers may be used to purify whole cells, tissues, phages, viruses, organelles, proteins, nucleic acids, carbohydrates, hormones, ligands, and chemical compounds, among others.

Example 14

Cell Measures from Cell Populations on Coded Carriers

This example, illustrated in FIGS. 50-55, describes methods for analyzing effects on, or differences between, cell populations using nonpositional and/or positional arrays of coded carriers.

Coded carriers may be suitable for cell analysis at different levels, either as a population or as individual cells. Population-level analysis may be useful to measure the effect of a modulator, such as a drug candidate, on the cell population as a whole. For example, in some optical assays, raw data is acquired as an image of the cell population taken at a certain resolution with a microscope, or a scanner. The raw data may be presented in the form of an image or a graphical summary of information in the image, such as a histogram. The intensity measured at each position or pixel within the image places the pixel in an appropriate intensity bin or interval of the histogram. A plot of intensity (intensity interval) versus frequency of occurrence (or number of pixels) provides a histogram that reports the general distribution of pixel intensities within the image. Thus, the histogram tabulates the frequency of pixels within the image that fall within each intensity interval. The histogram can be manipulated by numerous approaches in an attempt to extract a useful measurement value for the image and thus the cell population. For example, the average intensity, median intensity, mode intensity, or other aspect of the distribution may be used. However, the measurement value also should remove any background provided by untransfected cells, nonresponsive cells, a heterogeneous response, a cell-free region, and so on.

In the pharmaceutical industry, a common way to characterize the information value of an assay is based on the z-value. The z-value is calculated by the following formula:

$$z = 1 - \frac{3(SD_{STIM} + SD_{UNSTIM})}{\text{Mean}_{STIM} - \text{Mean}_{UNSTIM}}$$

Here, "Mean" denotes the mean response, and "SD" denotes the standard deviation in the response, for both stimulated (STIM) and unstimulated (UNSTIM) cells. Stimulated and unstimulated are the two extremes between which the actual cell response generally lies, upon reaction with tested pharmaceutical compounds. The goal is to have the range of response as large as possible (difference of the mean responses in denominator) and variability of response as low as possible (sum of standard deviations in numerator). This will produce a z-value close to one. Therefore, a method is needed that characterizes the condition of a cell population in an informative way, by removing background and providing a maximal z-value when comparing stimulated and unstimulated populations.

The invention provides methods for analyzing effects on, or differences between, cell populations using nonpositional and/or positional arrays of coded carriers. A histogram of pixel intensity is generated from an image of each cell population. The histogram may be corrected by removing background pixels and subtracting, from all of the remaining pixels, an intensity component that corresponds to background. This corrected, signal histogram defines a cell measure. The cell measure corresponds to the maximal intensity bin of the corrected histogram that has an intensity greater than or equal to a given percentage of pixels, generally about 90%-95% of the pixels. The cell measure may provide a more useful measure of the cell population for comparison with other cell populations, by eliminating variability due to differences in transfection efficiency, percentage of cell-free regions, and general heterogeneity of cell response.

14.1 Subtracting Background from Histograms

Figure 50:
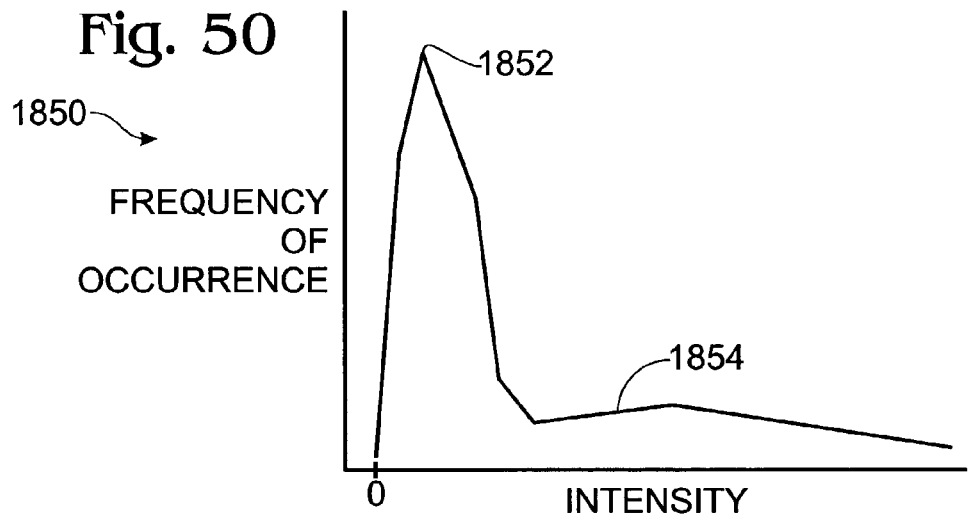
FIG. 50 is a histogram showing an intensity distribution of data from analysis of a cell population, in accordance with aspects of the invention.

FIG. 50 shows a generic histogram 1850 that may be obtained from analysis, such as an image, of a cell population. Histogram 1850 generally includes a high mode 1852 corresponding to the background, and a long tail 1854 corresponding to stained cells. The intensity level of the background is variable, depending on a number of factors, most of which cause a shift or scaling of the histogram (e.g., light intensity, exposure time, etc.). If mode 1852 is well defined, then the background may be estimated as the percentile at double the percent of the mode. In other words, if $P_{mode}$ is the percentile of pixels with intensity less or equal to the mode, then the percentile $2P_{mode}$ may be used as the new origin of the histogram.

Figure 51:
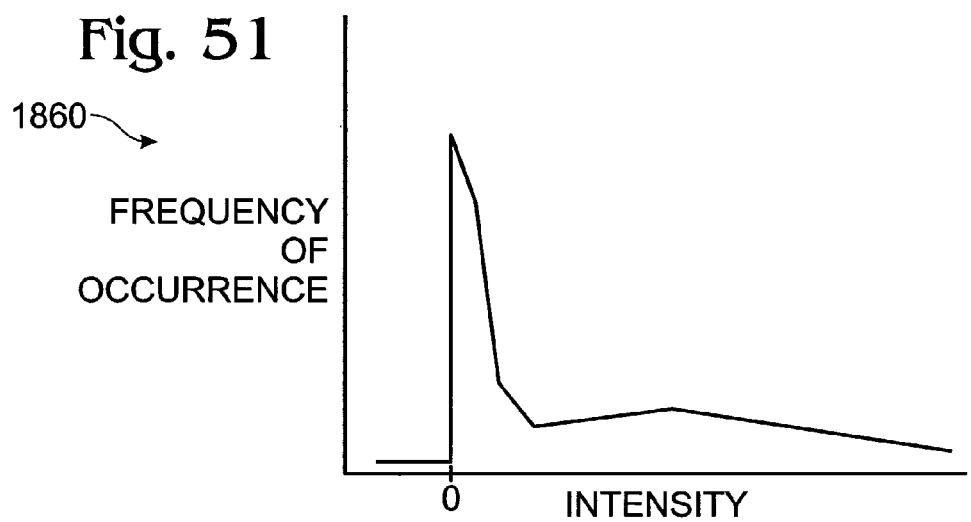
FIG. 51 is a histogram derived from the histogram of FIG. 50 showing subtraction of background data and assignment of a new origin, in accordance with aspects of the invention.
Figure 52:
FIG. 52 is a histogram derived from the histogram of FIG. 50 showing background data relative to the new origin of FIG. 51, in accordance with aspects of the invention

FIGS. 51 and 52 illustrate how assigning a new origin to histogram 1850 of FIG. 50 divides the histogram into a signal histogram 1860 and a background histogram 1870, respectively. Signal above background begins at the former position of percentile $2P_{mode}$, starting at an intensity value of zero.

14.2 Experimental Determination of an Informative Cell Measure

Beta-galactosidase activity in a population of cells was measured to simulate differing responses to modulators. Thus, cells were "stimulated" by varying the development time of an in situ beta-galactosidase assay. The development series consisted of eight time points (0, 10, 30, 60, 90, 125, 155, and 185 minutes); corresponding cell images were obtained from these time points. The cell images each corresponded to an area of cells on a culture dish. The area corresponded to a coded carrier surface of about 0.5 mm by 0.5 mm. For each time point, images were collected at three different magnifications, corresponding to 4×, 2× and 1×, to determine how information content affects z-value. At time zero, the cells were considered to be unstimulated. At the last of the time points (185 minutes), the cells were considered to be stimulated. The data was used to develop a histogram-based method to measure the degree of stimulation, referred to as the assay measure.

After the background is removed, the degree of stimulation (the assay measure) can be assessed as some positional measure of the distribution. Several measures were tried, including average, higher initial moments, and percentiles. The best, as judged by z-values, was a percentile measure with $P_{high}$ percentile values in a range of about 90-95%.

Percentile intensity, H(p), for a given fraction "p" can be defined by the following formula:

$$H(p) = \sum_{i \le H(p)} Hist(i)/N \le p$$

In this formula, N is the total number of pixels in the raw histogram or remaining in the corrected (signal) histogram, depending upon whether background is subtracted or not. The number of pixels "Hist(i)" in each intensity bin "i" is divided by the total number of pixels N to determine a fraction of the total pixels in that bin. These fractions are summed, proceeding from lowest to highest intensity, to provide a cumulative histogram that relates fraction "p" or percentile of pixels to a corresponding intensity bin "H(p)". In other words, H(p) is the maximal histogram bin or intensity interval for which the percentage in cumulative distribution is approximately equal to fraction "p" (multiplied by one-hundred).

Different cell measures may be used based on data quality or assay conditions. With a well-defined mode in the histogram, the measure of stimulation S (the assay measure) may be defined as:

$$S = H(P_{high}) - H(2P_{mode})$$

Alternatively, if the mode is not well defined, then a good assay measure is the difference between high and low percentiles:

$$S = H(P_{high}) - H(P_{low})$$

Here, $P_{high}$ is 90-95%, and $P_{low}$ is 5-10%.

Figure 53:
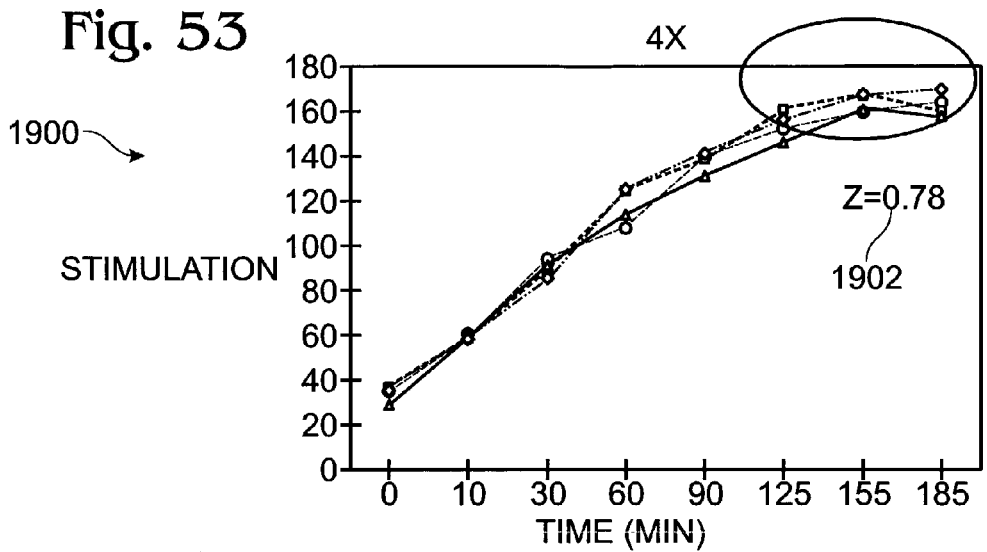
FIG. 53 is a graph plotting cell measure "S" (Stimulation) for cell populations imaged at 4× magnification, as a function of reaction time during a beta-galactosidase assay, in accordance with aspects of the invention.
Figure 54:
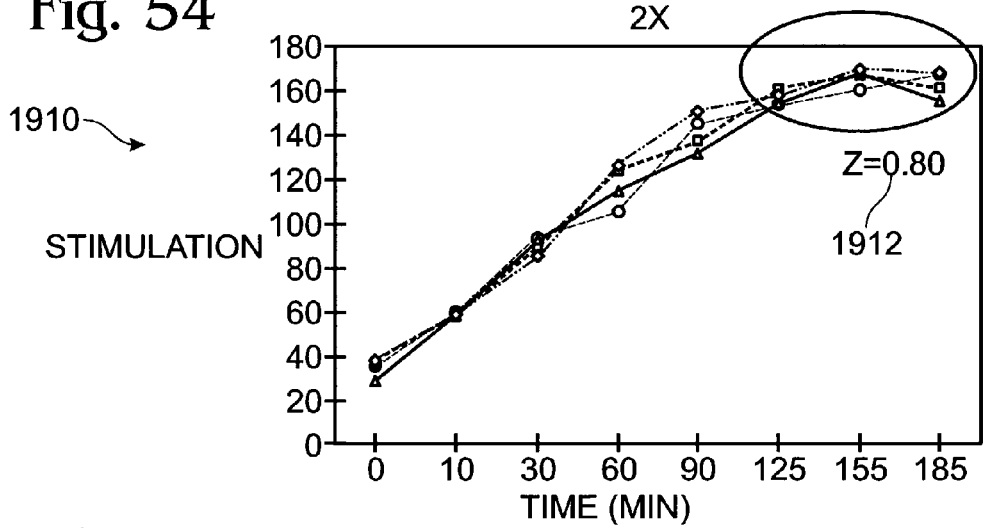
FIG. 54 is a graph plotting cell measure "S" (Stimulation) for cell populations imaged at 2× magnification, as a function of reaction time during a beta-galactosidase assay, in accordance with aspects of the invention.
Figure 55:
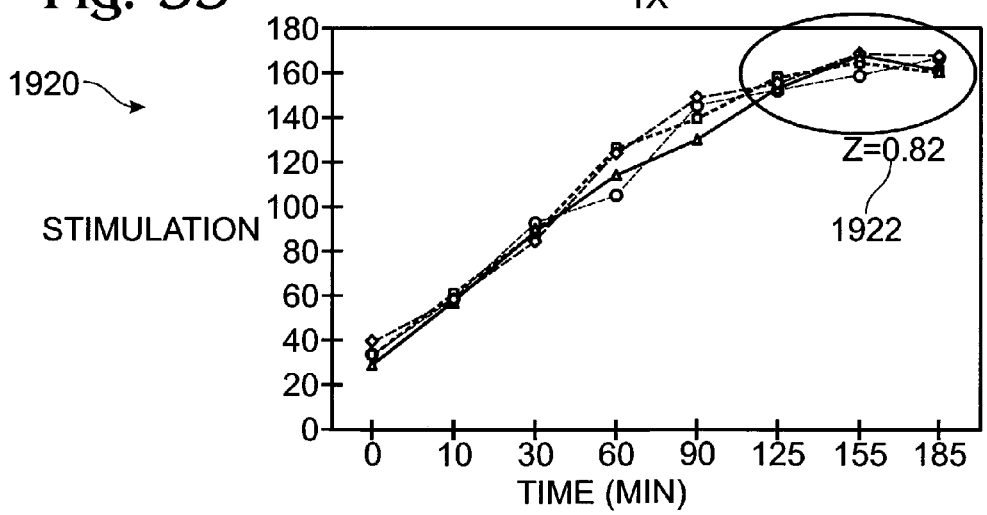
FIG. 55 is a graph plotting cell measure "S" (Stimulation) for cell populations imaged at 1× magnification, as a function of reaction time during a beta-galactosidase assay, in accordance with aspects of the invention.

Graphs for S are shown in FIGS. 53-55. Stimulation was calculated after removing the background and was plotted as a function of time in minutes. The three graphs 1900, 1910, 1920 correspond to data from different image magnifications, 4× (FIG. 53), 2× (FIG. 54), and 1× (FIG. 55). Each of the four curves shown corresponds to a different area of cells (0.5 mm×0.5 mm). The z-values 1902, 1912, 1922 were calculated as the average of z-values for the three longest development times (circled with an ellipse). As shown, the three different magnifications show no significant difference in z-values (0.78, 0.80, 0.82). This result suggests that the lowest magnification used, 1×, may be sufficient for analysis of stimulation in cell populations.

Example 15

Coded Carrier Embodiments, Reading Codes, and Measuring Characteristics

This example, illustrated in FIGS. 56-62, describes coded carriers that may be suitable for use in a multiplexed cell analysis system. In addition, this example describes optical methods for reading the codes on the coded carriers and measuring cell characteristics.

The development of combinatorial chemistry and the increasing amount of information derived from the Human Genome Project has dramatically changed the method and rate of drug discovery. Chemical libraries consisting of millions of compounds are tested simultaneously in assays where the activity of these compounds is measured by their effect on in-vitro, or cell-free, biochemical processes (Gonzalez and Negulescu, 1998, Sundberg, 1998). New fields of research, such as genomics and proteomics, are constantly fueling the drug discovery process with new molecules that are funneled and tested through faster and more efficient systems. These systems are generically called High-Throughput Screening (HTS) systems (examples of such systems are described in the following U.S. Patents: U.S. Pat. Nos. 5,233,369, 5,486,855, 4,982,739, and 5,571,410, all incorporated by reference herein).

HTS systems have become the standard in drug discovery for the pharmaceutical industry and many of these systems are now commercially available and in routine use (Silverman et al., 1998). However, these systems are limited in their use since they only show the effect of a compound at a single biochemical level such as DNA amplification, RNA transcription, or protein synthesis (Fernandes, 1998) without analyzing the effect of the compound on the overall physiology of the organism. This increased need for studying the activity of chemical libraries in-vivo has produced HTS cell-based assays that mimic the role of the analyzed compounds in a specific disease state more closely than in-vitro (cell-free) assays.

The discovery of an active compound is only the initial part of the development of a new drug. Subsequent phases of the discovery process are designed to show physiological or biochemical changes in experimental animal models, a costly and sometimes unpredictable procedure. Thus, the pharmaceutical industry needs to shorten the time of target validation and compound discovery during a period when the numbers of both targets and compounds are increasing dramatically. Furthermore, new regulations and social pressures in the United States and Europe have made animal testing more difficult and highly restricted. Therefore, the development of assays that can provide a high-throughput screen of active compounds in vivo, without the direct use of animals and at a low cost, are of critical importance to the pharmaceutical industry.

15.1 Cell-Based High-Throughput Screening

In order to address the need for cell-based HTS, several companies have designed instrumentation to measure compound activity in-vivo. Examples of these systems are the FLIPR System (Molecular Devices, Mountain View, Calif.), Science Applications International (SAIC) imaging plate reader (Seattle, Wash.), and the ArrayScanII System (Cellomics, Inc., Pittsburgh, Pa.).

Methods to perform these cell-based HTS vary from uniform micropattern arrays (U.S. Pat. No. 6,103,479, incorporated by reference herein), microtiter-well based cell arrays (U.S. Pat. No. 5,989,835 incorporated by reference herein), or complex devices for the multiple attachment and staining of cell lines (U.S. Pat. No. 6,022,700, incorporated by reference herein). The applications of these cell assays are numerous. For example, U.S. Pat. No. 5,780,258 (incorporated by reference herein) describes the use of a cell based screening method to find drugs that could regulate obesity. Appel et al. (1999) describes the use of cell-based assays for the analysis of new anti-tumor agents and Kosovsky (2000) describes the use of transfected cells that express wild type and mutated genes to study the activity of compounds on a particular gene of interest. Also, the use of cells from knockout and knock-in transgenic mice is becoming increasingly valuable in drug discovery (Polites, 1996, Yamamura, 1999, de la Brousse and Chen, 1998) since the response to a compound can be associated with a well-defined gene. Lastly, cell-based assays in the form of minute tissue sections ("tissue microarrays") are being used to study the expression of relevant carcinogenic genes (Kononen et al., 1998, and Kallioniemi, O. -P, 1998).

In spite of all these advances, cell-based screening assays still suffer from two important shortcomings. First, in most current assays the activity of the compound on cells is measured as the total activity of all the cells present at that spot or microtiter well. Single cell activity and associated morphological changes are not measured. The measurement of biochemical activity is averaged among all the cells present at the tested location (well). Single cell changes in-situ are extremely important since several biochemical processes can be more accurately measured in-situ inside individual cells (Taylor, 1992 and 2000). Second, using current available methods, a compound (or compounds) of interest can only be tested against one or a few groups of different cell types. Cell-based assays containing multiple cell types are presently technically difficult and economically unfeasible to produce. However this level of multiplexed analysis in which chemical libraries are tested against "cell libraries" is critical in many applications such as the development of new anti-cancer agents (Appel et al, 1999).

The present invention describes a method by which cell-based HTS, allowing for individual cell measurements, and containing practically unlimited numbers of cell types, may be manufactured efficiently and inexpensively.

15.2 Overview of Carrier Structure, Use, and Measurement

The invention generally provides for a cell support particle for viewing microstructures within cells attached to cell-attachment surface, at one or more selected viewing wavelengths or optical modalities, for example, but not limited to, polarization, columnation, phase contrast, transmission, reflection, fluorescence, and the like, and identifying such cells. In some embodiments the particle is a cell carrier, where the carrier has a plurality of optical light-guides, and each light-guide has an upper surface and a lower surface, where the upper surface and the lower surface are in optical communication so that the upper surface forms a light-guide entry, the lower surface forms a light-guide exit, and light entering the light-guide entry enters and travels through the light-guide, and exits the light-guide form the light-guide exit, the light-guides are optically neural at the one or more selected viewing wavelengths or optical modalities, the light-guides together forming the cell-attachment surface, and one or more optical limiting agents, with at least one agent present in at least one of the light-guides to form a spatial optical code among the light-guides to form a spatial optical code among the light-guides, each of the agents is optically neutral at the one or more viewing wavelengths or optical modalities, each of the agents is optically detectable, without producing optical interference by such cells, or producing small amounts of interference that do not preclude code identification, by a detector when the agent is illuminated at one or more detection wavelengths or optical modalities, the code identifying at least one property of such cells, and where the cell microstructures are viewable without producing optical interference from the carrier, and the code is detectable without producing optical interference from such cells.

Optical modalities embrace both in combination and separately, wavelength, light paths including transmission, reflection, surface plasmon resonance, shadows, dark-field, fluorescence, phase contrast, diffraction, fluorescence polarization, staining, including fluorescence staining, the relation of the light source to the light detector, such as in transmission, phase, epi, dark-field, fluorescence, and like. For example, epi-fluorescence illumination may be used to view cell microstructure which has been stained with a fluorescent-microstructure specific stain to reveal cell microstructure under light conditions suitable for fluorescent microscopy. Then, the carrier for which the cell or cells are attached may be "decoded" by viewing with transmission or epi-illumination microscopy conditions the code of the carrier. One skilled in the art would appreciate that transmission microscopy typically does not reveal cell structure thus rendering the cell optically neutral or "invisible" with respect to the decoding optical system. On the other hand, assuming the optical code created by the spatial placement of optical agents in coding compartments or positions is conversely not visible to the fluorescent system because in such instances, the optical agents are selected so that they do not fluoresce under the fluorescent microscopy system used to view the cell microstructure as mentioned above. In short, juxtaposed or orthogonal systems are selected for viewing microstructure or other cell features or events without optical interference from the code, coding structure or carrier, and, for viewing or decoding the code contained within the carrier as a spatial code. As another example, phase contrast may be used to detect cell related features or events, and fluorescence may be used to reveal and decode the code. It is the selective illumination, as defined as both the transmission of light to, and the emission, shadow, or reflection from an object in the cell-coded carrier system that imparts the selective, orthogonal viewing/decoding scheme contemplated by the present invention. More preferably, the coding system includes at least two different spectral properties that are different than simple difference in intensity.

In another aspect, the invention provides for an apparatus for viewing microstructures within cells attached to a cell-attachment surface, at one or more selected viewing wavelengths or optical modalities, and identifying such cells. The apparatus comprises a cell carrier defining the cell-attachment surface, where the carrier has a plurality of optical light-guides, each light-guide has an upper surface, a lower surface, the upper surface and the lower surface are in optical opposition so that the upper surface forms a light-guide entry, the lower surface forms a light-guide exit, and light entering the light-guide entry enters and travels through the light-guide, and exits the light-guide from the light-guide exit, the light-guides are optically transparent at the one or more selected viewing wavelengths or optical modalities, the upper surfaces together form the smooth cell-attachment surface, and, one or more optical limiting agents at least one agent present in at least one of the optical light-guides, each of the agents is optically transparent at the one or more viewing wavelengths or optical modalities, each of the agents is optically detectable, without optical interference by such cells, by a detector when the agent is illuminated at one or more detection wavelengths or optical modalities, the code coding for at least one property of such cells, and wherein the cell microstructures are viewable without optical interference from the carrier, and the spatial optical code is detectable without optical interference from such cells.

Yet another aspect of the invention provides for a method for viewing microstructures within cells attached to a cell-attachment surface, at one or more selected viewing wavelengths or optical modalities, and identifying such cells. The method preferably comprises the steps of:

(i) providing a plurality of cell carriers, each of the carriers having a plurality of optical light-guides, each light-guide having an upper surface and a lower surface, the upper surface and the lower surface are in optical communication so that the upper surface forms a light-guide entry, the lower surface forms a light-guide exit, and light entering the light-guide entry enters and travels through the light-guide, and exits the light-guide from the light-guide exit, the light-guides are optically neutral at the one or more selected viewing wavelengths or optical modalities, the light-guides together forming the cell-attachment surface and, one or more optical limiting agents at least one agent present in at least one of the light-guides to form a spatial optical code among the light-guides, the code identifying at least one identifiable property of such cells, each of the agents is optically neutral at the one or more viewing wavelengths or optical modalities, each of the agents is optically detectable without optical interference by such cells, the spatial optical code are detectable without optical interference from such cells;

(ii) illuminating such cells at the one or more viewing wavelengths or optical modalities with a cell illumination source, the cell illumination source adapted to illuminate selected cell microstructures without producing optical interference from the agents;

(iii) viewing the selected cell microstructures;

(iv) illuminating the agents at one or more detection wavelengths or optical modalities with an agent illumination source, the agent illumination source adapted to illuminate the agents without producing optical interference from the cell microstructure; and (v) detecting with a detector, the agents forming the spatial optical code and decoding the code to identify such cells.

In the present invention multiplexing is achieved not by depositing different cell types in predefined areas or wells but instead the cells are attached to carriers. These carriers may have identifiable physical properties (size, color, shape) or may contain a code (color bar code, fluorescent signature, etc.) that allows for their identification, and hence, for the identification of the cell type attached to it. In general, the carriers with cells are placed in vessels (e.g., tube, microtiter well), and reacted with the compounds of interest. Once the reaction takes place, the carriers with the reacted cells may be placed on a flat surface, which is then analyzed by a scanning instrument or microscope. The instrument identifies the cell type by its encoded carrier and measures cellular reactivity in-situ with the compound. Alternatively, the instrument analyzes the reactivity of the cells directly in the vessels where the reaction took place by following the same process of identifying the carrier, and analyzing the cells for response to the compounds.

In one embodiment different cell types (e.g., cell lines) are attached to distinguishable carriers. Groups of different carriers with cells are placed in separate vessels each containing a different active compound to be tested with the reporting analyte (usually a fluorescent dye). A scanning instrument scans the different vessels identifying the cells by their respective carriers and the biochemical changes that occurred within each cell due to the exposure to the compound.

In a different embodiment cell suspensions are obtained from tumor biopsies of patients suffering from different forms of cancer and are subsequently attached to encoded carriers. The cells attached to the carriers are then labeled with the marker of interest (antibody, DNA probe) and deposited on a slide. The slide is again analyzed by identification of the carrier and analysis of the reactivity of the cells to the markers. This embodiment is of particular interest in the field of gene expression where it could substitute for a more expensive and difficult to manufacture system such as tissue microarrays. Using this approach novel genes and genetic changes of importance can be identified to determine the diagnostic, prognostic, and therapeutic value of different markers in oncology. This approach would also facilitate screening for molecular alterations in many different malignancies simultaneously. Other application of these tumor cells arrays could be for treatment selection. For example, cells from tumors that overexpress the Her-2 gene would respond better to herceptin, while cells with lower expressions levels will not respond well to this therapy.

Application of gene expression technology to cancer drug discovery is complicated by the heterogeneous and complex nature of clinical tumor specimens. A simplified approach is provided by the use of cell lines derived from these tumors. For example, the 60 cell lines used in the National Cancer Institute's drug discovery program can be likened to 60 patients who have been treated with >70,000 different chemical compounds one at a time and independently over the last 10 years. That offers a great opportunity since the patterns of drug activity in these cells provide detailed information about mechanisms of drug action and resistance (Paull, et al., 1989; Weinstein, 1992). These cell lines, or other cell types, could be attached to the encoded carriers to facilitate the screening and analysis of therapeutic drugs.

In another embodiment, cultured cells or cells isolated from nonsolid tissues or tumors (blood samples, bone marrow, etc.) from animals or human patients can be used to screen for hormonal or chemotherapeutic drugs. This would enable a better analysis of leukemias and lymphomas. Furthermore, cytological specimens (such as fine needle aspirates, bladder or cervical lavages, cervical cytology, etc.) can be pelleted or deposited onto the encoded carriers for analysis. The cells can be fixed in suspension before or after attachment to the carriers and processed with established staining procedures.

In another embodiment, specimens from a transgenic or model organism can be converted into cell suspensions and attached to the carriers. This will produce arrays of cells where responses to predetermined genes can be measured either by their absence in the cells or by their differential function among transgenic organisms with the same genetic background.

Another example of the use of this invention would be in combination with microarray technology such as high-throughput genomics or proteomics. This combination would provide information about the frequency of a multitude of genetic alterations or gene expression patterns in a variety of tumor types. In one specific embodiment one could have a cDNA array that allows a plurality of DNA sequences to be analyzed representing genes important in the development of breast cancer. After a particular gene shows some relevant expression patterns it is then used as a probe to screen tumor cells obtained from different clinical samples. The cells attached to encoded particles will simplify the screening processing producing valuable information to clarify the relationship between molecular and clinical characteristics of breast carcinomas.

15.3 Carrier Embodiments and Measurement Methods

Figure 56:
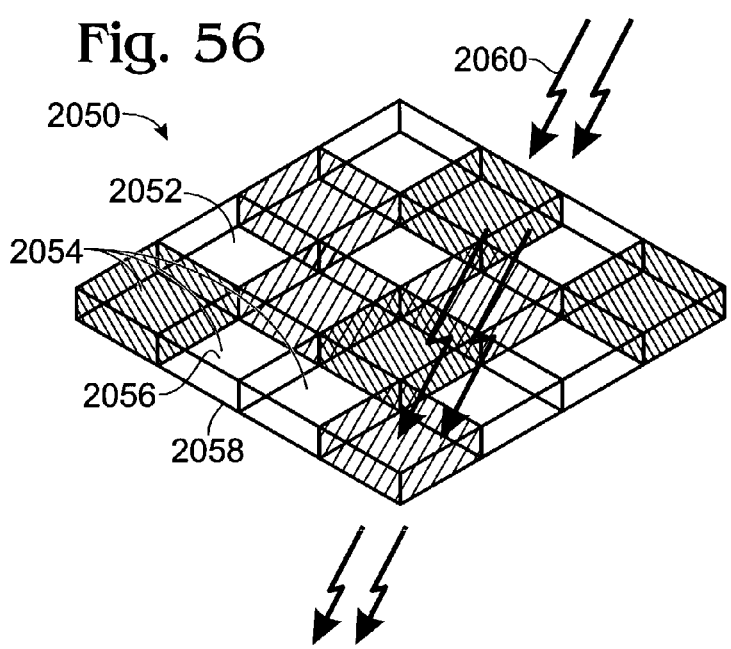
FIG. 56 is an isometric view of a planar coded carrier, in accordance with aspects of the invention.

FIG. 56 depicts cell carrier 2050. Carrier 2050 may be used for viewing microstructures within cells, when the cell are attached to cell-attachment surface 2052, at one or more selected viewing wavelengths or optical modalities, and identifying such cells. Carrier 2050 has a plurality of optical light-guides 2054, and each light-guide has an upper surface 2056 and lower surface 2058, where the upper and lower surfaces are in optical communication so that the upper surface forms a light-guide entry, the lower surface forms a light-guide exit, and light 2060 entering the light-guide entry enters and travels through the light-guide, and exits the light-guide from the light-guide exit, light- guides are optically neutral at the one or more selected viewing wavelengths or optical modalities, the light-guides together forming cell-attachment surface 2052, and one or more optical limiting agents, not captioned in the figure, with at least one agent present in at least one of the light-guides to form a spatial optical code among the light-guides, each of the agents is optically neutral at the one or more viewing wavelengths or optical modalities, each of the agents is optically detectable, without producing optical interference by such cells, by a detector when the agent is illuminated at one or more detection wavelengths or optical modalities, the code identifying at least one property of such cells, and where the cell microstructures are viewable without producing optical interference from the carrier, and the code are detectable without producing optical interference from such cells.

Figure 57:
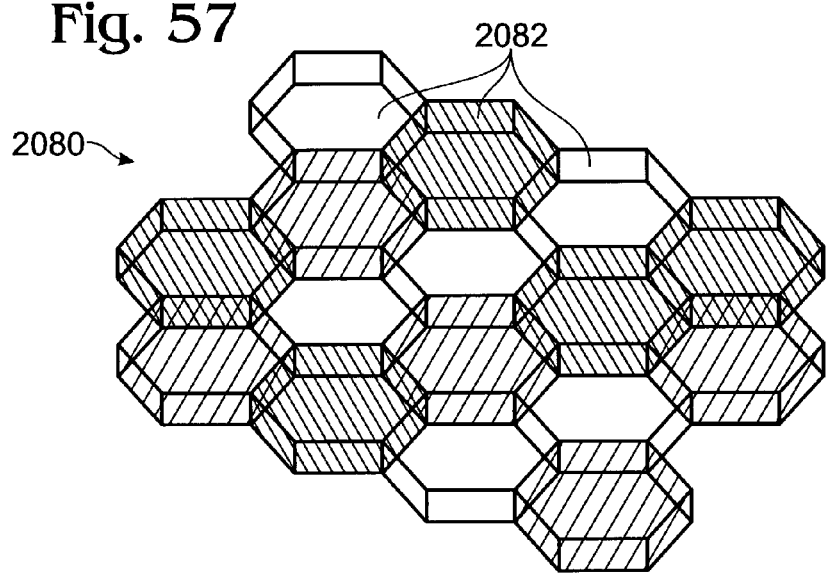
FIG. 57 is an isometric view of another planar coded carrier, in accordance with aspects of the invention.

FIG. 57 shows another embodiment of a coded carrier 2080. Carrier 2080 has a generally planar configuration, in the form of a wafer, and may be a particle. The periphery of carrier 2080 is shaped so that if suspended in a suspension cell culture with other carriers, edges of carrier 2080 lack points or sharp or rough edges that may contact and damage cells associated with other carriers. Carrier 2080 includes code elements 2082 that are arranged at distinct positions within the carrier. Each code element has one of plural potential optical properties, shown here as different colors, which give each code element a detectable feature.

Figure 58:
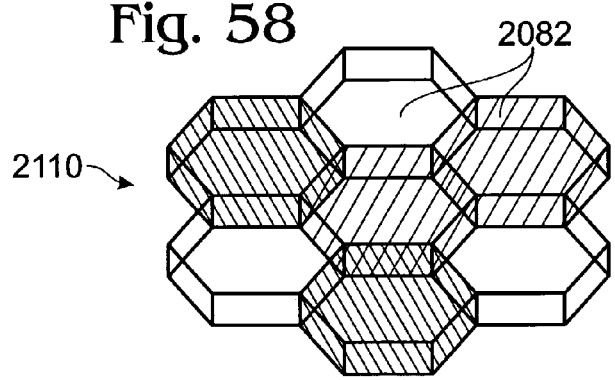
FIG. 58 is an isometric view of yet another planar coded carrier, in accordance with aspects of the invention.

FIG. 58 shows another embodiment of a carrier 21 10 that includes a substantially planar cell association surface. Carrier 2110 is similar to carrier 2080 of FIG. 57 but has fewer code elements 2082.

Figure 59:
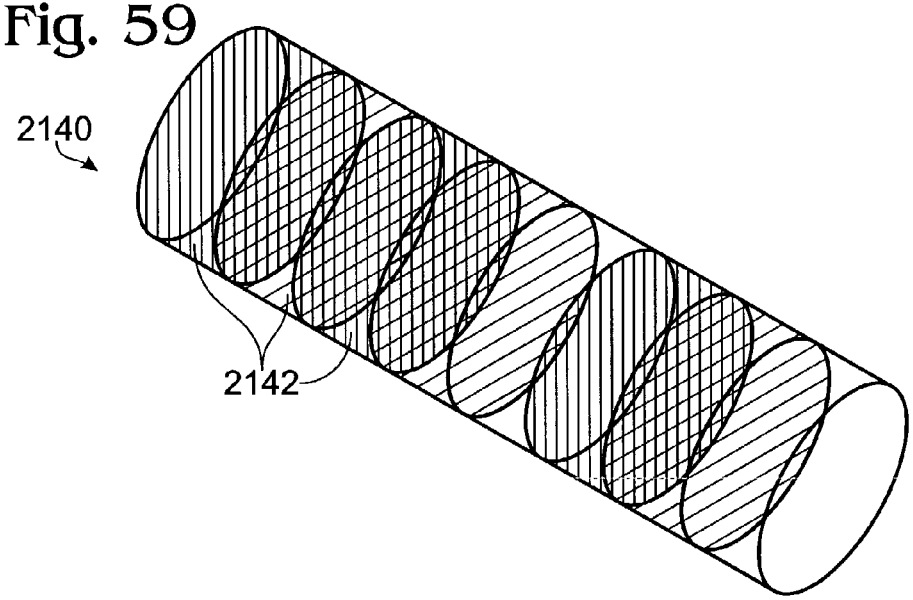
FIG. 59 is an isometric view of a cylindrical coded carrier, in accordance with aspects of the invention.

FIG. 59 shows an embodiment of a coded carrier 2140 that has a stacked cylinder arrangement. Each layer 2142 acts as a code element with one of plural potential optical properties. Here, each code element includes a detectable color to form a color code. Thus, each layer 2142 in the stack represents a different spatial coding compartment with one of M>2 optically detectable indicia located in each of the layers.

Figure 60:
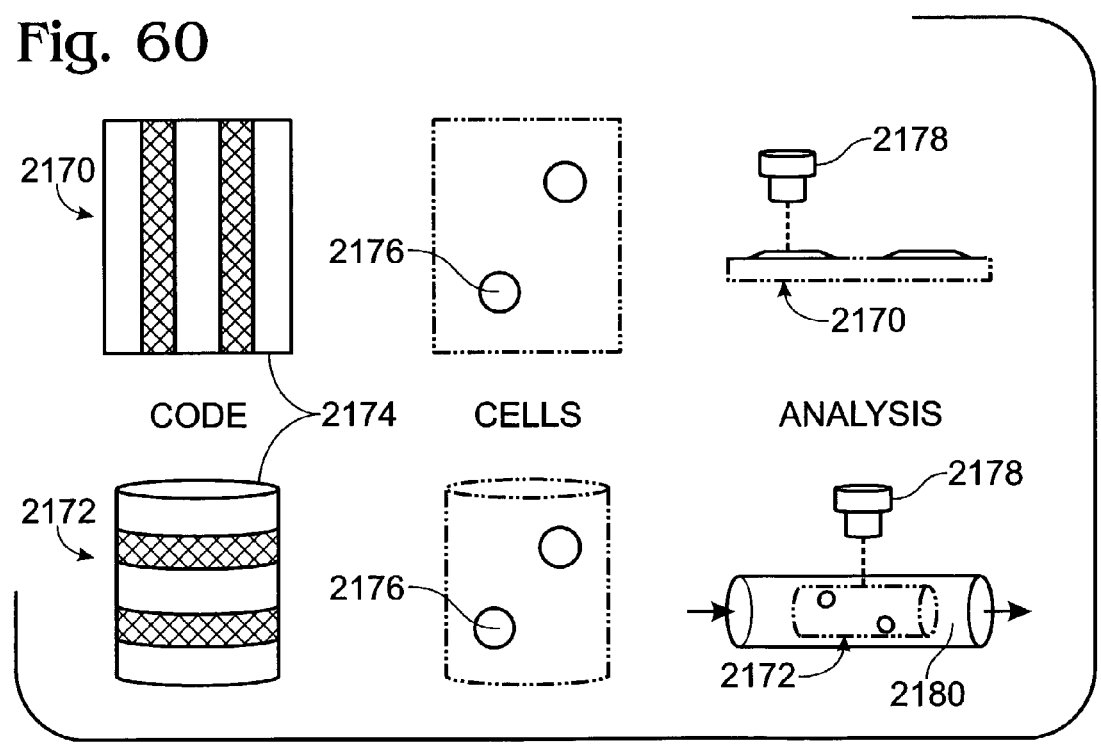
FIG. 60 is a series of views of planar and cylindrical carriers, showing distinct appearances of the carriers while reading the code of each carrier and measuring a cell characteristic, and the disposition of each carrier relative to a detector, in accordance with aspects of the invention.

FIG. 60 compares codes, cell characteristics, and reading/measurement systems for two types of coded carriers, generally planar carrier 2170 and cylindrical carrier 2172. As shown at the left, a code 2174 on each carrier is detectable without significant interference from cells associated with the carriers. As shown in the middle of the figure, using an alternative measurement mode, a characteristic is measurable for cells 2176 associated with each carrier, without significant interference from the code. The right side of FIG. 60 illustrates distinct types of measuring systems for analyzing carriers 2170, and 2172. Planar carrier 2170 is disposed on a planar surface (not shown), such as on a slide. Detector 2178 and/or the slide may be moved in a plane relative to each other to scan the carrier and other carriers on the slide. In contrast, cylindrical carrier 2172 is analyzed using a flow-based system in which the carrier flows (indicated by arrows) past detector 2178 in a conduit, such as a capillary tube 2180.

Figure 61:
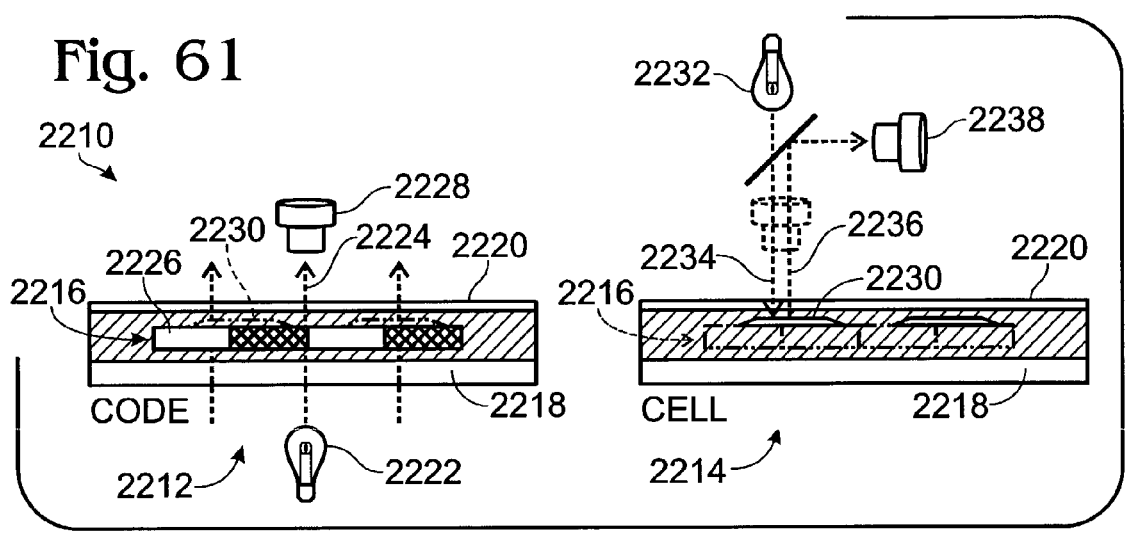
FIG. 61 is a side elevation view of a system for reading the code of planar carriers and measuring characteristics of cells associated with the carrier, in accordance with aspects of the invention.

FIG. 61 illustrates a detection system 2210 for reading the code, shown at 2212, and measuring cell characteristics, shown at 2214, on generally planar carrier 2216. The carrier is disposed between a microscope slide 2218 and a cover slip 2220. A light source 2222 transmits light, shown at 2224, through code elements 2226, with each code element absorbing light based on an optical property of the code element. Detector 2228 determines the intensity, wavelength(s), and/or other property of light transmitted/absorbed by each code element and the relative or absolute position of the code element within the carrier, thus reading the carrier code. Cells 2230 are generally invisible during this portion of the analysis.

At the right of FIG. 61, cell fluorescence is measured. Light source 2232 directs exciting light, shown at 2234, to the cells and carrier, but the carrier is substantially nonfluorescent and thus remains generally invisible during this portion of the analysis. Based on properties of the cells and labels used, the cells 2230 emit light 2236 that is reflected to a detector 2238 that measures the intensity, distribution, and/or other property of the emitted light, optionally as a function of wavelength.

Figure 62:
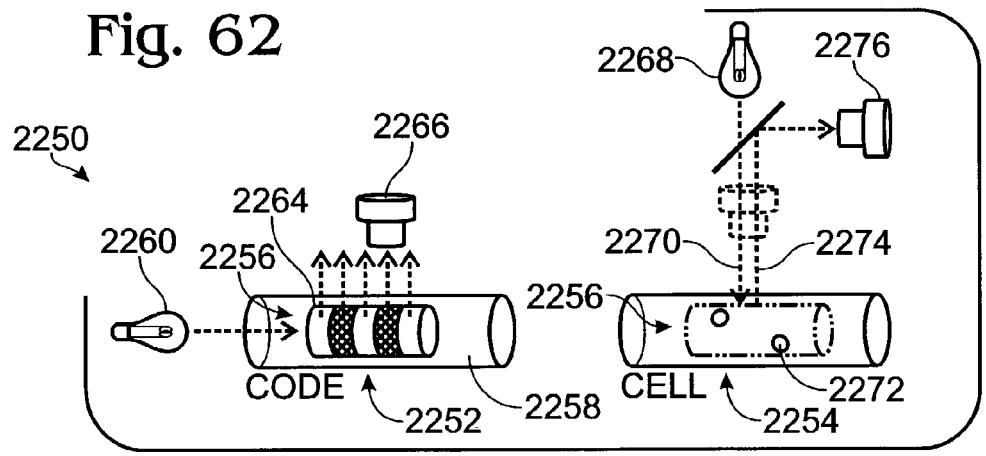
FIG. 62 is a side elevation view of a system for reading the code of cylindrical carriers and measuring characteristics of cells associated with the carrier, in accordance with aspects of the invention.

FIG. 62 illustrates a detection system 2250 for reading the code, shown at 2252, and measuring cell characteristics, shown at 2254, on cylindrical carrier 2256. In this flow-based system, carrier 2256 is transported into position for analysis using capillary tube 2258. Light source 2260 transmits light, shown at 2262, along the long axis of carrier 2256 to each code element 2264 of the carrier. Detector 2266 measures the relative and/or absolute position, within the carrier, of light transmitted by each code element, in addition to the light's, intensity, wavelength, and/or other property.

As shown at the right of FIG. 62, an alternative optical mode is used to measure cell characteristics. Here, light source 2268 sends exciting light 2270 that causes cells 2272 to fluoresce. Emitted light 2274 is measured by detector 2276, as described above for FIG. 61.

Both systems 2210 and 2250 of FIGS. 61 and 62 use an apparatus for viewing microstructures within cells attached to a cell-attachment surface provided by a coded carrier. The cells are viewed at one or more selected viewing wavelengths or optical modalities, and identified based on the code on each carrier. The apparatus comprises a cell carrier defining the cell-attachment surface, where the carrier has a plurality of optical light-guides, each light-guide has an upper surface, a lower surface, and the upper surface and lower surfaces are in optical opposition so that upper surface forms a light-guide entry, the lower surface forms a light-guide exit, and light entering light-guide entry enters and travels through the light-guide, and exits the light-guide from the light-guide exit, light-guides are optically transparent at the one or more selected viewing wavelengths or optical modalities. The upper and lower surfaces in the planar embodiment of FIG. 61 and the side surface of FIG. 62, each form a cell-attachment surface. The colored or light and dark regions of the carriers in FIGS. 56-62 represent one or more optical limiting agents at least one agent present in at least one of the optical light-guides to form a spatial optical code among the light-guides, each of the agents is optically transparent at the one or more viewing wavelengths or optical modalities from the viewing light source, each of the agents is optically detectable, without producing optical interference by such cells, by the detector when- the agent is illuminated at one or more detection wavelengths or optical modalities from the light source, the code coding for at least one property of such cells, and wherein the cell microstructures are viewable without producing optical interference from the carrier, and the spatial optical code is detectable without producing optical interference from such cells.

The above apparatus optionally may be used in yet another aspect of the invention which provides for a method for viewing microstructures within cells attached to a cell-attachment surface, at one or more selected viewing wavelengths or optical modalities, and identifying such cells. The method preferably comprises the steps of:

(i) providing a plurality of cell carriers, each of the carriers having a plurality of optical light guides, each light-guide having an upper surface and a lower surface, the upper surface and the lower surface are in optical communication so that the upper surface forms a light-guide entry, the lower surface forms a light-guide exit, and light entering the light-guide entry enters and travels through the light-guide, and exits the light-guide from the light-guide exit, the light-guides are optically neutral at the one or more selected viewing wavelengths or optical modalities, the light-guides together forming the cell-attachment surface and, one or more optical limiting agents at least one agent present in at least one of the light-guides to form a spatial optical code among the light-guides, the code identifying at least one identifiable property of such cells, each of the agents is optically neutral at the one or more viewing wavelengths or optical modalities, each of the agents is optically detectable without producing optical interference by such cells, the spatial optical code are detectable without producing optical interference by such cells, the spatial optical code are detectable without producing optical interference from such cells;

(ii) illuminating such cells at the one or more viewing wavelengths or optical modalities with a cell illumination source, the cell illumination source adapted to illuminate selected cell microstructures without producing optical interference from the agents;

(iii) viewing the selected cell microstructures;

(iv) illuminating the agents at one or more detection wavelengths or optical modalities with an agent illumination source, the agent illumination source adapted to illuminate the agents without producing optical interference the cell microstructure; and (v) detecting with a detector, the agents forming the spatial optical code and decoding the code to identify such cells.

15.4 References

The following references describe additional information regarding selected aspects of Example 15, as cited above:

1. Fernandes, P. B. (1998) Curr Opinion. Chem. Biol. 2:597-603.
2. Gonzalez, J. E. and Negulescu, P. A. (1998). Curr. Opin. Biotech 9:624-631.
3. Silverman et al. (1998). Curr. Opinion. Chem. Biol. 2:397-403.
4. Yamamura, K. (1999) Prog. Exp. Tumor Res. 35:13-24.
5. Polites, H. G. (1996) Intl. J. Exp. Pathol. 77:257-262.
6. Sundberg, S. A. (2000) Curr Opinion. Biotech. 11:47-53.
7. Appel, J. R. et al. (1999) Molecular Diversity 4:91-102.
8. Taylor, D. L. (1992) *Am. Scientist* 80:322-335.
9. Kononen J., et al. (1998) Nature Medicine 4:844-847.
10. Paull, et al., JNCI 81:1088, 1989.
11. Weinstein, et al., Science 258:343, 1992.
12. Unger, et al., Science 288:113, 2000.

The disclosure set forth above may encompass multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and nonobvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. It is believed that the following claims particularly point out certain combinations and sub-combinations that are directed to one of the disclosed inventions and are novel and nonobvious. Inventions embodied in other combinations and subcombinations of features, functions, elements and/or properties may be claimed through amendment of the present claims or presentation of new claims in-this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A system for conducting a multiplexed cellular experiment comprising
    a solid support;
    a container suitable for mixing a plurality of microcarriers; and
    a mixture of flat microcarriers randomly distributed on the solid support, the mixture including a first class of flat microcarriers each having a detectably distinct first code and a second class of flat microcarriers each having a detectably distinct second code, wherein each microcarrier in the mixture comprises an alignment mark for orienting each microcarrier code before reading by the system, the first class of flat microcarriers carrying a first population of cells, and the second class of flat microcarriers carrying a second population of cells, so that the mixture of microcarriers can be analyzed in the same multiplexed experiment by identifying populations of cells according to the codes on their respective microcarriers.

2. The system of claim 1 further comprising one or more additional class of flat microcarrier having a detectably distinct code for identifying a population of cells associated with the microcarrier.

3. The system of claim 1, wherein at least one of the cell populations has been exposed to one or more compounds selected as a modulator candidate for activating, inhibiting, or potentiating cellular receptor activity.

4. The system of claim 3 further comprising a mechanism for detecting cellular receptor activity.

5. The system of claim 4, wherein the detection mechanism uses spectroscopic, hydrodynamic, or imaging methods.

6. The system of claim 1, wherein each class of flat microcarrier includes one or more microcarners.

7. The system of claim 1, wherein the codes are optically detectable.

8. The system of claim 1, wherein the first class of microcarrier carries a cell population characterized by a first target or set of targets, and the second class of microcarrier carries a cell population characterized by a second target or set of targets, so that effects of a potential modulator on the first and second targets can be detected in a single multiplexed assay.

9. The system of claim 8, wherein the effects of the potential modulator on the first target or set of targets is different from the effects of the potential modulator on the second target or set of targets.

10. The system of claim 8, wherein the mixture of microcarriers includes a third class of microcarriers each having a detectably distinct third code, the third class of microcarrier carrying a cell type characterized by a toxicology panel.

11. The system of claim 10, wherein the solid support comprises a positional array of wells, one or more of the wells containing a mixture of first, second, and third microcarrier classes, so that effects of a potential modulator on one or more targets and a toxicology panel can be determined in a single multiplexed assay.

12. The system of claim 1, wherein the solid support comprises a flat surface, a multi-class portion of the mixture of microcarriers being arbitrarily distributed at an examination site on the surface.

13. The system of claim 12 further comprising an imaging device configured to acquire at least one image of the microcarriers at the examination site.

14. The system of claim 13 further comprising an image analysis system that uses code information from the image to interpret experiments on the cells.

15. The system of claim 1, wherein the codes are defined by multi-color combinations.

16. The system of claim 1, wherein each code includes at least two distinct colored optically identifiable marks.

17. The system of claim 12, wherein the surface is glass.

18. The system of claim 13, wherein the imaging device acquires a digital image of the microcarriers at the examination site.

19. The system of claim 18, wherein the imaging device includes a CCD camera.

20. The system of claim 13, wherein the imaging device includes a microscope.

21. The system of claim 13, wherein the imaging device includes a confocal optics structure.

22. The system of claim 1, wherein each microcarrier has a cell association area and a code area.

23. The system of claim 22, wherein the cell association area and the code area substantially overlap with each other.

24. The system of claim 22, wherein the cell association area and the code area at least partially overlap with each other.

25. The system of claim 22, wherein the cell association area and the code area are separate from each other.

26. The system of claim 1, wherein each microcarrier has a dimension of between about 10 microns to about 4 millimeters in length or diameter.

27. The system of claim 1 further comprising a microcarrier detection device including a flow channel and a detection station along the channel configured to detect codes on microcarriers as they flow through the channel.

28. The system of claim 1, wherein each of the first and the second population of cells includes primary cells.

29. The system of claim 28, wherein each of the first code and the second code identifies a source for each population of primary cells.

30. The system of claim 29, wherein the first code and the second code identify patient information for each population of primary cells.

* * * * *